(12) United States Patent
Molinaro et al.

(10) Patent No.: US 12,496,246 B1
(45) Date of Patent: Dec. 16, 2025

(54) BIOMECHANICAL AND PHYSIOLOGICAL STATE ESTIMATION FOR TASK AGNOSTIC WEARABLE ROBOT CONTROL AND HUMAN MONITORING

(71) Applicant: Georgia Tech Research Corporation, Atlanta, GA (US)

(72) Inventors: Dean Molinaro, Atlanta, GA (US); Aaron Young, Atlanta, GA (US); Keaton Scherpereel, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/945,287

(22) Filed: Nov. 12, 2024

(51) Int. Cl.
*A61H 3/00* (2006.01)
*A61F 2/70* (2006.01)
*A63B 24/00* (2006.01)
*B25J 9/00* (2006.01)
*G16H 40/67* (2018.01)
*A61H 1/02* (2006.01)

(52) U.S. Cl.
CPC ............... *A61H 3/00* (2013.01); *A61F 2/70* (2013.01); *A63B 24/0062* (2013.01); *B25J 9/0006* (2013.01); *G16H 40/67* (2018.01); *A61F 2002/704* (2013.01); *A61H 1/0262* (2013.01); *A61H 2201/5007* (2013.01); *A61H 2230/605* (2013.01); *A61H 2230/625* (2013.01)

(58) Field of Classification Search
CPC ...... B25J 9/0006; B25J 9/1633; B25J 13/084; B25J 13/085; A61F 2002/704
See application file for complete search history.

(56) References Cited

U.S. PATENT DOCUMENTS

| 10,232,680 | B2 | 3/2019 | Park et al. | |
| 2005/0024331 | A1* | 2/2005 | Berkley et al. | G09G 5/08 345/161 |
| 2013/0310979 | A1* | 11/2013 | Herr | B62D 57/032 700/258 |
| 2022/0323855 | A1* | 10/2022 | Khare | A63F 13/65 |
| 2023/0166391 | A1* | 6/2023 | Chauhan et al. | B25J 9/00 |
| 2024/0260875 | A1* | 8/2024 | Gurchiek et al. | A61B 5/22 |

OTHER PUBLICATIONS

Zhou et al. "Not all tasks as born equal: Understanding Zero-Shot Generalization" Feb. 1, 2023 (Year: 2023).*

(Continued)

*Primary Examiner* — Victoria Murphy
*Assistant Examiner* — Sara K Toich
(74) *Attorney, Agent, or Firm* — Meunier Carlin & Curfman LLC

(57) ABSTRACT

Exemplary task-agnostic exoskeleton control system and method are disclosed that are task-agnostic utilizing instantaneous estimates of biological joint moments from deep neural networks to assist the user movements. The exemplary control system employs multiple body sections and joints in-the-loop estimation to provide multi-joint assistance operation, e.g., within an autonomous, clothing-integrated exoskeleton. The exemplary control system may deploy a deep domain adaptation (DDA) method configured to translate human movement data between a simulated sensor domain and a real sensor domain.

28 Claims, 42 Drawing Sheets

(56) References Cited

OTHER PUBLICATIONS

Qi et al "An Improved Greedy Reduction Algorithm Based on Neighborhood Rough set Model for Sensors Screening of Exoskeleton" Dec. 1, 2021 (Year: 2021).*
Liang et al. "Deep-learning model for the prediction of lower-limb joint moments using single inertial measurement unit during different locomotive activities" Sep. 2023 (Year: 2023).*
Fang et al. "Gait Neural Network for Human-Exoskeleton Interaction") (Year: 2020).*
Camargo et al. "Predicting biological joint moment during multiple ambulation tasks" Feb. 24, 2022 (Year: 2022).*
Kang et al. "Real-time gait phase estimation for robotic hip exoskeleton control during multimodal locomotion" (Year: 2021).*
Kang et al. "Real-Time Neural Network-Based Gait Phase Estimation using a Robotic Hip Exoskeleton" (Year: 2019).*
Akbari et al. "Transferring Activity Recognition Models for New Wearable Sensors with Deep Generative Domain Adaptation" (Year: 2019).*
Molinaro et al. (Year: 2023).*
Seth, et al., "Opensim: Simulating Musculoskeletal Dynamics and Neuromuscular Control to Study Human and Animal Movement", PLOS Computational Biology, vol. 14, No. 7, Article e1006223, 20 pages, Jul. 26, 2018.
Shafer, et al., "Emulator-Based Optimization of a Semi-Active Hip Exoskeleton Concept: Sweeping Impedance Across Walking Speeds", IEEE Transactions on Biomedical Engineering, vol. 70, No. 1, pp. 271-282, Jan. 2023.
Shepherd, et al., "Deep Learning Enables Exoboot Control to Augment Variable-Speed Walking", IEEE Robotics and Automation Letters, vol. 7, No. 2, pp. 3571-3577, Apr. 2022.
Shepherd, et al., "Design and Validation of a Torque-Controllable Knee Exoskeleton for Sit-to-Stand Assistance", IEEE/ASME Transactions on Mechatronics, vol. 22, No. 4, pp. 1695-1704, Aug. 2017.
Siviy, et al., "Opportunities and Challenges in the Development of Exoskeletons for Locomotor Assistance", Nature Biomedical Engineering, vol. 7, pp. 456-472, Dec. 22, 2022.
Slade, et al., "Personalizing Exoskeleton Assistance While Walking in the Real World", Nature, vol. 610, pp. 277-282, Oct. 12, 2022.
Sloboda, et al., "Utility of Inter-subject Transfer Learning for Wearable-Sensor-Based Joint Torque Prediction Models", 2021 43rd Annual International Conference of the IEEE Engineering in Medicine & Biology Society (EMBC), Mexico, pp. 4901-4907, Nov. 2021.
Tagoe, et al., "Walking on Real-World Terrain With an Ankle Exoskeleton in Cerebral Palsy", IEEE Transactions on Medical Robotics and Bionics, vol. 6, No. 1, pp. 202-212, Feb. 2024.
Taigman, et al., "Unsupervised Cross-Domain Image Generation", arXiv:1611.02200, 15 pages, 2016.
Tucker, et al., "Control Strategies for Active Lower Extremity Prosthetics and Orthotics: A Review", Journal of neuroengineering and rehabilitation, vol. 12, No. 1, pp. 1-30, Jan. 5, 2015.
Tucker, et al., "Human Preference-Based Learning for High-dimensional Optimization of Exoskeleton Walking Gaits", 2020 IEEE/RSJ International Conference on Intelligent Robots and Systems (IROS), Las Vegas, NV, USA, pp. 3423-3430, 2020.
Tucker, "Preference-based Learning for User-guided HZD Gait Generation on Bipedal Walking Robots", 2021 IEEE International Conference on Robotics and Automation (ICRA), Xi'an, China, pp. 2804-2810, May-Jun. 2021.
Wang, et al., "A Wearable Real-time Kinetic Measurement Sensor Setup for Human Locomotion", Wearable Technologies, vol. 4, No. e11, 23 pages, Apr. 11, 2023.
Wang, et al., "Human Gait Data Augmentation and Trajectory Prediction for Lower-Limb Rehabilitation Robot Control Using GANs and Attention Mechanism", Machines 2021, vol. 9, No. 12, Article No. 367, 17 pages, Dec. 18, 2021.
Wang, et al., "Integral Real-time Locomotion Mode Recognition Based on GA-CNN for Lower Limb Exoskeleton", Journal of Bionic Engineering, vol. 19, pp. 1359-1373, Jul. 18, 2022.

Winter, David A., "Biomechanical Motor Patterns in Normal Walking", Journal of Motor Behavior, vol. 15, No. 4, pp. 302-330, 1983.
Winter, David A., "Kinetics: Forces and Moments of Force", Biomechanics and Motor Control of Human Movement, John Wiley & Sons, pp. 107-138, Sep. 17, 2009.
Winter, et al., "Measurement and Reduction of Noise in Kinematics of Locomotion", Journal of Biomechanics, vol. 7, Issue 2, pp. 157-159, Mar. 1974.
Witte, et al., "Improving the Energy Economy of Human Running with Powered and Unpowered Ankle Exoskeleton Assistance", Science Robotics, vol. 5, Issue 40, 8 pages, Mar. 25, 2020.
Wong, et al., "Is Natural Variability in Gait Sufficient to Initiate Spontaneous Energy Optimization in Human Walking?", Journal of Neurophysiology, vol. 121, Issue 5, pp. 1848-1855, Mar. 13, 2019.
Xu, et al., "Reducing the Muscle Activity of Walking Using a Portable Hip Exoskeleton Based on Human-in-the-loop Optimization", Frontiers in Bioengineering and Biotechnology, vol. 11, 13 pages, May 4, 2023.
Yang, et al., "Reducing the Energy Cost of Running Using a Lightweight, Low-profile Elastic Exosuit", Journal of NeuroEngineering and Rehabilitation, vol. 18, Article No. 129, 12 pages, Aug. 30, 2021.
Yang, et al., "Spine-Inspired Continuum Soft Exoskeleton for Stoop Lifting Assistance", EEE Robotics and Automation Letters, vol. 4, No. 4, pp. 4547-4554, Oct. 2019.
Yang, "ViT-based Terrain Recognition System for Wearable Soft Exosuit", Biomimetic Intelligence and Robotics, vol. 3, Issue 1, Article No. 100087, 8 pages, Jan. 16, 2023.
Young, et al., "A Biomechanical Comparison of Proportional Electromyography Control to Biological Torque Control Using a Powered Hip Exoskeleton", Frontiers in Bioengineering and Biotechnology, vol. 5, Article 37, 17 pages, Jun. 30, 2017.
Young, et al., "State of the Art and Future Directions for Lower Limb Robotic Exoskeletons", IEEE Transactions on Neural Systems and Rehabilitation Engineering, vol. 25, Issue 2, pp. 171-182, Jan. 27, 2016.
Zhang, et al., "Human Activity Recognition Based on Motion Sensor Using U-Net", IEEE Access, vol. 7, pp. 75213-75226, Jun. 5, 2019.
Zhang, et al., "Human-in-the-loop Optimization of Exoskeleton Assistance During Walking", Science, vol. 356, Issue 6344, pp. 1280-1284, Jun. 23, 2017.
Zhang, et al., "Lower-Limb Joint Torque Prediction Using LSTM Neural Networks and Transfer Learning", IEEE Transactions on Neural Systems and Rehabilitation Engineering, vol. 30, pp. 600-609, Mar. 3, 2022.
Zhang, et al., "Optimal Energy Shaping Control for a Backdrivable Hip Exoskeleton", 2023 American Control Conference (ACC), San Diego, CA, USA, pp. 2065-2070, 2023.
Zhao, et al., "Prediction of Joint Angles Based on Human Lower Limb Surface Electromyography", Sensors 2023, vol. 23, No. 12, Article No. 5404, 22 pages, Jun. 7, 2023.
Zhu, et al., "Unpaired Image-To-Image Translation Using Cycle-Consistent Adversarial Networks", Proceedings of the IEEE International Conference on Computer Vision (ICCV), pp. 2223-2232, 2017.
Akbari, et al., "Transferring Activity Recognition Models for New Wearable Sensors with Deep Generative Domain Adaptation", IPSN '19: Proceedings of the 18th International Conference on Information Processing in Sensor Networks, pp. 85-96, Apr. 16, 2019.
Alexander, et al., "Lower Limb Joint Work and Joint Work Contribution During Downhill and Uphill Walking at Different Inclinations", Journal of Biomechanics, vol. 61, pp. 75-80, Aug. 16, 2017.
An, et al., "AdaptNet: Human Activity Recognition via Bilateral Domain Adaptation Using Semi-Supervised Deep Translation Networks", IEEE Sensors Journal, vol. 21, No. 18, pp. 20398-20411, Jul. 6, 2021.
Ancillao, et al., "Indirect Measurement of Ground Reaction Forces and Moments by Means of Wearable Inertial Sensors: A Systematic Review", Sensors 2018, vol. 18, No. 8, Article No. 2564, 34 pages, Aug. 5, 2018.

(56) References Cited

OTHER PUBLICATIONS

Awad, et al., "A Soft Robotic Exosuit Improves Walking in Patients After Stroke", Science Translational Medicine, vol. 9, Issue 400, Jul. 26, 2017.
Bai, et al., "An Empirical Evaluation of Generic Convolutional and Recurrent Networks for Sequence Modeling", arXiv preprint arXiv:1803.01271, 14 pages, 2018.
Baltrusch, et al., "The Effect of a Passive Trunk Exoskeleton on Metabolic Costs During Lifting and Walking", Ergonomics, vol. 62, No. 7, pp. 903-916, Apr. 24, 2019.
Barazesh, et al., "A Biarticular Passive Exosuit to Support Balance Control can Reduce Metabolic Cost of Walking", Bioinspiration & Biomimetics, vol. 15, No. 3, 18 pages, Mar. 18, 2020.
Baud, et al., "Review of Control Strategies for Lower-limb Exoskeletons to Assist Gait", Journal of NeuroEngineering and Rehabilitation, vol. 18, Article No. 119, 34 pages, Jul. 27, 2021.
Benjamini, et al., "Controlling the False Discovery Rate: A Practical and Powerful Approach to Multiple Testing", Journal of the Royal statistical society: series B (Methodological), vol. 57, Issue 1, pp. 289-300, 1995.
Bishe, et al., "Adaptive Ankle Exoskeleton Control: Validation Across Diverse Walking Conditions", IEEE Transactions on Medical Robotics and Bionics, vol. 3, No. 3, pp. 801-812, Jun. 22, 2021.
Brockway, J. M., "Derivation of Formulae Used to Calculate Energy Expenditure in Man", Human nutrition. Clinical Nutrition, vol. 41, No. 6, pp. 463-471, Nov. 1987.
Browning, et al., "The Effects of Adding Mass to the Legs on the Energetics and Biomechanics of Walking", Medicine & Science in Sports & Exercise, vol. 39, No. 3, pp. 515-525, 2007.
Camargo, et al., "A Comprehensive, Open-source Dataset of Lower Limb Biomechanics in Multiple Conditions of Stairs, Ramps, and Level-ground Ambulation and Transitions", Journal of Biomechanics, vol. 119, No. 15, Article No. 110320, 9 pages, Apr. 15, 2021.
Camargo, et al., "A Machine Learning Strategy for Locomotion Classification and Parameter Estimation Using Fusion of Wearable Sensors", IEEE Transactions on Biomedical Engineering, vol. 68, No. 5, pp. 1569-1578, May 2021.
Camargo, et al., "Biomechanical Evaluation of Stair Ambulation Using Impedance Control on an Active Prosthesis", Journal of Biomechanical Engineering, vol. 145, No. 2, Article No. 021007, 9 pages, Oct. 6, 2022.
Camargo, et al., "Predicting Biological Joint Moment During Multiple Ambulation Tasks", Journal of Biomechanics, vol. 134, Article No. 111020, 17 pages, Mar. 2022.
Camomilla, et al., "Methodological Factors Affecting Joint Moments Estimation in Clinical Gait Analysis: A Systematic Review", BioMedical Engineering OnLine, vol. 16, Article No. 106, 27 pages, Aug. 18, 2017.
Chang, et al., "A Systematic Study of Unsupervised Domain Adaptation for Robust Human-Activity Recognition", Proceedings of the ACM on Interactive, Mobile, Wearable and Ubiquitous Technologies, vol. 4, Issue 1, Article No. 39, pp. 1-30, Mar. 18, 2020.
Chen, et al., "MotionTransformer: Transferring Neural Inertial Tracking between Domains", Proceedings of the AAAI Conference on Artificial Intelligence, vol. 33 No. 01, pp. 8009-8016, Jul. 17, 2017.
Clites, et al., "Understanding Patient Preference in Prosthetic Ankle Stiffness", Journal of NeuroEngineering and Rehabilitation, vol. 18, Article No. 128, 16 pages, Aug. 25, 2021.
Collins, et al., "Reducing the Energy Cost of Human Walking Using an Unpowered Exoskeleton", Nature, vol. 522, No. 7555, pp. 212-215, 2015.
Colucci, et al., "Brain-Computer Interface-Controlled Exoskeletons in Clinical Neurorehabilitation: Ready or Not?", Neurorehabilitation and Neural Repair, vol. 36, No. 12, pp. 747-756, Nov. 25, 2022.
Criekinge, et al., "A Full-body Motion Capture Gait Dataset of 138 Able-bodied Adults Across The Life Span and 50 Stroke Survivors", Scientific Data, vol. 10, Article No. 852, 8 pages, Dec. 1, 2023.
David, et al., "Human Locomotion Databases: A Systematic Review", IEEE Journal of Biomedical and Health Informatics, vol. 28, No. 3, pp. 1716-1729, Mar. 2024.
Delp, et al., "OpenSim: Open-Source Software to Create and Analyze Dynamic Simulations of Movement", IEEE Transactions on Biomedical Engineering, vol. 54, No. 11, pp. 1940-1950, Oct. 22, 2007.
Diaz, et al., "Human-in-the-Loop Optimization of Wearable Robotic Devices to Improve Human-Robot Interaction: A Systematic Review", IEEE Transactions on Cybernetics, vol. 53, No. 12, pp. 7483-7496, Dec. 2023.
Ding, et al., "Effect of Timing of Hip Extension Assistance During Loaded Walking with a Soft Exosuit", Journal of NeuroEngineering and Rehabilitation, vol. 13, Article No. 87, 10 pages, Oct. 3, 2016.
Ding, et al., "Human-in-the-Loop Optimization of Hip Assistance with a Soft Exosuit During Walking", Science Robotics, vol. 3, No. 15, eaar 5438, pp. 246-251, Feb. 28, 2018.
Dorschky, et al., "CNN-Based Estimation of Sagittal Plane Walking and Running Biomechanics From Measured and Simulated Inertial Sensor Data", Frontiers in Bioengineering and Biotechnology, vol. 8, Article 604, pp. 14, Jun. 28, 2020.
Fang, et al., "Improving the Energy Cost of Incline Walking and Stair Ascent With Ankle Exoskeleton Assistance in Cerebral Palsy", IEEE Transactions on Biomedical Engineering, vol. 69, No. 7, pp. 2143-2152, Jul. 2022.
Fantozzi, et al., "3D Joint Moments in Transfemoral and Transtibial Amputees: When is The" Ground Reaction Vector Technique" an Alternative to Inverse Dynamics?", Journal of Mechanics in Medicine and Biology vol. 12, No. 4, Article 1250061, 20 pages, 2012.
Faridee, et al., "STranGAN: Adversarially-learnt Spatial Transformer for Scalable Human Activity Recognition", Smart Health, vol. 23, Article No. 100226, 16 pages, Mar. 2022.
Farris, et al., "Linking the Mechanics and Energetics of Hopping with Elastic Ankle Exoskeletons", Journal of Applied Physiology, vol. 113, Issue 12, pp. 1862-1872, Oct. 11, 2012.
Farris, et al., "Revisiting the Mechanics and Energetics of Walking in Individuals with Chronic Hemiparesis Following Stroke: From Individual Limbs to Lower Limb Joints", Journal of NeuroEngineering and Rehabilitation, vol. 12, Article No. 24, 12 pages, Feb. 27, 2015.
Farris, et al., "The Mechanics and Energetics of Human Walking and Running: A Joint Level Perspective", Journal of The Royal Society Interface, vol. 9, Issue 66, pp. 110-118, Jan. 7, 2012.
Fawaz, et al., "Deep Learning for Time Series Classification: A Review", Data Mining and Knowledge Discovery, vol. 33, pp. 917-963, Mar. 2, 2019.
Former-Cordero, et al., "Inverse Dynamics Calculations during Gait with Restricted Ground Reaction Force Information from Pressure Insoles", Gait & Posture, vol. 23, No. 2, pp. 189-199, Feb. 2006.
Franks, et al., "Comparing Optimized Exoskeleton Assistance of the Hip, Knee, and Ankle in Single and Multi-joint Configurations", Wearable Technologies, vol. 2, e16, 17 pages, Nov. 24, 2021.
Franks, et al., "The Effects of Incline Level on Optimized Lower-Limb Exoskeleton Assistance", bioRxiv Preprint, 12 pages, Sep. 15, 2021.
Gasparri, et al., "Proportional Joint-Moment Control for Instantaneously Adaptive Ankle Exoskeleton Assistance", IEEE Transactions on Neural Systems and Rehabilitation Engineering, vol. 27, No. 4, pp. 751-759, Apr. 2019.
Golovin, et al., "Google Vizier: A Service for Black-Box Optimization", KDD '17: Proceedings of the 23rd ACM SIGKDD International Conference on Knowledge Discovery and Data Mining, pp. 1487-1495, Aug. 13, 2017.
Haresamudram, et al., "Assessing the State of Self-Supervised Human Activity Recognition Using Wearables", Proceedings of the ACM on Interactive, Mobile, Wearable and Ubiquitous Technologies, vol. 6, Issue 3, Article No. 116, pp. 1-47, Sep. 7, 2022.
Hegde, et al., "Activity Classification Using Unsupervised Domain Transfer from Body Worn Sensors", Smart Health, vol. 30, Article No. 100431, 14 pages, Oct. 2023.
Hossain, et al., "Estimation of Lower Extremity Joint Moments and 3D Ground Reaction Forces Using IMU Sensors in Multiple Walk-

(56) References Cited

OTHER PUBLICATIONS ing Conditions: A Deep Learning Approach", IEEE Journal of Biomedical and Health Informatics, vol. 27, No. 6, pp. 2829-2840, Jun. 2023.
Huo, et al., "Impedance Modulation Control of a Lower-Limb Exoskeleton to Assist Sit-to-Stand Movements", IEEE Transactions on Robotics, vol. 38, No. 2, pp. 1230-1249, Apr. 2022.
Ingraham, et al., "Leveraging User Preference in the Design and Evaluation of Lower-limb Exoskeletons and Prostheses", Current Opinion in Biomedical Engineering, vol. 28, Article No. 100487, 17 pages, Dec. 2023.
Ingraham, et al., "The Role of User Preference in the Customized Control of Robotic Exoskeletons", Science Robotics, vol. 7, Issue 64, 12 pages, Mar. 30, 2022.
Ishmael, et al., "Powered Hip Exoskeleton Improves Walking Economy In Individuals With Above-Knee Amputation", Nature Medicine, vol. 27, pp. 1783-1788, Oct. 11, 2021.
Kang, et al., "Electromyography (EMG) Signal Contributions in Speed and Slope Estimation Using Robotic Exoskeletons", 2019 IEEE 16th International Conference on Rehabilitation Robotics (ICORR), Toronto, ON, Canada, pp. 548-553, Jul. 29, 2019.
Kang, et al., "Real-Time Gait Phase Estimation for Robotic Hip Exoskeleton Control During Multimodal Locomotion", IEEE Robotics and Automation Letters, vol. 6 Issue 2, pp. 3491-3497, Apr. 2021.
Kang, et al., "Real-Time Neural Network-Based Gait Phase Estimation Using a Robotic Hip Exoskeleton", IEEE Transactions on Medical Robotics and Bionics, vol. 2, No. 1, pp. 28-37, Feb. 2020.
Kang, et al., "Subject-Independent Continuous Locomotion Mode Classification for Robotic Hip Exoskeleton Applications", IEEE Transactions on Biomedical Engineering, vol. 69, No. 10, pp. 3234-3242, Apr. 7, 2022.
Kantharaju, et al., "Reducing Squat Physical Effort Using Personalized Assistance From an Ankle Exoskeleton", IEEE Transactions on Neural Systems and Rehabilitation Engineering, vol. 30, pp. 1786-1795, 2022.
Karulkar, et al., "Personalized Estimation of Intended Gait Speed for Lower-Limb Exoskeleton Users via Data Augmentation Using Mutual Information", IEEE Robotics and Automation Letters, vol. 7, No. 4, pp. 9723-9730, Jul. 25, 2022.
Kim, et al., "Generating Synthetic Gait Patterns Based on Benchmark Datasets for Controlling Prosthetic Legs", Journal of NeuroEngineering and Rehabilitation, vol. 20, Article No. 115, 16 pages, Sep. 4, 2023.
Kim, "Human-in-the-loop Bayesian Optimization of Wearable Device Parameters", PLoS ONE, vol. 12, Issue 9, Article No. e0184054, 15 pages, Sep. 19, 2017.
Kim, et al., "Reducing the Metabolic Rate of Walking and Running with a Versatile, Portable Exosuit", Science, vol. 365, No. 6454, pp. 668-672, Aug. 16, 2019.
Koller, et al., "Learning to Walk with an Adaptive Gain Proportional Myoelectric Controller for a Robotic Ankle Exoskeleton", Journal of NeuroEngineering and Rehabilitation, vol. 12, Article No. 97, 14 pages, Nov. 4, 2015.
Laschowski, et al., "Environment Classification for Robotic Leg Prostheses and Exoskeletons Using Deep Convolutional Neural Networks", Frontiers in Neurorobotics, vol. 15, Article No. 730965, 17 pages, Feb. 4, 2022.
Laschowski, et al., "Preliminary Design of an Environment Recognition System for Controlling Robotic Lower-Limb Prostheses and Exoskeletons", 2019 IEEE 16th International Conference on Rehabilitation Robotics (ICORR), Toronto, ON, Canada, pp. 868-873, Jun. 2019.
Lee, et al., "Estimation of the Continuous Walking Angle of Knee and Ankle (Talocrural Joint, Subtalar Joint) of a Lower-Limb Exoskeleton Robot Using a Neural Network", Sensors 2021, vol. 21, No. 8, Article No. 2807, 16 pages, Apr. 16, 2021.
Lee, et al., "Real-Time User-Independent Slope Prediction Using Deep Learning for Modulation of Robotic Knee Exoskeleton Assistance", IEEE Robotics and Automation Letters, vol. 6, No. 2, pp. 3995-4000, Mar. 17, 2021.
Lee, et al., "User Preference Optimization for Control of Ankle Exoskeletons Using Sample Efficient Active Learning", Science Robotics, vol. 8, Issue 83, Oct. 18, 2023.
Lenton, et al., "Lower-limb Joint Work and Power are Modulated During Load Carriage Based on Load Configuration and Walking Speed", Journal of Biomechanics, vol. 83, pp. 174-180, Jan. 23, 2019.
Li, et al., "Gait Mode Recognition and Control for a Portable-powered Ankle-foot Orthosis", 2013 IEEE 13th International Conference on Rehabilitation Robotics (ICORR), Seattle, WA, USA, pp. 1-8, Jun. 24-26, 2013.
Liang, et al., "Deep-learning Model for the Prediction of Lower-limb Joint Moments Using Single Inertial Measurement Unit During Different Locomotive Activities", Biomedical Signal Processing and Control, vol. 86, Part C, Article No. 105372, Sep. 2023.
Liew, et al., "Comparing Shallow, Deep, and Transfer Learning in Predicting Joint Moments in Running", Journal of Biomechanics, vol. 129, Article No. 110820, 17 pages, Dec. 2, 2021.
Lim, et al., "Delayed Output Feedback Control for Gait Assistance With a Robotic Hip Exoskeleton", IEEE Transactions on Robotics, vol. 35, No. 4, pp. 1055-1062, May 16, 2019.
Lim, et al., "Prediction of Lower Limb Kinetics and Kinematics during Walking by a Single IMU on the Lower Back Using Machine Learning", Sensors 2020, vol. 20, No. 1, Article No. 130, 29 pages, Dec. 24, 2019.
Lin, et al., "Optimally Biomimetic Passivity-Based Control of a Lower-Limb Exoskeleton Over the Primary Activities of Daily Life", IEEE Open Journal of Control Systems, vol. 1, pp. 15-28, Apr. 12, 2022.
Lopes, et al., "Deep Learning-Based Energy Expenditure Estimation in Assisted and Non-Assisted Gait Using Inertial, EMG, and Heart Rate Wearable Sensors", Sensors 2022, vol. 22, No. 20, Article No. 7913, 15 pages, Oct. 18, 2022.
Malcolm, et al., "A Simple Exoskeleton That Assists Plantarflexion Can Reduce the Metabolic Cost of Human Walking", PloS One, vol. 8, Issue 2, e56137, 7 pages, Feb. 13, 2013.
Mao, et al., "Least Squares Generative Adversarial Networks", Proceedings of the IEEE International Conference on Computer Vision (ICCV), pp. 2794-2802, 2017.
Medrano, et al., "Can Humans Perceive the Metabolic Benefit Provided by Augmentative Exoskeletons?", Journal of NeuroEngineering and Rehabilitation, vol. 19, Article No. 26, 13 pages, Feb. 26, 2022.
Medrano, et al., "Real-Time Gait Phase and Task Estimation for Controlling a Powered Ankle Exoskeleton on Extremely Uneven Terrain", IEEE Transactions on Robotics, vol. 39, No. 3, pp. 2170-2182, Jan. 23, 2023.
Molinaro, et al., "Anticipation and Delayed Estimation of Sagittal Plane Human Hip Moments using Deep Learning and a Robotic Hip Exoskeleton", 2023 IEEE International Conference on Robotics and Automation (ICRA), London, United Kingdom, pp. 12679-12685, 2023.
Molinaro, et al., "Estimating Human Joint Moments Unifies Exoskeleton Control, Reducing User Effort", Science Robotics, vol. 9, Issue 88, Mar. 20, 2024.
Molinaro, et al., "Subject-Independent, Biological Hip Moment Estimation During Multimodal Overground Ambulation Using Deep Learning", IEEE Transactions on Medical Robotics and Bionics, vol. 4, No. 1, pp. 219-229, Feb. 2022.
Molinaro, et al., "Task-agnostic Exoskeleton Control Via Biological Joint Moment Estimation", Nature, vol. 635, pp. 337-344, Nov. 13, 2024.
Mooney, et al., "Autonomous Exoskeleton Reduces Metabolic Cost of Human Walking during Load Carriage", Journal of NeuroEngineering and Rehabilitation, vol. 11, Article No. 80, 11 pages, May 9, 2014.
Mu, et al., "Unsupervised Domain Adaptation for Position-Independent IMU Based Gait Analysis", 2020 IEEE Sensors, Rotterdam, Netherlands, pp. 1-4, Oct. 2020.

(56) References Cited

OTHER PUBLICATIONS

Mundt, et al., "A Comparison of Three Neural Network Approaches for Estimating Joint Angles and Moments from Inertial Measurement Units", Sensors 2021, vol. 21, No. 13, Article No. 4535, 14 pages, Jul. 1, 2021.
Nalam, et al., "Admittance Control Based Human-in-the-Loop Optimization for Hip Exoskeleton Reduces Human Exertion during Walking", 2022 International Conference on Robotics and Automation (ICRA), Philadelphia, PA, USA, pp. 6743-6749, May 2022.
Nuckols, et al., "Mechanics of Walking and Running Up and Downhill: A Joint-level Perspective to Guide Design of Lower-limb Exoskeletons", PLoS One, vol. 15, No. 8, 20 pages, Aug. 28, 2020.
Ordóñex, et al., "Deep Convolutional and LSTM Recurrent Neural Networks for Multimodal Wearable Activity Recognition", Sensors 2016, vol. 16, No. 1, Article No. 115, 25 pages, Jan. 18, 2016.
Orekhov, et al., "Ankle Exoskeleton Assistance Can Improve Over-Ground Walking Economy in Individuals With Cerebral Palsy", IEEE Transactions on Neural Systems and Rehabilitation Engineering, vol. 28, No. 2, pp. 461-467, Feb. 2020.
Orendurff, et al., "How Humans Walk: Bout Duration, Steps Per Bout, And Rest Duration", Journal of Rehabilitation Research & Development, vol. 45, No. 7, pp. 1077-1090, 2008.
Poggensee, et al., "How Adaptation, Training, and Customization Contribute to Benefits from Exoskeleton Assistance", Science Robotics, vol. 6, Issue 58, Sep. 29, 2021.
Qian, et al., "Predictive Locomotion Mode Recognition and Accurate Gait Phase Estimation for Hip Exoskeleton on Various Terrains", IEEE Robotics and Automation Letters, vol. 7, No. 3, pp. 6439-6446, May 10, 2022.
Reznick, et al., "Lower-limb Kinematics and Kinetics during Continuously Varying Human Locomotion", Scientific Data, vol. 8, Article No. 282, 12 pages, Oct. 28, 2021.
Ronneberger, et al., "U-Net: Convolutional Networks for Biomedical Image Segmentation", Medical Image Computing and Computer-Assisted Intervention—MICCAI 2015, pp. 234-241, Nov. 18, 2015.
Sawicki, et al., "The Exoskeleton Expansion: Improving Walking and Running Economy", Journal of NeuroEngineering and Rehabilitation, vol. 17, No. 1, 9 pages, Feb. 19, 2020.
Scherpereel, et al., "A Human Lower-limb Biomechanics and Wearable Sensors Dataset During Cyclic and Non-cyclic Activities", Scientific Data, vol. 10, Article No. 924, 12 pages, Dec. 21, 2023.
Scherpereel, et al., "Improving Biological Joint Moment Estimation During Real-World Tasks With EMG and Instrumented Insoles", IEEE Transactions on Biomedical Engineering, vol. 71, No. 9, pp. 2718-2727, Apr. 15, 2024.
Selinger, et al., "Estimating Instantaneous Energetic Cost During Non-steady-state Gait", Journal of Applied Physiology, vol. 117, Issue 11, pp. 1406-1415, Sep. 25, 2014.
Selinger, et al., "Humans Can Continuously Optimize Energetic Cost during Walking", Current Biology, vol. 25, Issue 18, pp. 2452-2456, Sep. 21, 2015.
Seo, et al., "Autonomous Hip Exoskeleton Saves Metabolic Cost of Walking Uphill", 2017 International Conference on Rehabilitation Robotics (ICORR), London, UK, pp. 246-251, 2017.
Seo, et al., "Fully Autonomous Hip Exoskeleton Saves Metabolic Cost of Walking", 2016 IEEE International Conference on Robotics and Automation (ICRA), Stockholm, Sweden, pp. 4628-4635, 2016.
Serrao, et al., "Dataset on Gait Patterns in Degenerative Neurological Diseases", Data in Brief, vol. 16, pp. 806-816, Feb. 2018.

\* cited by examiner

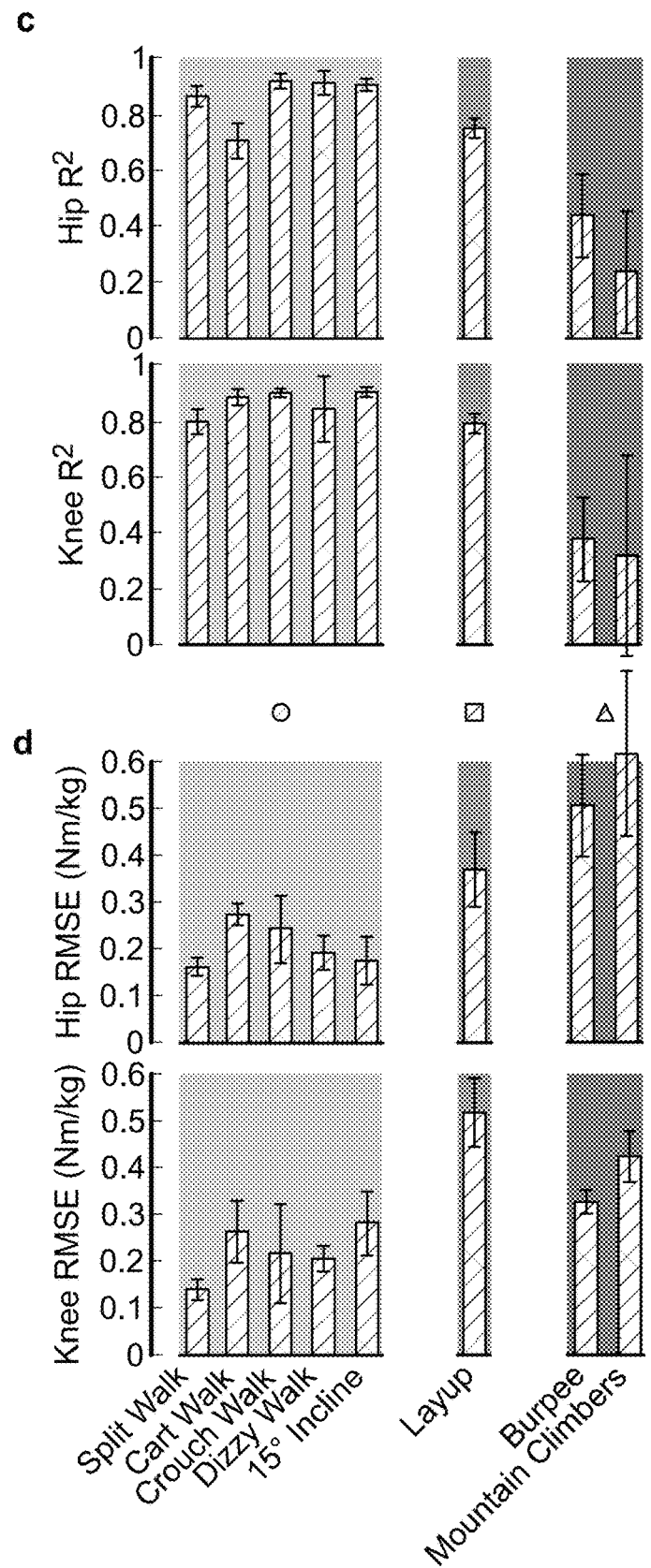
FIG. 6A (Cont. 1)

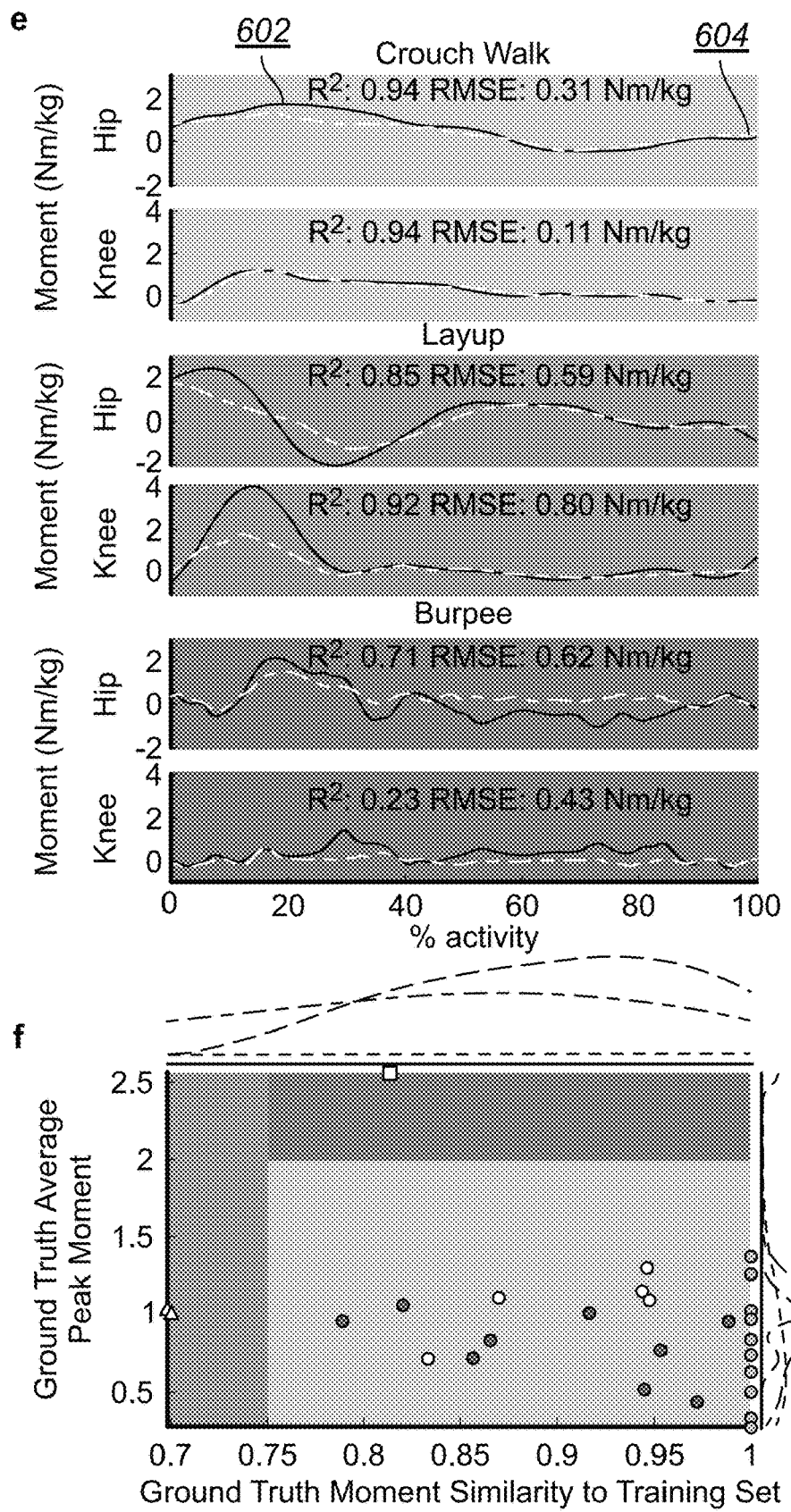
FIG. 6A (Cont. 2)

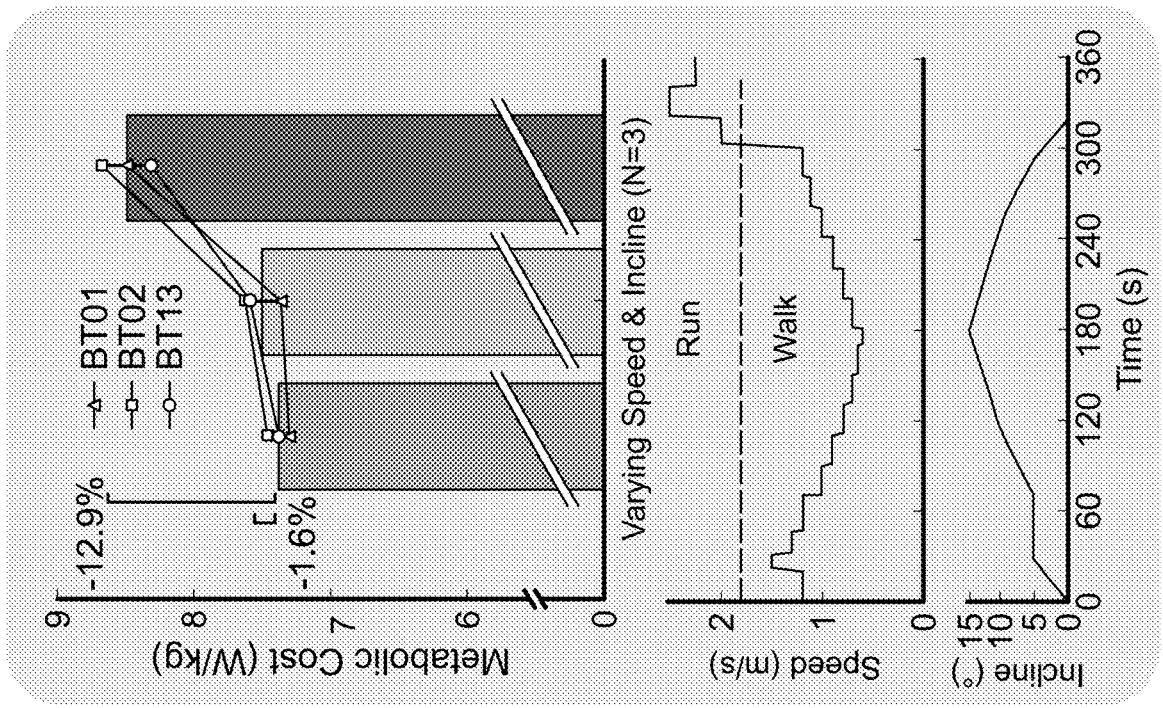
FIG. 6G (Cont. 1)

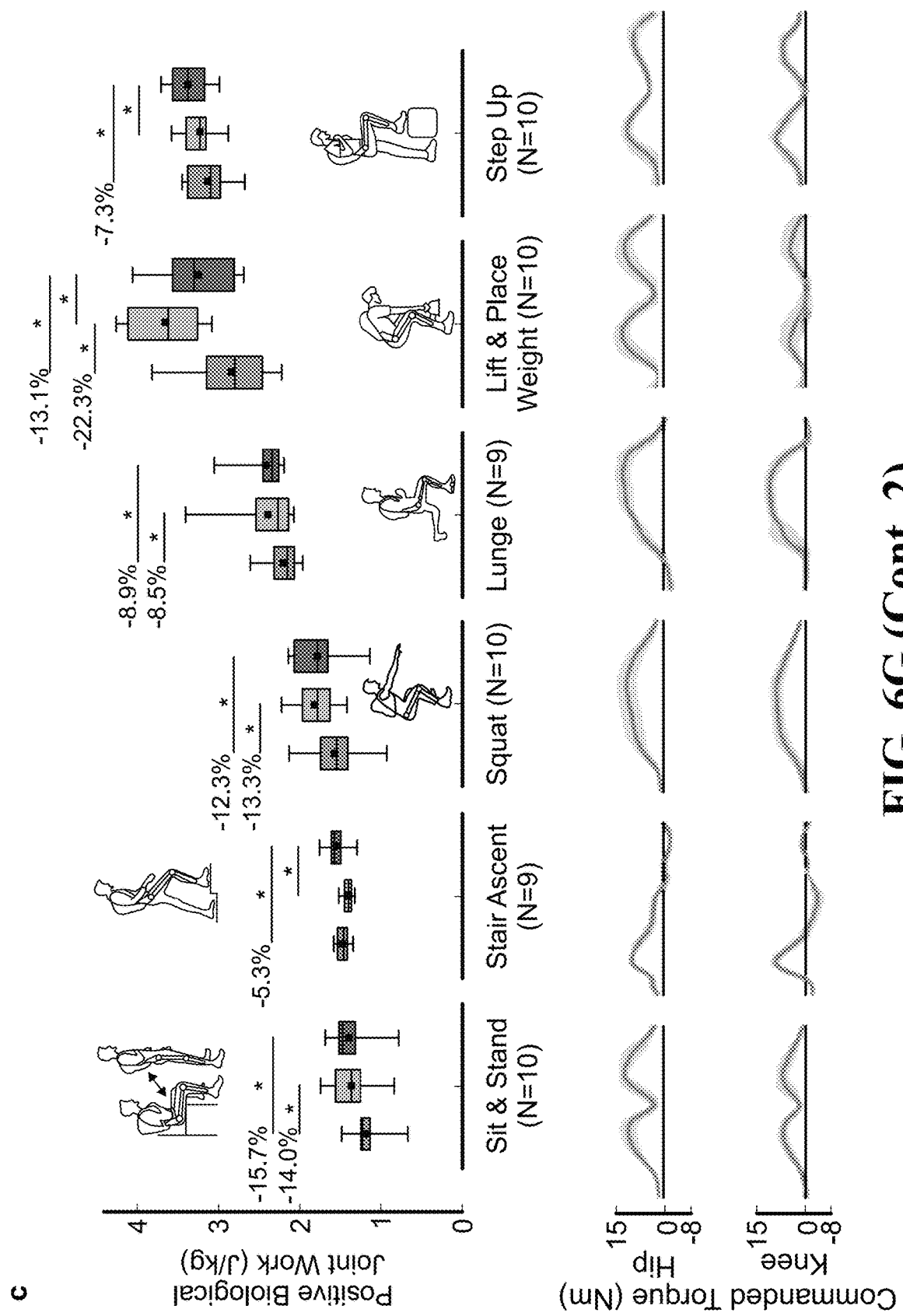
FIG. 6G (Cont. 2)

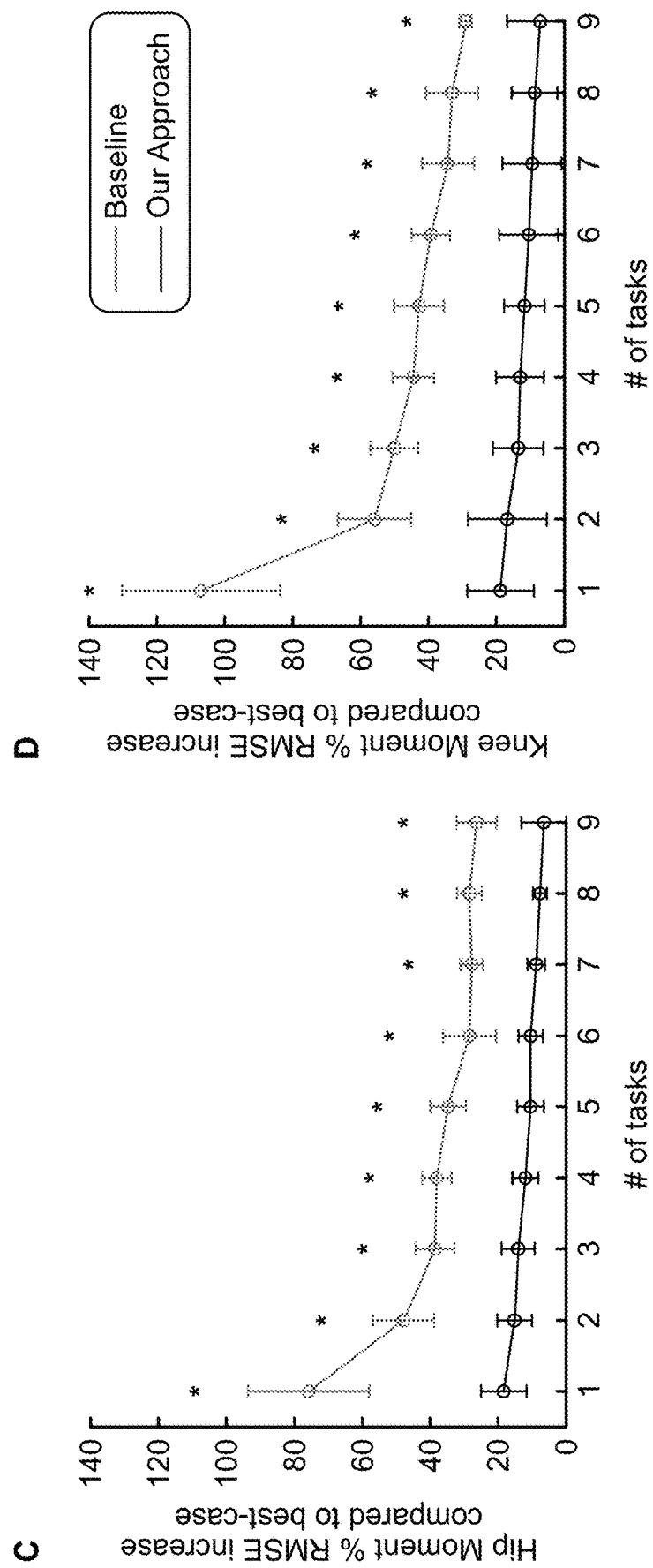
FIG. 8A (Cont. 1)

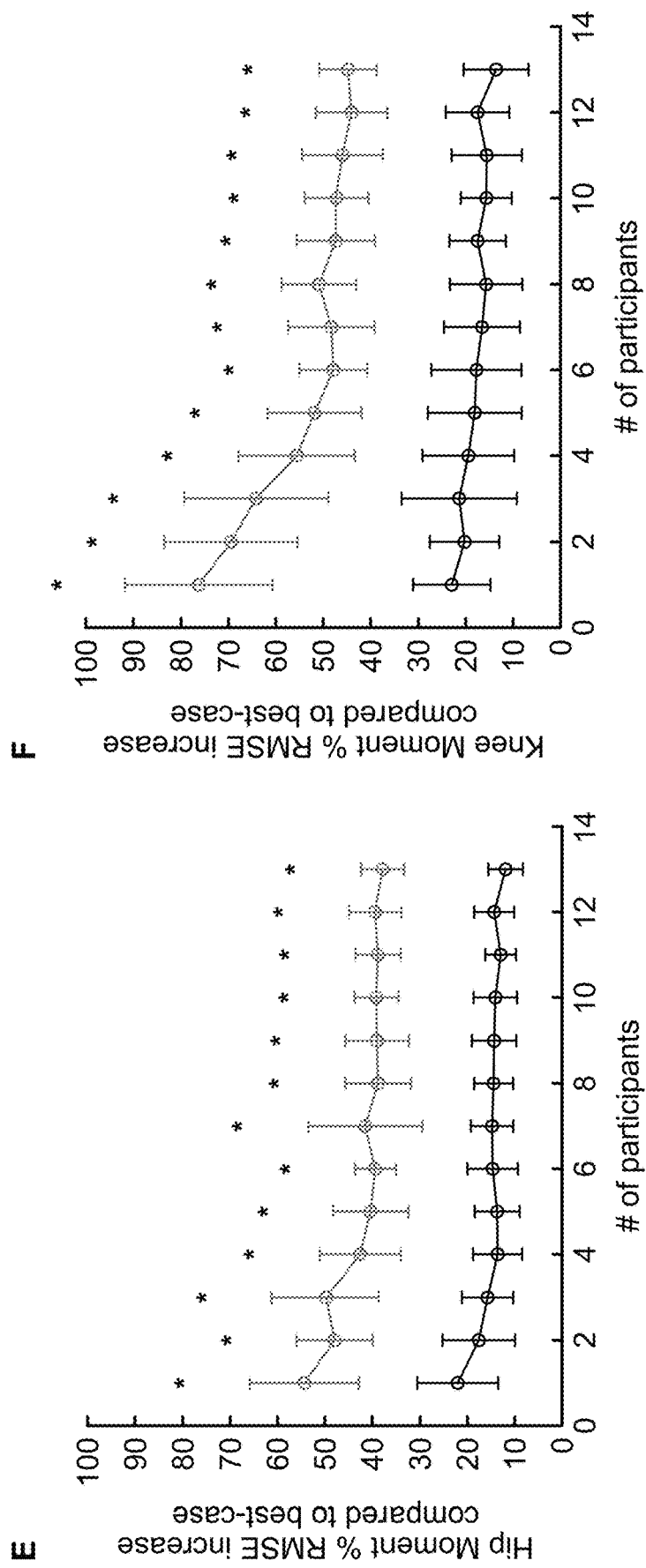
FIG. 8A (Cont. 2)

BIOMECHANICAL AND PHYSIOLOGICAL STATE ESTIMATION FOR TASK AGNOSTIC WEARABLE ROBOT CONTROL AND HUMAN MONITORING

STATEMENT REGARDING FEDERALLY SPONSORED RESEARCH OR DEVELOPMENT

This invention was made with government support under 1830215 and 1830215, awarded by the National Science Foundation. The government has certain rights in the invention.

BACKGROUND

Exoskeletons and motorized prostheses, coupled with state-of-the-art control systems, may assist people with their movements. Current state-of-the-art control systems employs classifiers that can identify specific intended tasks of interest from the user to improve or enhance the action of the user.

Additionally, task-specific datasets are expensive to build, not openly available, and not combinable with other dataset. The task-specific dataset includes single human behavior or a small set of human tasks. When state-of-the-art controllers employ a task-specific dataset, they must be optimized through extensive experimentation to be compatible with the task-specific data and can only accommodate a small set of tasks for users, offering little adaptability beyond the current design.

There is a benefit to improving exoskeletons and associated control systems.

SUMMARY

Exemplary task-agnostic exoskeleton control system and method are disclosed that are task-agnostic utilizing instantaneous estimates of biological joint moments from deep neural networks to assist the user movements. The exemplary control system employs multiple body sections and joints (e.g., both hip and knee moments) in-the-loop estimation to provide multi-joint assistance operation, e.g., within an autonomous, clothing-integrated exoskeleton. The exemplary control system may deploy a deep domain adaptation (DDA) method configured to translate human movement data between a simulated sensor domain and a real sensor domain. Examples of other body sections and joint estimations include, and are not limited to, ankle moments, lower back moments, shoulder moments, elbow moments, and wrist moments, among others.

With respect to task-agnostic control, the exemplary exoskeleton control system employs a full task-agnostic controller to enable full user-independent and task-agnostic control for exoskeleton systems. Human behaviors include more than predictable and specific movements, which may range from cyclic and predictable to transitory and unstructured. The full task-agnostic controller employs a full optimization of the network that has identified critical hyperparameters to enable and improve task-agnostic performance. The full task agnostic controller may include a series of many non-cyclic tasks in the dataset to provide widespread capability. The full task agnostic controller may employ mid-level control law operation to further improve the relatively task-agnostic operation. Experiments show the full task agnostic controller may estimate human physiological state in a task agnostic manner as well as augment human performance across numerous tasks.

Previous demonstrations of the technology were for assistive exoskeletons. Since human physiology is completely missing in the prosthesis domain (requiring complete replacement of a human joint with a robotic joint), it is not possible to simply base the control on the human biological moment as per previous work. However, end-to-end control may still be enabled. The exemplary full-task agnostic controller may learn based on the extensive able-bodied data set with simulated sensors equivalent to the prosthesis domain using a transfer learning framework to transfer simulated sensors into the real domain. This allows the full task agnostic controller to gain access to able-bodied dynamics during real-time prosthesis control. The prosthesis may emulate these dynamics, and it is expected to also optimize the relationship between able-bodied dynamics and optimal prosthesis control, similar to previous advances in exoskeleton technology. Thus, task-agnostic, end-to-end deep learning control may be learned for robotic prosthesis users.

The exemplary system and method may be applied to upper limb exoskeletons or prostheses. A multi-modal sensing system (comprised of proximity sensing, EMG, pressure contact sensors, and IMUs/encoder signaling) may be developed and trained to provide simultaneous and proportional control of multi-degrees of freedom across task domains (task/grasp agnostic). Using similar strategies, numerous users of data performing a huge range of activities of daily living with their arms in an instrumented lab may be collected where interacting forces and motion are being sensed, along with the wearable sensing. A large end-to-end model may be created to provide position control when the gripper is not in contact (posture selection/control) and then torque/force control when physically interacting with objects. This type of system may revolutionize upper limb systems by removing the non-intuitive control strategies currently being used, which are highly discrete and slow.

The task-agnostic mid-level control framework may drive changes in optimal control at the mid-level (defined as converting human physiological moment to the output command torque in the exoskeleton) to drive the controller with additional physiological states. Experimental results show that shaping the output based on muscle power is an advance to enable the mid-level controller to be optimal across tasks. The full task-agnostic controller may estimate muscle level dynamics, including muscle power, across key muscle groups in the lower limb to make the task-agnostic control paradigm much more usable and improve human augmentation to a greater extent than prior systems.

The full task agnostic controller may employ a transfer learning pipeline that employs data-driven models (such as the deep learning models we often use) to be used on new devices. The transfer learning pipeline may involve creating a 'simulated' domain to convert open-source datasets to provide a huge set of data for models. The pipeline may then use the combination of a translator (U-net architecture) with a GAN (generative adversarial network) to match our big data simulated domain with a sensor suite from a real device to employ the mixed huge datasets with devices that have little or even no labeled data and still maintain high levels of model performance. Experimental results show that such a pipeline may work with minimal loss with either a small amount of data from the novel domain (such as a new device) or even no labeled data. This represents a breakthrough because the pipeline may be used to practically deploy task-agnostic control models to any already developed device without the need to collect new training data. This same method may be used to add new tasks or new populations if such data pre-exists in the 'cloud' (e.g., open-source dataset featuring individuals with stroke or older age). The technology may broadly allow the data-driven models to scale to numerous real-world deployment problems where the ability to obtain high-quality labeled data is low or impossible.

In some aspects, the techniques described herein relate to a system including: a processor; and a memory having instructions stored thereon for a controller having a joint moment estimator, a muscle moment estimator, or a force estimator, wherein execution of the instructions by the processor causes the processor to: receive, via a control loop, sensor data from a robotic device or prosthetic device; determine, via a trained AI model, at least one of a physical state, muscle extension moments, or muscle extension forces using the sensor data as input to the trained AI model; and output, via the control loop, joint moment, muscle moment, or force estimates from the physical state, muscle extension moments, or muscle extension forces for use in controls of the robotic or prosthetic device or monitors of a user of the robotic device or prosthetic device.

In some aspects, the techniques described herein relate to a system, wherein the trained AI model (e.g., neural network) was trained using time-synchronized exoskeleton sensor data labeled with joint moment measurements or estimates for a number of cyclic and non-cyclic human activities.

In some aspects, the techniques described herein relate to a system, wherein the controller is implemented in a remote co-processor.

In some aspects, the techniques described herein relate to a system, wherein the joint moment/force estimator is implemented in a remote co-processor to determine total hip and knee flexion/extension moment values, at least, using measured actuator data, measured IMU data, and measured pressure insole data, as the sensor data, acquired from the robotic or prosthetic device (e.g., using the output of the trained AI model and subtracting measured actuator torques from a previous loop for each corresponding joint moment/force estimate).

In some aspects, the techniques described herein relate to a system, wherein the execution of the instructions by the processor further causes the processor to: determine a desired torque assistance value by: scaling joint moments estimates by an assistance offset value (e.g., between 15% and 20%); delaying scaled joint moments estimates by pre-defined offset value (e.g., 50 ms and 100 ms); and modulating sharpness and flatness of peaks of the delayed joint moment estimates.

In some aspects, the techniques described herein relate to a system, wherein the cyclic and non-cyclic human activities include at least 5 motions selected from the group consisting of: level ground walk, standing poses, push and pull, turn, cut, sit and stand, tug of war, jump across, twister, toe and heel walk, standing up, vertical jump, lunge, walk, skipping, medicine ball toss, lift a weight, step up, butt kicks, walk backward, wherein the cyclic and non-cyclic human activities were measured using hip position and configuration, shank position and configuration, thigh position and configuration, and knee position and configuration.

In some aspects, the techniques described herein relate to a system, wherein the cyclic activities include walking and running at different configurations (e.g., level ground walk, walking while carrying a weighted load, backward walking, toe and heel walking, inclined walking, declined walking, start ascent, stair decent, and running).

In some aspects, the techniques described herein relate to a system, wherein the non-cyclic activities include impedance action and unstructured action, wherein the impedance action includes at least one of standing poses, lunges, sit and stand, tug of war, medicine ball toss, step up, jump across, jump in place, life and place weight, and squats, and wherein the unstructured action includes at least one of start and stop, cut, step over, turn, meander, twister, push and pull recovery, calisthenics, and curb.

In some aspects, the techniques described herein relate to a system, wherein the trained AI model includes a temporal convolutional neural network (TCN).

In some aspects, the techniques described herein relate to a method including: receiving, via a control loop, sensor data from a robotic device or prosthetic device; determining, via a trained AI model, at least one of a physical state, muscle extension moments, or muscle extension forces using the sensor data as input to the trained AI model; and outputting, via the control loop, joint moment, muscle moment, or force estimates from the physical state, muscle extension moments, or muscle extension forces for use in controls of the robotic or prosthetic device or monitors of a user of the robotic device or prosthetic device.

In some aspects, the techniques described herein relate to a method, wherein the trained AI model (e.g., neural network) was trained using time-synchronized exoskeleton sensor data labeled with joint moment measurements or estimates for a number of cyclic and non-cyclic human activities.

In some aspects, the techniques described herein relate to a method, wherein the controller is implemented in a remote co-processor.

In some aspects, the techniques described herein relate to a method, wherein the joint moment/force estimator is implemented in a remote co-processor to determine total hip and knee flexion/extension moment values, at least, using measured actuator data, measured IMU data, and measured pressure insole data, as the sensor data, acquired from the robotic or prosthetic device (e.g., using the output of the trained AI model and subtracting measured actuator torques from a previous loop for each corresponding joint moment/force estimate).

In some aspects, the techniques described herein relate to a method, wherein the hyperparameters of the estimator are optimized to promote generalization to tasks previously unseen by the estimator.

In some aspects, the techniques described herein relate to a method, wherein the training data is included of a set of tasks that promote task generalization, which were selected by a task selection algorithm.

In some aspects, the techniques described herein relate to a method, wherein the exoskeleton sensors are selected by a sensor selection algorithm.

In some aspects, the techniques described herein relate to a method, further including: determining a desired torque assistance value by: scaling biological joint moments estimates by an assistance offset value (e.g., between 15% and 20%); delaying scaled biological joint moment estimates by a pre-defined offset value (e.g., 50 ms and 100 ms); and modulating sharpness and flatness of peaks of the delayed biological joint moment estimates.

In some aspects, the techniques described herein relate to a method, wherein the cyclic and non-cyclic human activities include a motion selected from the group consisting of: level ground walk, standing poses, push and pull, turn, cut, sit and stand, tug of war, jump across, twister, toe and heel walk, standing up, vertical jump, lunge, walk, skipping, medicine ball toss, lift a weight, step up, butt kicks, walk backward, wherein the cyclic and non-cyclic human activities were measured using hip position and configuration, shank position and configuration, thigh position and configuration, and knee position and configuration.

In some aspects, the techniques described herein relate to a method, wherein the cyclic activities include walking and running at different configurations (e.g., level ground walk, walking while carrying a weighted load, backward walking, toe and heel walking, inclined walking, declined walking, start ascent, stair descent, and running).

In some aspects, the techniques described herein relate to a method, wherein the non-cyclic activities include impedance action and unstructured action, wherein the impedance action includes at least one of standing poses, lunges, sit and stand, tug of war, medicine ball toss, step up, jump across, jump in place, lift and place weight, and squats, and wherein the unstructured action includes at least one of start and stop, cut, step over, turn, meander, twister, push and pull recovery, calisthenics, and curb.

In some aspects, the techniques described herein relate to a method, wherein the trained AI model includes a temporal convolutional neural network (TCN).

In some aspects, the techniques described herein relate to a non-transitory computer-readable medium having instructions stored thereon, wherein execution 1-9.

In some aspects, the techniques described herein relate to a joint moment/force estimator including: a processor; and a memory having instructions stored thereon, wherein execution of the instructions by the processor causes the processor to: receive sensor data from a robotic or prosthetic device; determine, via a trained AI model, at least one of a physical state, muscle extension moments, or muscle extension forces using the sensor data as input to the trained AI model; and output, via the control loop, joint moment, muscle moment, or force estimates from the physical state, muscle extension moments, or muscle extension forces for use in controls of the robotic or prosthetic device or monitors of a user of the robotic device or prosthetic device.

In some aspects, the techniques described herein relate to a method for configuring a controller by: receiving biomechanical data; generating simulated sensor data using a translator network to simulate sensors for a transferred device using the received biomechanical data generated using physics-based simulation software, where the simulation is performed at body segments for positions, for forces, and/or for velocities constrained or defined on the same body segment for a target device to provide paired data of (i) the sensor data of the target device and (ii) the biomechanical data, wherein the paired data is used for training of at least one neural network; and training the at least one neural network (e.g., autoencoder), wherein the neural network is configured to map the simulated data associated with the biomechanical data to real data associated with the sensor data.

In some aspects, the techniques described herein relate to a method further including: configuring a joint moment/force estimator by: receiving, via a control loop, sensor data from a robotic or prosthetic device; determining, via a trained AI model, at least one of a physical state, muscle extension moments, or muscle extension forces using the sensor data as input to the trained AI model; and outputting, via the control loop, joint moment, muscle moment, or force estimates from the physical state, muscle extension moments, or muscle extension forces for use in controls of the robotic or prosthetic device or monitors of a user of the robotic device or prosthetic device.

In some aspects, the techniques described herein relate to a method, wherein the at least one neural network forms in part: a first GAN configured to generate the real data associated with the sensor data; or a second GAN configured to generate simulated data associated with the biomechanical data.

In some aspects, the techniques described herein relate to a method, wherein the first GAN and second GAN collectively form a translator network, wherein the translator network is set up in a bidirectional CycleGAN.

In some aspects, the techniques described herein relate to a method, wherein the training of the at least one neural network employs supervised loss, cycle consistency loss, GAN loss, and reconstruction loss.

In some aspects, the techniques described herein relate to a method, wherein the reconstruction loss is computed using error value (e.g., mean squared error (MSE)) normalized by sensor modality weighted equally in reconstruction (e.g., wherein, each sensor modality, e.g., thigh acceleration or shank angular velocity, are weighed equally in reconstruction, and individual vector components (e.g., thigh x acceleration or thigh y acceleration) are weighed by a maximum value across all components of that modality).

In some aspects, the techniques described herein relate to a method, wherein the cycle consistency loss is computed by matching (i) simulated data associated with the biomechanical data that was passed through both a sim-to-real translator and then a real-to-sim translator to (ii) the original data.

In some aspects, the techniques described herein relate to a method, wherein a least squares objective is employed as a loss function for each GAN of the at least one neural network.

In some aspects, the techniques described herein relate to a method, wherein the training of the at least one neural network further employs identity loss that ensures data from one domain passed through the neural network to that same domain itself.

In some aspects, the techniques described herein relate to a method, wherein the training of the at least one neural network further employs a moment loss determined from real data and estimate of a user's biological moment, wherein samples used to train a portion of the network having the moment loss include translated data from biomechanics datasets with respective labels (e.g., wherein in semi-supervised case using any available labeled real exoskeleton data with respective moment labels).

In some aspects, the techniques described herein relate to a method, wherein the training determines a total loss for a translator portion of the network as a weighed sum of loss components.

In some aspects, the techniques described herein relate to a method, wherein the training uses (i) unlabeled, unpowered exoskeleton data collected from a human user wearing a specific target device and (ii) labeled human biomechanics data collected without an exoskeleton.

In some aspects, the techniques described herein relate to a method, wherein the body segment positions, forces, and/or velocities are time-aligned via external data (e.g., motion sensor, force plates, time match data between simulated and real domain).

In some aspects, the techniques described herein relate to a system including: a processor; and a memory having instructions stored thereon for configuring a controller, wherein execution of the instructions by the processor causes the processor to: receive biomechanical data; generate simulated sensor data using a translator network to simulate sensors for a transferred device using the received biomechanical data generated using physics-based simulation software, where the simulation is performed at body segments for positions, for forces, and/or for velocities constrained or defined on the same body segment for a target device to provide paired data of (i) the sensor data of the target device and (ii) the biomechanical data, wherein the paired data is used for training of at least one neural network; and train the at least one neural network (e.g., autoencoder), wherein the neural network is configured to map the simulated data associated with the biomechanical data to real data associated with the sensor data.

In some aspects, the techniques described herein relate to a system, wherein execution of the instructions by the processor further causes the processor to: configure a joint moment/force estimator by: receiving, via a control loop, sensor data from a robotic or prosthetic device; determining, via a trained AI model, at least one of a physical state, muscle extension moments, or muscle extension forces using the sensor data as input to the trained AI model; and outputting, via the control loop, joint moment, muscle moment, or force estimates from the physical state, muscle extension moments, or muscle extension forces for use in controls of the robotic or prosthetic device or monitors of a user of the robotic device or prosthetic device.

In some aspects, the techniques described herein relate to a system, wherein the at least one neural network forms in part: a first GAN configured to generate the real data associated with the sensor data; or a second GAN configured to generate simulated data associated with the biomechanical data.

In some aspects, the techniques described herein relate to a system, wherein the first GAN and second GAN collectively form a translator network, wherein the translator network is set up in a bidirectional CycleGAN.

In some aspects, the techniques described herein relate to a system, wherein the training of the at least one neural network employs supervised loss, cycle consistency loss, GAN loss, and reconstruction loss.

In some aspects, the techniques described herein relate to a system, wherein the reconstruction loss is computed using an error value (e.g., mean squared error (MSE)) normalized by sensor modality weighed equally in reconstruction (e.g., wherein each sensor modality, e.g., thigh acceleration or shank angular velocity, is weighed equally in reconstruction, and individual vector components (e.g., thigh x acceleration or thigh y acceleration) are weighed by a maximum value across all components of that modality).

In some aspects, the techniques described herein relate to a system, wherein the cycle consistency loss is computed by matching (i) the simulated data associated with the biomechanical data that was passed through both a sim-to-real translator and then a real-to-sim translator to (ii) the original data.

In some aspects, the techniques described herein relate to a system, wherein the body segment positions, forces, and/or velocities are time-aligned via external data (e.g., motion sensor, force plates, time match data between simulated and real domain).

In some aspects, the techniques described herein relate to a joint moment/force estimator including: a processor; and a memory having instructions stored thereon, wherein execution of the instructions by the processor causes the processor to: receive sensor data from a robotic or prosthetic device; determine, via a trained AI model, at least one of a physical state, muscle extension moments, or muscle extension forces using the sensor data as input to the trained AI model; and output, via the control loop, joint moment, muscle moment, or force estimates from the physical state, muscle extension moments, or muscle extension forces for use in controls of the robotic or prosthetic device or monitors of a user of the robotic device or prosthetic device.

BRIEF DESCRIPTION OF THE DRAWINGS

FIGS. 1A-1B each shows an example task-agnostic control system configured for a robotic/prosthetic device, wherein the control system employs sensors, a monitor, an actuator/motor, and a controller having a processor, a joint moment/force estimator, and a trained artificial intelligence (AI) model.

FIG. 2 shows an example operation flow for the exemplary task-agnostic control system.

FIG. 3A shows an example task-agnostic control system configured for gait phase estimation (i.e., joint moment estimation).

FIG. 3B shows an example deep neural network training and deployment method for the joint moment estimation.

FIG. 3C shows an example task (i.e., activity) breakdown of the exoskeleton dataset labeled with ground-truth biomechanics.

FIG. 3D shows an example task selection operation configured to maximize the relative improvement in model generalization across tasks for the joint moment estimator.

FIG. 4A shows an example control system employing human-in-the-loop optimization (i.e., HILO system) operating a temporal convolutional neural network (TCN) and an optimizer (e.g., Bayesian) on an exoskeleton.

FIG. 4B shows an example operation to transform a subject's biological hip joint moment to exoskeleton assistance torque in human-in-the-loop optimization.

FIG. 5A shows an example deep domain adaptation (DDA) control system employing a physics-based simulation software, a translator network, real sensor data for the transferred device, sensors from a target device, and a joint moment/force estimator. FIG. 5B shows an example generative adversarial network (GAN) training module employed by a translator network of the exemplary DDA control system to train a neural network (e.g., GAN). FIG. 5C shows an example operation flow of the exemplary deep domain adaptation (DDA) control system. FIG. 5D shows an example deep domain adaption (DDA) method for replacing costly device-specific data with less costly data. FIG. 5E shows an example deep domain adaptation system for training the translator and downstream moment estimator.

FIG. 6A shows the novel task analysis for the training dataset for the exemplary estimator. FIG. 6B shows sensor ablation and dropout conditions for the joint moment estimation. FIG. 6C shows training models including labeled exoskeleton data (semi-supervised), wherein each model included four tasks. FIG. 6D shows the online joint moment estimation performance, e.g., coefficient of determination ($R^2$), root mean square error (RMSE), and normalized mean absolute error (MAE), between the exemplary estimator and baseline method. FIG. 6E shows the detailed online joint moment estimation performance between the exemplary estimator and the baseline methods. FIG. 6F shows the summary results of online joint moment estimation (e.g., RMSE, normalized MAE, and frequency of immoderate moment estimates). FIG. 6G shows the human outcome performance under 3 conditions, e.g., wearing the exoskeleton with the fabricated control system (Exo On), without wearing the exoskeleton (No Exo), and wearing the exoskeleton without actuation (Zero Torque). FIG. 6H shows the lower limb joint angle comparison between joint work activities performed by the participants under 3 conditions (e.g., Exo On, No Exo, Zero Torque).

FIG. 7A shows a graphical representation of the exoskeleton control parameter space and the exoskeleton assistance torque profiles generated by control parameters. FIG. 7B shows the convergence analysis graph of the human-in-the-loop Bayesian optimization across all 3 ambulation modes (e.g., level ground 1.5 m/s, level ground 1.1 m/s, 5° incline 1.1 m/s). FIG. 7C shows metabolic landscapes for each subject and 3 walking conditions, including fast-level ground walking, slow-level ground walking, and inclined walking, and averaged over all 3 walking conditions derived from the experimental data. FIG. 7D shows the average metabolic results in groups of the 3 ambulation conditions (e.g., level ground 1.5 m/s, level ground 1.1 m/s, 5° incline 1.1 m/s). FIG. 7E shows the multi-modal peak exoskeleton torque for each subject, the average torque provided by the exoskeleton, the peak power provided by the exoskeleton, and the average positive power provided by the exoskeleton. FIG. 7F shows the preference landscapes for fast-level ground walking, slow-level ground walking and inclined walking using the pairwise comparison queried from subjects during the HIL optimization.

FIG. 8A shows the task optimization and performance across limited task and participant training sets. FIG. 8B shows the offline model performance for the exemplary moment estimators trained with translated sensors. FIG. 8C shows real-time model performance for moment estimators trained on translated data. FIG. 8D shows the real-time deployed model performance broken into specific tasks. FIG. 8E shows the accurate tracking of joint moments for the semi-supervised and unsupervised models through representative time-series plots from a single cycle of each type of activity.

DETAILED DESCRIPTION

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the list. For example, [1] refers to the first reference in the list. All references cited and discussed in this specification are incorporated herein by reference in their entirety and to the same extent as if each reference was individually incorporated by reference.

EXAMPLE SYSTEM #1—TASK-AGNOSTIC CONTROL SYSTEM

State-of-the-art controllers on exoskeletons cannot accommodate the rich set of possible human behaviors, which range from cyclic and predictable to transitory and unstructured. The exemplary control system may assist the user based on instantaneous estimates of lower-limb biological joint moments from a deep neural network. By estimating both hip and knee moments in the loop, the exemplary control system may provide multi-joint assistance through exoskeletons.

Figure 1A:
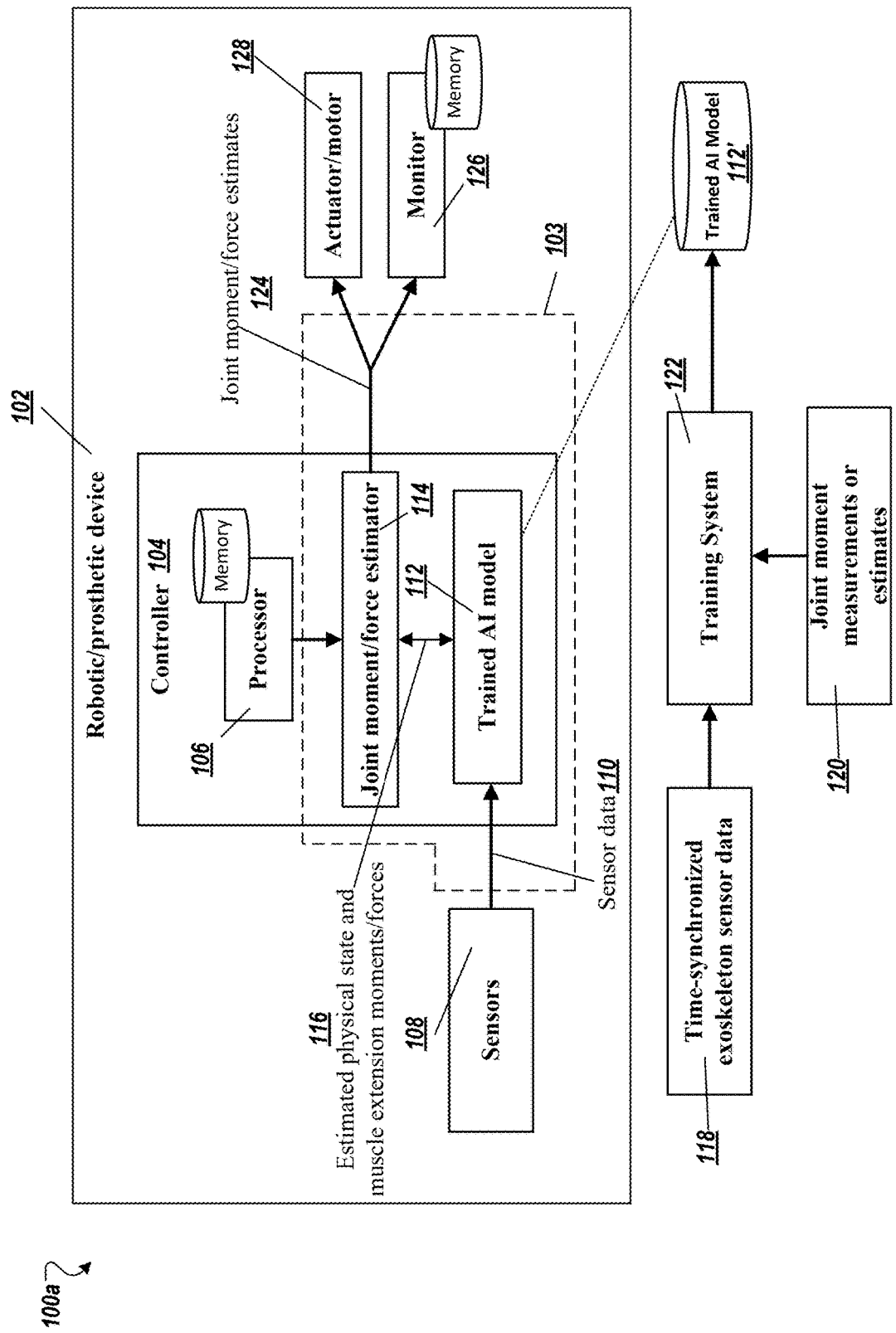
FIGS. 1A, 1B, 2, 3A, 3B, 3C, 3D, 4A, and 4B show an example task-agnostic control system in accordance with a first illustrative embodiment employing a trained joint moment/force estimator.
Figure 1B:
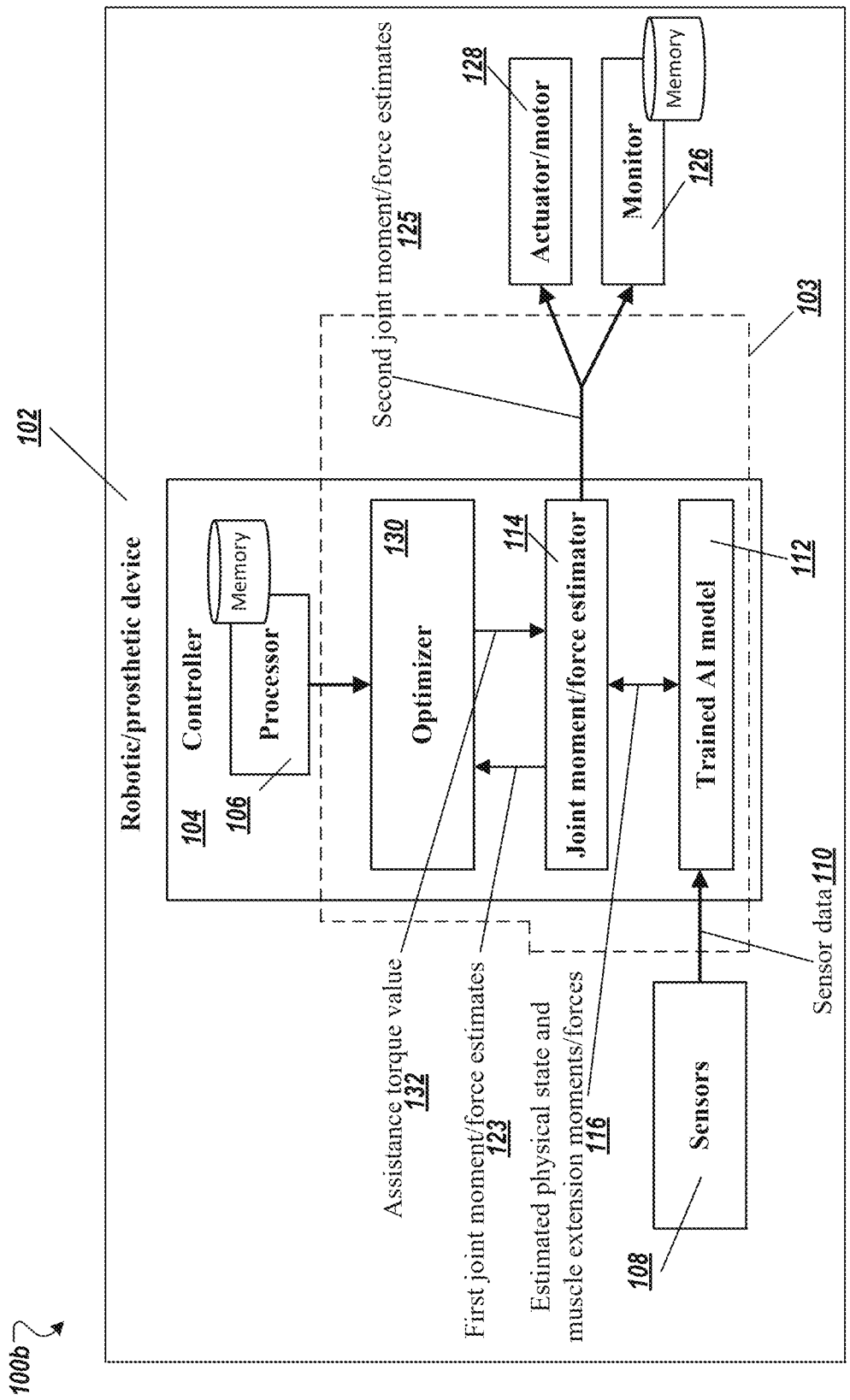

FIGS. 1A-1B each shows an example task-agnostic control system configured for a robotic/prosthetic device, wherein the control system employs sensors, a monitor, an actuator/motor, and a controller having a processor, a joint moment/force estimator, and a trained artificial intelligence (AI) model. FIG. 1B shows an additional optimizer (e.g., Human-in-the-Loop Bayesian optimizer) configured to provide an assistance torque value to the joint moment/force estimator to generate better joint moment/force estimates.

FIG. 1A shows an example control system 100a configured for a robotic/prosthetic device 102, wherein the control system 100a employs the sensors 108, the monitor 126, the actuator/motor 128, and the controller 104 having the processor 106, the trained AI model 112 (shown as 112'), and the joint moment/force estimator 114. The execution of the instructions stored on the memory coupled with the processor 106 causes the processor to perform corresponding actions via the controller 104 as subsequently shown.

The controller 104, via a control loop 103, may receive sensor data 110 from the sensors 108 of the robotic/prosthetic device 102. The trained AI model 112, operating on the controller 104, is configured to determine the estimated physical state and muscle extension moments or forces 116 using the sensor data 110 as input to the trained AI model 112.

The joint moment/force estimator 114, coupled with the trained AI model 112 and operating on the controller 104, may (i) receive the estimated physical state and muscle extension moments or forces 116 and (ii) output, via the control loop 103, joint moment/force estimates 124 to the monitor 126 and the actuator/motor 128. The controller 104 may, via the control loop 103, display and store the joint moment/force estimates 124 on the monitor 126. The controller 104 may also, via the control loop 103, operate the actuator/motor 128 using the joint moment/force estimates 124.

The trained AI model 112' (e.g., neural network) may be generated from a training system 122, wherein the training system 122 may receive and label time-synchronized exoskeleton sensor data 118 with joint moment measurements and estimates 120 for a number of cyclic and non-cyclic human activities. The trained AI model 112' may comprise a temporal convolutional neural network (TCN) in the training system 122.

FIG. 1B shows an example control system 100b configured for a robotic/prosthetic device 102, wherein the control system 100a employs the sensors 108, the monitor 126, the actuator/motor 128, and the controller 104 having the processor 106, the trained AI model 112, the joint moment/force estimator 114, and the optimizer 130. The execution of the instructions stored on the memory coupled with the processor 106 causes the processor to perform corresponding actions via the controller 104 as subsequently shown.

The controller 104, via a control loop 103, may receive sensor data 110 from the sensors 108 of the robotic/prosthetic device 102. The trained AI model 112, operating on the controller 104, is configured to determine the estimated physical state and muscle extension moments or forces 116 using the sensor data 110 as input to the trained AI model 112.

The joint moment/force estimator 114, coupled with the trained AI model 112 and operating on the controller 104, may (i) receive the estimated physical state and muscle extension moments or forces 116 and (ii) output, via the control loop 103, first joint moment/force estimates 123 to the optimizer 130.

The optimizer 130, coupled with the joint moment/force estimator 114, may receive the first joint moment/force estimates 123 and determines a torque assistance value 132 by (i) scaling the first joint moment/force estimates 123 by an assistance offset value (e.g., between 15% and 20%), (ii) delaying the first joint moment/force estimates 123 by a pre-defined offset value (e.g., 50 ms and 100 ms), and (iii) modulating sharpness and flatness of peaks of the first joint moment/force estimates 123. Then, the optimizer 130 may transmit the assistance torque value 132 to the joint moment/force estimator 114.

The joint moment/force estimator 114, coupled with the optimizer 130, may generate second joint moment/force estimates 125 using the first joint moment/force estimates 123 and the assistance torque value 132. The controller 104 may, via the control loop 103, display and store the second joint moment/force estimates 125 on the monitor 126. The controller 104 may also, via the control loop 103, operate the actuator/motor 128 using the second joint moment/force estimates 124.

In both control systems 100a and 100b shown in FIGS. 1A-1B, the controller 104 may be implemented in a remote co-processor. The joint moment/force estimator may be implemented in a remote co-processor to estimate total hip and knee flexion/extension moment or force values 124, at least, using measured actuator data, measured IMU data, and measured pressure insole data, as the sensor data 110, acquired from the robotic or prosthetic device 102 (e.g., using the output of the trained AI model 112 and subtracting measured actuator torques from a previous control loop for each corresponding joint moment/force estimate 124).

The cyclic and non-cyclic human activities may include at least 5 motions selected from the group consisting of: level ground walk, standing poses, push and pull, turn, cut, sit and stand, tug of war, jump across, twister, toe and heel walk, standing up, vertical jump, lunge, walk, skipping, medicine ball toss, lift a weight, step up, butt kicks, walk backward, wherein the cyclic and non-cyclic human activities may be measured using hip position and configuration (e.g., velocity), shank position and configuration (e.g., velocity), thigh position and configuration (e.g., velocity), and knee position and configuration (e.g., velocity).

The cyclic activities may include walking and running at different configurations (e.g., level ground walking, walking while carrying a weighted load, backward walking, toe and heel walking, inclined walking, declined walking, start ascent, stair descent, and running).

The non-cyclic activities may include impedance action and unstructured action, wherein the impedance action may include at least one of standing poses, lunges, sit and stand, tug of war, medicine ball toss, step up, jump across, jump in place, life and place weight, and squats, and wherein the unstructured action may include at least one of start and stop, cut, step over, turn, meander, twister, push and pull recovery, calisthenics, and curb.

Figure 2:
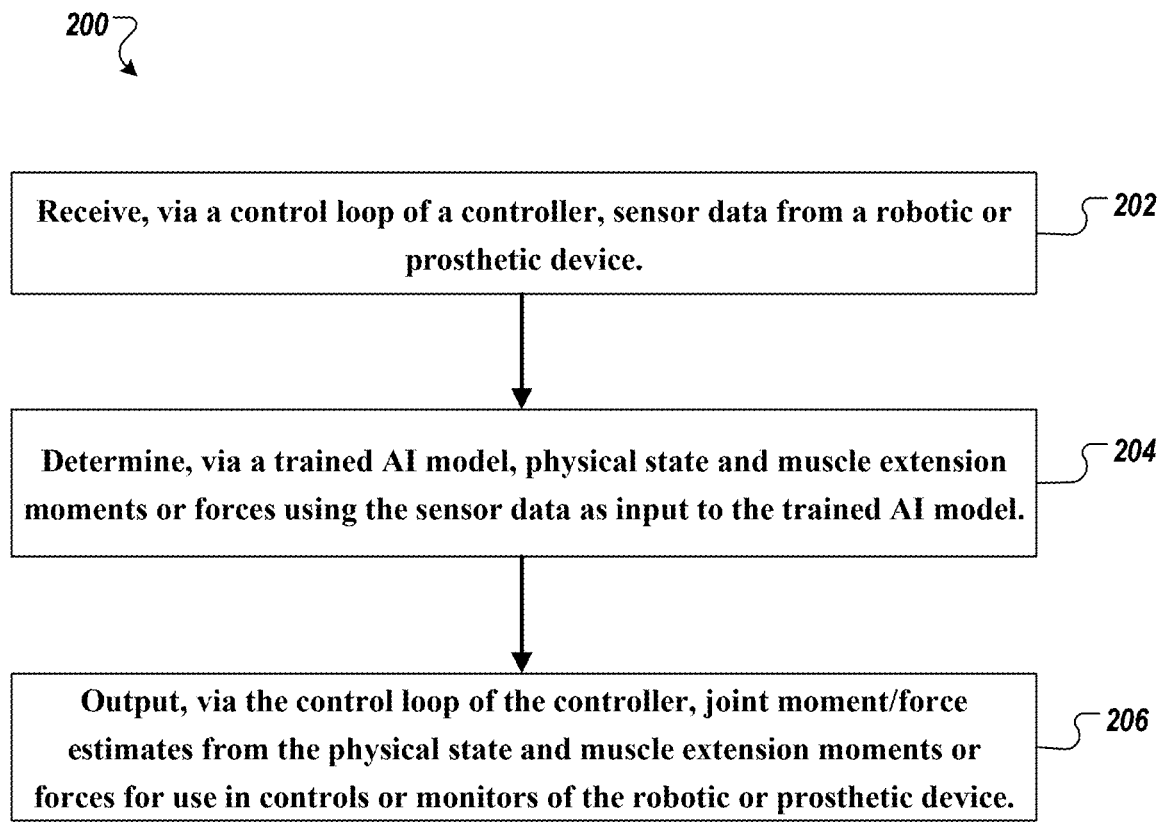

Example method. FIG. 2 shows an example operation flow 200 for the exemplary task-agnostic control system, which may include 3 steps. At step 202, the exemplary control system may receive, via a control loop for a controller, sensor data from a robotic or prosthetic device.

At step 204, the exemplary control system may determine, via a trained AI model, physical state and muscle extension moments or forces using the sensor data as input to the trained AI model.

At step 206, the exemplary control system may output, via the control loop of the controller, joint moment/force estimates from the physical state and muscle extension moments or forces for use in controls or monitors of the robotic or prosthetic device.

Figure 3A:
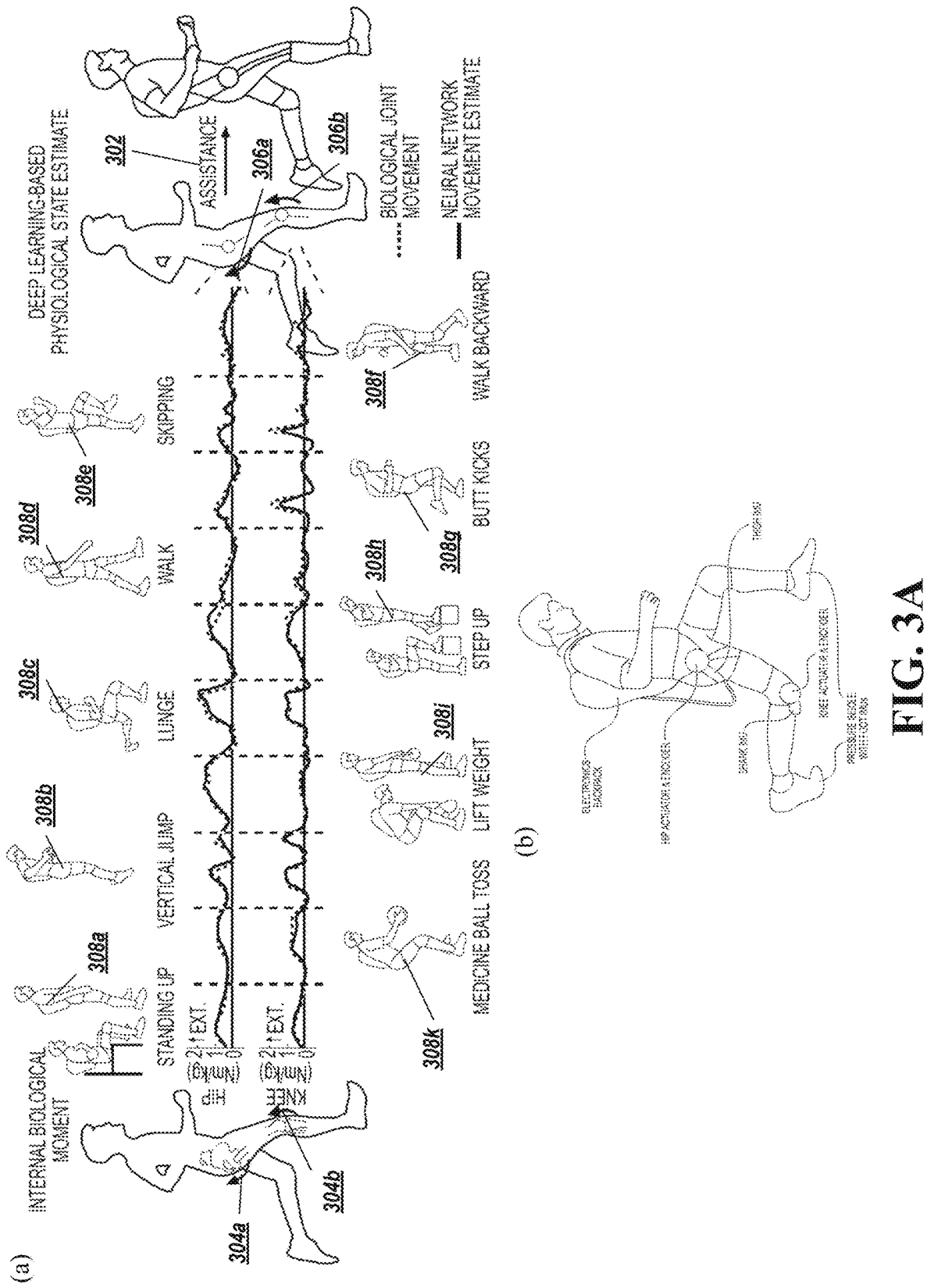

Task-agnostic exoskeleton control system. FIG. 3A shows an example task-agnostic exoskeleton control system (i.e., exemplary control system) configured for gait phase estimation.

As shown in subpanel (a), the exemplary system may provide assistive torque to the hip and knee using an estimate (e.g., 306a, 306b) of the user's biological joint moments (e.g., 304a, 304b) from a deep neural network. By basing assistance on a continuous physiological variable, no task classification is required; the same control law may effectively assist across the full range of human movement. The time series shown illustrates the average performance of the exemplary system with representative participant-averaged curves on the tasks shown.

Subpanel (b) shows an autonomous hip/knee exoskeleton of the exemplary system configured to capture a rich set of sensing modalities and then assist across a wide range of mobility tasks. Compact quasi-direct drive actuators mounted coaxially with the hip and knee may provide up to 15 Nm of assistance at each joint. The semi-rigid structure may consist of carbon fiber and 3D-printed nylon orthotics on which the actuators and sensors may be mounted. 6 inertial measurement units (IMUs), joint encoders on the hips and knees, and a pair of wireless force-sensitive insoles may provide real-time human movement data for the joint moment estimator, with the IMUs being configured for joint moment estimation.

Biological joint moment estimation. The exemplary control system employs a neural network-based joint moment estimator, which may run onboard the exoskeleton. The neural network may be trained on a diverse dataset of time-synced exoskeleton sensor data and ground-truth joint moments so the control system may accurately estimate user joint moments during 28 cyclic and non-cyclic human activities when deployed online. Further, the exemplary control system may reduce metabolic cost and lower-limb biological joint work relative to a no-assistance condition in all tested activities without any manual user or experimenter intervention between activities.

Figure 3B:
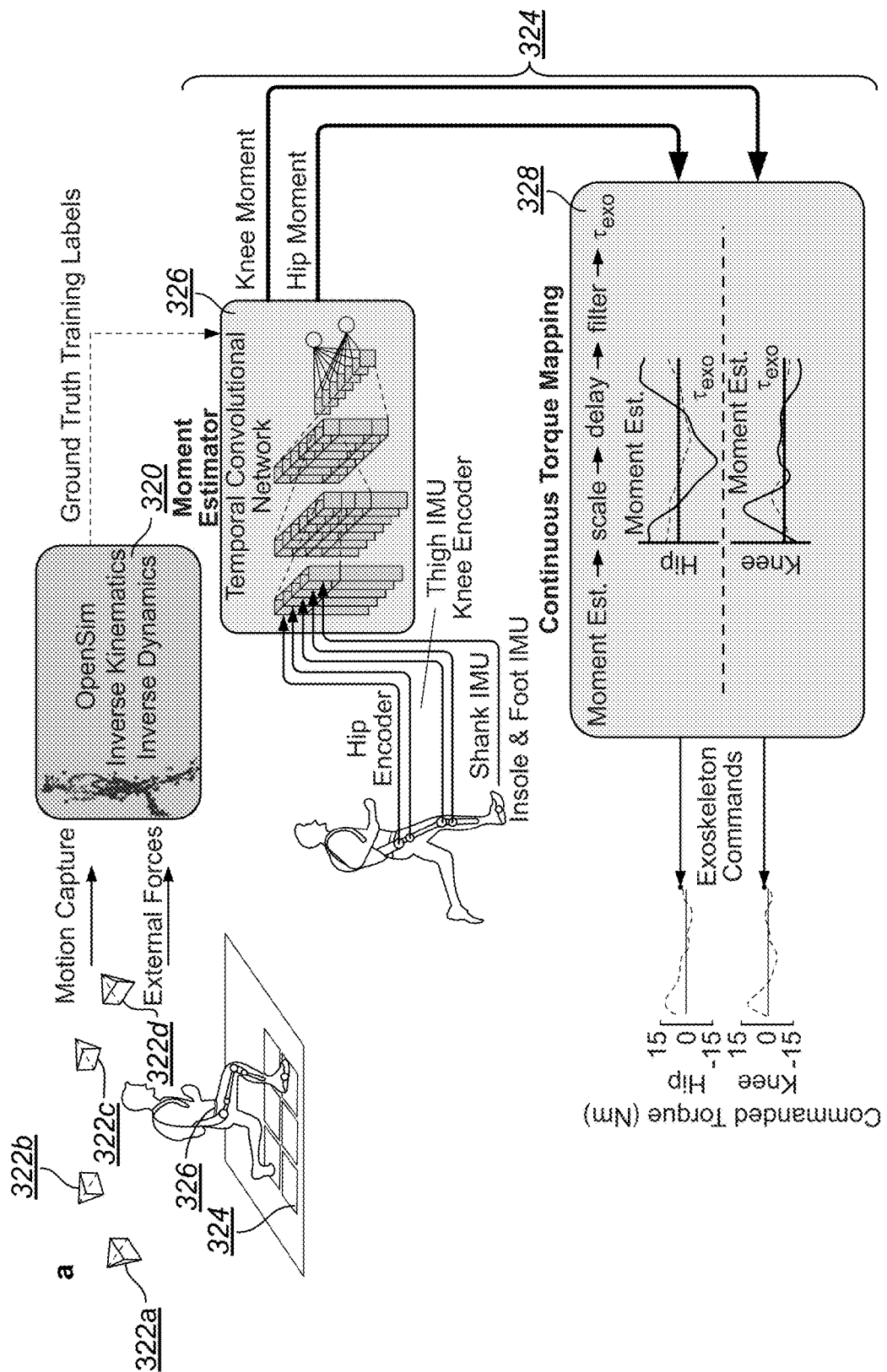
Figure 3B:
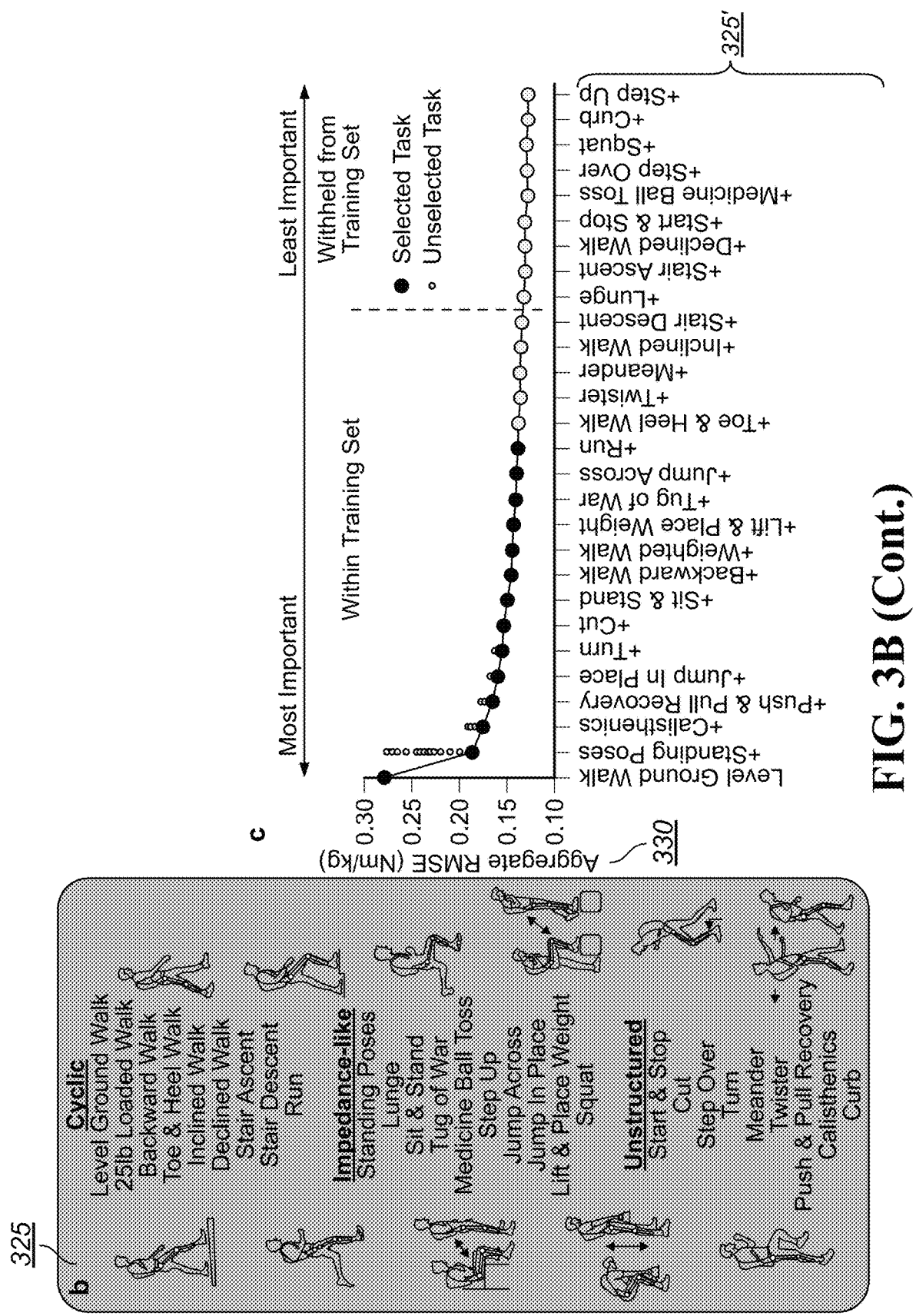

To train the biological moment estimator, exoskeleton sensor data time-synced with motion capture and ground reaction forces while users perform a wide range of tasks should be collected. FIG. 3B shows an example deep neural network training and deployment for joint moment.

As shown in subpanel (a), biological moment labels may be calculated in a simulation model (e.g., OpenSim) using optical motion capture (e.g., cameras 322a-322d), force plate data (e.g., from force plate 324), and user-specific musculoskeletal models (e.g., 326). A temporal convolutional network 326 may be trained to predict these joint moment labels from time-synchronized exoskeleton sensor data. During deployment, to improve power delivery and user comfort, the estimates may be transformed into commanded exoskeleton torque through a continuous function consisting of a scale, delay, and a lowpass filter. In other words, simulated inverse dynamics model 320 (e.g., OpenSim) may be used to calculate hip and knee moments [45], [46], providing the ground-truth labels.

As shown in subpanel (b), users wore the exoskeleton while performing 28 activities (shown as 325 and 325'), which may be categorized as cyclic, impedance-like, or unstructured based on normative joint biomechanics [47]. To achieve both task generalizability and user-independence, the dataset consisted of 15 healthy participants performing 28 different activities consisting of 66 total conditions (shown in FIG. 3C).

As shown in subpanel (c), training activities for the moment estimator may be selected using a forward selection operation 324 to maximize the relative improvement in model generalization across tasks, wherein the selection operation 324 employs temporal convolutional network 326 and continuous torque mapping operation 328. Validation root mean square error 330 (RMSE) may decrease with every added task as the training set grows, with the first 19 tasks reducing RMSE to 0.133 Nm/kg, which may be within 5% of the best model accuracy with all the tasks included. The peak-to-peak hip and knee moments may range from 2 to 4 Nm/kg for most activities in the dataset. Results may be computed from leave-one-subject-out cross-fold validation.

Figure 3C:
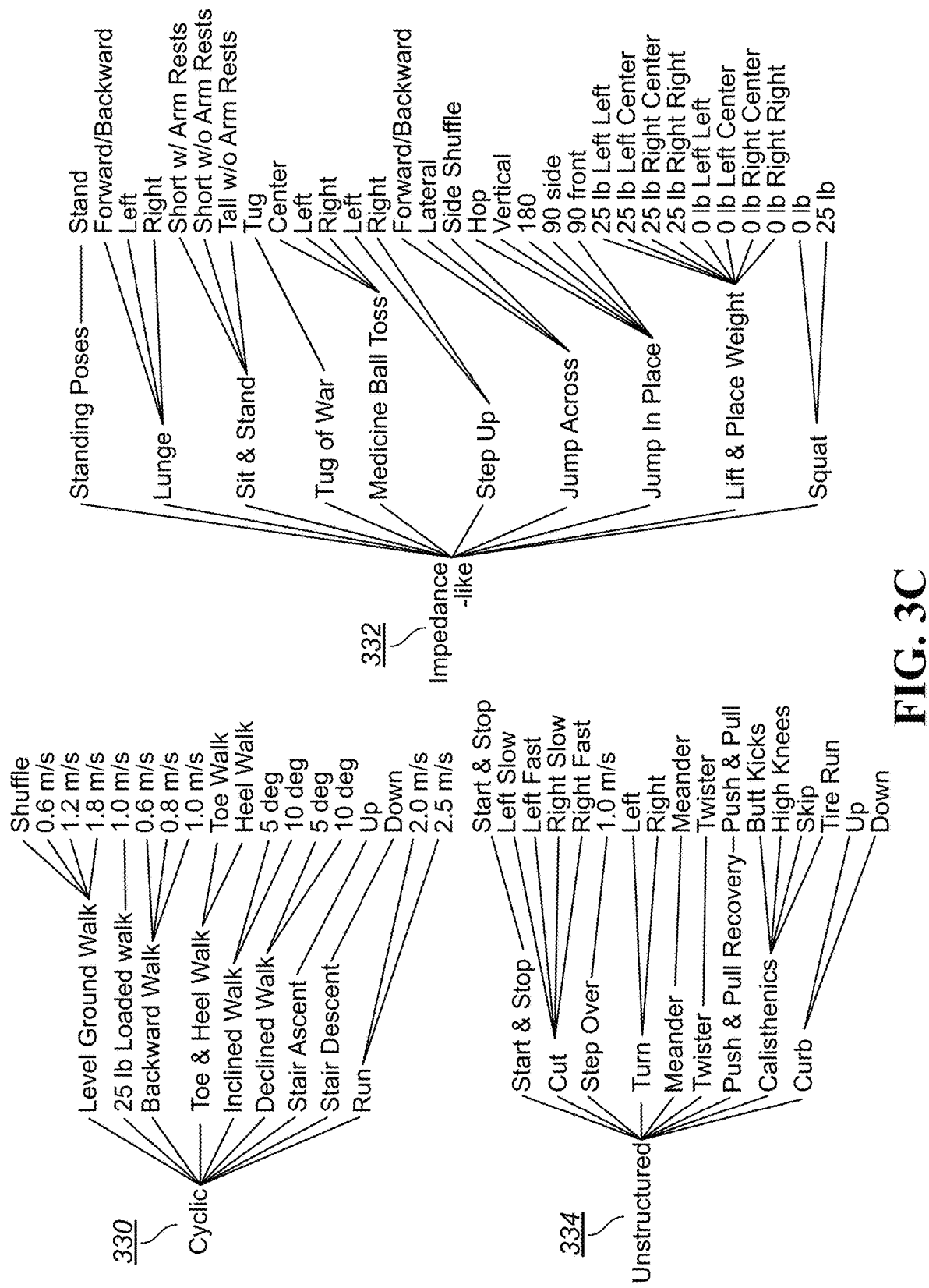

FIG. 3C shows an example task (i.e., activity) breakdown of the exoskeleton dataset labeled with ground-truth biomechanics. As shown in FIG. 1C, the training tasks (i.e., activities) may be categorized into 3 categories: cyclic 330, impedance-like 332, and unstructured 334, based on their normative biomechanics. Additionally, many tasks may contain multiple experimental conditions (66 conditions total).

Figure 3D:
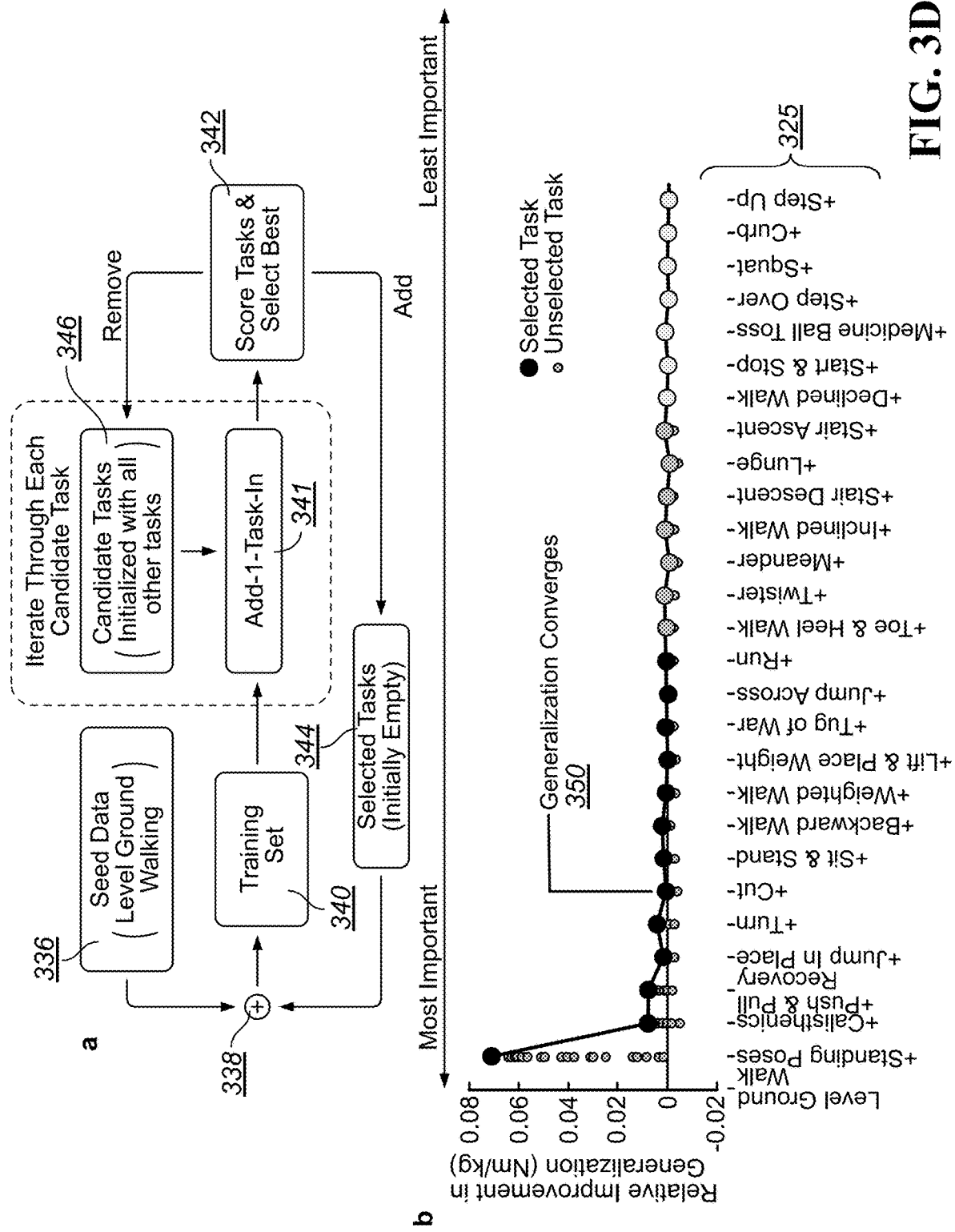

Using the dataset of tasks shown in FIG. 3C, a temporal convolutional network may be trained with optimized hyperparameters to estimate hip and knee moments from 19 of the 28 tasks, with the 19 tasks chosen via a forward selection operation to promote task generalization within the model (shown in FIG. 3D subpanel a). Table 1 shows the temporal convolution network (TCN) optimized hyperparameters.

FIG. 3D shows an example task selection operation configured to maximize the relative improvement in model generalization across tasks for the moment estimator. As shown in subpanel (a), to determine the set of activities most important for model generalizability, seed data 336 (i.e., sensor data) and selected tasks from a selected tasks pool 344 may be iteratively combined (e.g., at 338) and go through a model training set 340, which may generate first combined tasks. The first combined tasks and a candidate task from the candidate tasks pool 346 may be combined (e.g., at 341), which may generate second combined tasks. The second combined tasks may be scored (e.g., at 342) and added to the selected tasks pool 344 or moved back to the candidate tasks pool 346 based on their contribution to overall model generalizability on the validation data.

Subpanel (b) shows the relative improvement in generalization for each selected task out of 28 tasks (shown as 325). With each new task, the model may be retrained and the relative improvement in its ability to predict biological hip and knee moments across all other (27) tasks may be computed (average improvement shown). Saturated generalization may be reached (e.g., at 350) when the sum of the relative improvement reaches 95% of the total sum by adding in all of the activities. Results may be computed from leave-one-subject-out cross-fold validation; however, error bars may be omitted for clarity.

A helpful data for model generalization (aside from the seed task of level ground walking whose importance may not be assessed) may be a series of static standing poses, allowing the model to learn the static characteristics of the human body (e.g., standing upright requires near-zero moment), which may be beneficial for generalization (subpanel b). Other critical tasks, such as jump and cut, were high-effort tasks that may help establish the bounds of the system dynamics and thus may also be important for gen-

TABLE 1

| Hyperparameter | Stage 1 search space | Stage 2 search space | Selected value |
|---|---|---|---|
| Number of filters per layer | 8, 16, 24, 32, 48, 56, 64, 72, 80 | 56, 64, 72, 80 | 80 |
| Number of residual blocks (2 convolutional layers per block) | 2, 3, 4, 5, 6 | 5, 6 | 5 |
| Kernel size | 2, 3, 4, 5, 6, 7, 8, 9, 10 | 2, 4, 5 | 5 |
| Activation function | ELU, GELU, ReLU, Swish | ELU, ReLU, Swish | ReLU |
| Learning rate | [1e−6, 1e−3] | 5e−6, 1e−5, 5e−5 | 5e−5 |
| Block normalization | Batch normalization, layer normalization, weight normalization | Batch normalization, weight normalization | Weight normalization |
| Dropout type | Element-Wise, Spatial | Spatial | Spatial |
| Dropout probability | [0, 0.3] | 0.15 | 0.15 |
| L1 kernel regularization | [1e−5, 1e−3] | 0 | 0 |
| L2 kernel regularization | [1e−5, 1e−3] | 0 | 0 |
| L2 bias regularization | [1e−5, 1e−3] | 0 | 0 |

As shown in Table 1, values shown without brackets may be optimized categorically. Arrays shown with closed brackets may be optimized on the closed interval. Hyperparameter combinations resulting in an input sequence greater than 250 may be omitted due to limitations in the simulated data at the bounds of each trial. In Stage 2, kernel and bias regularization may be turned off since Stage 1 optimization generally minimize these values across multiple optimization instances.

eralization. These activities in the exoskeleton domain, which are not suitable for gait phase or impedance control, may be critical for training a model to infer joint moments across real-world tasks.

The joint moment estimates may be mapped to applied exoskeleton torque via a continuous transformation (shown in FIG. 3B, subpanel a). Hip and knee moments may be scaled to 20% and 15% of the total estimated biological moments, respectively. These scaling factors may be established in pilot experiments and may provide comfortable assistance while preventing substantial saturation and overheating of the motors during high-torque movements. Hip moment estimates may be delayed by 100 ms to maximize positive work done by the exoskeleton [48] and to potentially minimize user metabolic costs [40]. Additionally, the delay between knee moment estimates and the resulting assistance may be set to the minimum achievable by the system (e.g., a delay of 50 ms) based on single-blinded pairwise preference tuning [49] during pilot testing. Finally, the delayed joint moment estimates may be lowpass filtered to better match the frequency content of human movement [50] and increase user comfort.

Human-in-the-loop optimization (HILO). Human in-the-loop optimization (HILO) may determine a best controller setting for a user and task. This optimization loop may use human outcome measure (or cost) as a metric to assess the "goodness" of a controller's settings (or parameters) and feed these parameters and its associated cost to an optimizer which may determine the next parameters to test [53'], [54'], [55'], [56'], [73'], [74']. As this loop continues, the optimizer finds the controller parameters that correspond to the minimum cost for the user and their walking condition. The gold standard metric is the metabolic cost calculated via indirect calorimetry [50'], [75'], [76'], a process that takes measurements of the contents of a person's breath to calculate energy expenditure. Indirect calorimetry is a time-consuming process. Bayesian optimization may be a method of HILO that is more efficient than previously used methods such as gradient descent [54']. Bayesian optimization suits HILO problems well as it is sample efficient and may be directly controlled to explore or exploit and not get trapped in local minima.

Figure 4A:
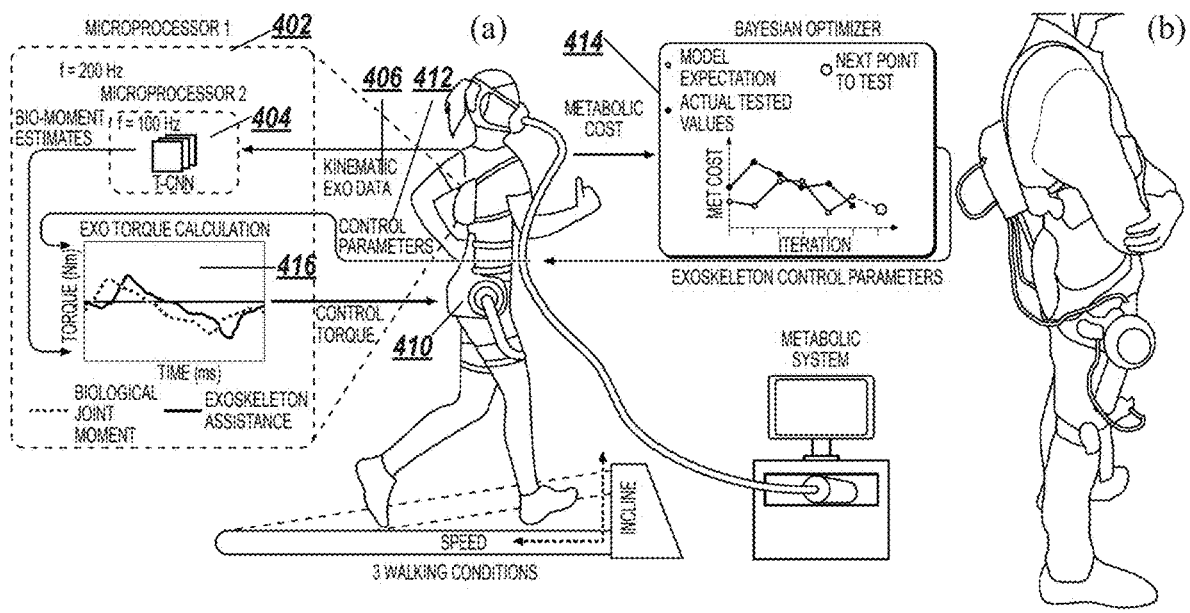

The exemplary control system may employ an optimizer to perform human-in-the-loop optimization (HILO) on the relationship between biological joint moment and output exoskeleton torque at the hip joint. FIG. 4A shows an example HIL-optimized system (i.e., HILO system) operating a TCN and an optimizer (e.g., Bayesian) with microprocessors on an exoskeleton.

As shown in subpanel (a), the optimization loop may be used to metabolically optimize the exoskeleton's control parameters over the course of 21 iterations. Two microprocessors (e.g., 402, 404) may control the exoskeleton's motors. The microprocessor 402 (i.e., microprocessor 1) may receive information (e.g., kinematic exoskeleton data 406) directly from the exoskeleton's motor 410 and peripheral sensors and send the information to the microprocessor 404.

The microprocessor 404 (i.e., microprocessor 2) may feed the information through a temporal-convolutional neural network (T-CNN) to estimate the subject's biological hip joint moment and return the information to the microprocessor 402. The microprocessor 402 uses the biological joint moment and the control parameters 412 from an optimizer 414 (e.g., Bayesian) to calculate the instantaneous torque command (e.g., at 416) to send to the motors 410.

Subpanel (b) shows an example exoskeleton configured with the exemplary HILO system.

Figure 4B:
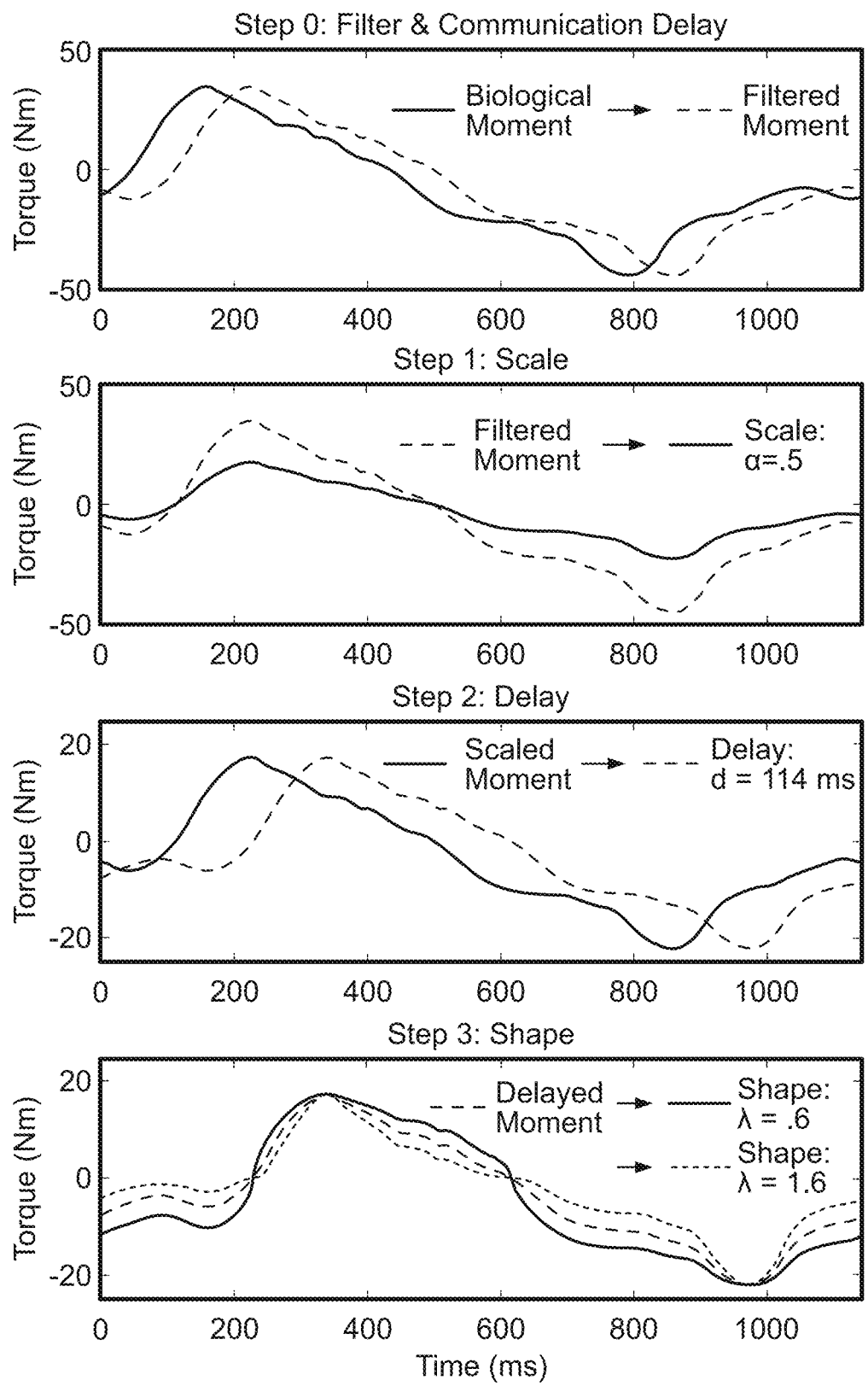

FIG. 4B shows an example operation to transform a subject's biological hip joint moment to exoskeleton assistance torque in a human-in-the-loop optimization. As shown in FIG. 4B, at step 0, when the subject (i.e., human) produces the biological torque, the microprocessor 402 (microprocessor 1 in FIG. 4A) may read the exoskeleton's on-board sensor data (e.g., kinematic exoskeleton data) and then send the data to the microprocessor 404 (microprocessor 2 in FIG. 4A). The microprocessor 404 may push the sensor data through the joint moment estimator model, filter the moment estimations, then return the filtered estimations to the first microprocessor. This may cause a filter and communication delay.

At step 1, a scaling factor $\alpha < 1$ (e.g., $a \approx 0.2$) may reduce the magnitude of the moment to a reasonable motor torque value. At step 2, a delay term 65 ms $\leq d \leq$ 240 ms (including the filter & communication delay) may further shift the exoskeleton control profile away from the original biological hip moment.

At step 3, a "shaping" factor $0.5 \leq \lambda \leq 1.6$ may modulate the sharpness and flatness of the peaks of the control profile.

EXAMPLE SYSTEM #2—DEEP DOMAIN ADAPTATION (DDA) CONTROL SYSTEM

The exemplary control system may require high-quality and device-specific data for human movements. A deep domain adaptation (DDA) method is developed to translate human movement data between a simulated sensor domain and a real sensor domain, enabling the integration of pre-existing, large open-source biomechanics datasets in end-to-end exoskeleton controllers.

Figure 5A:
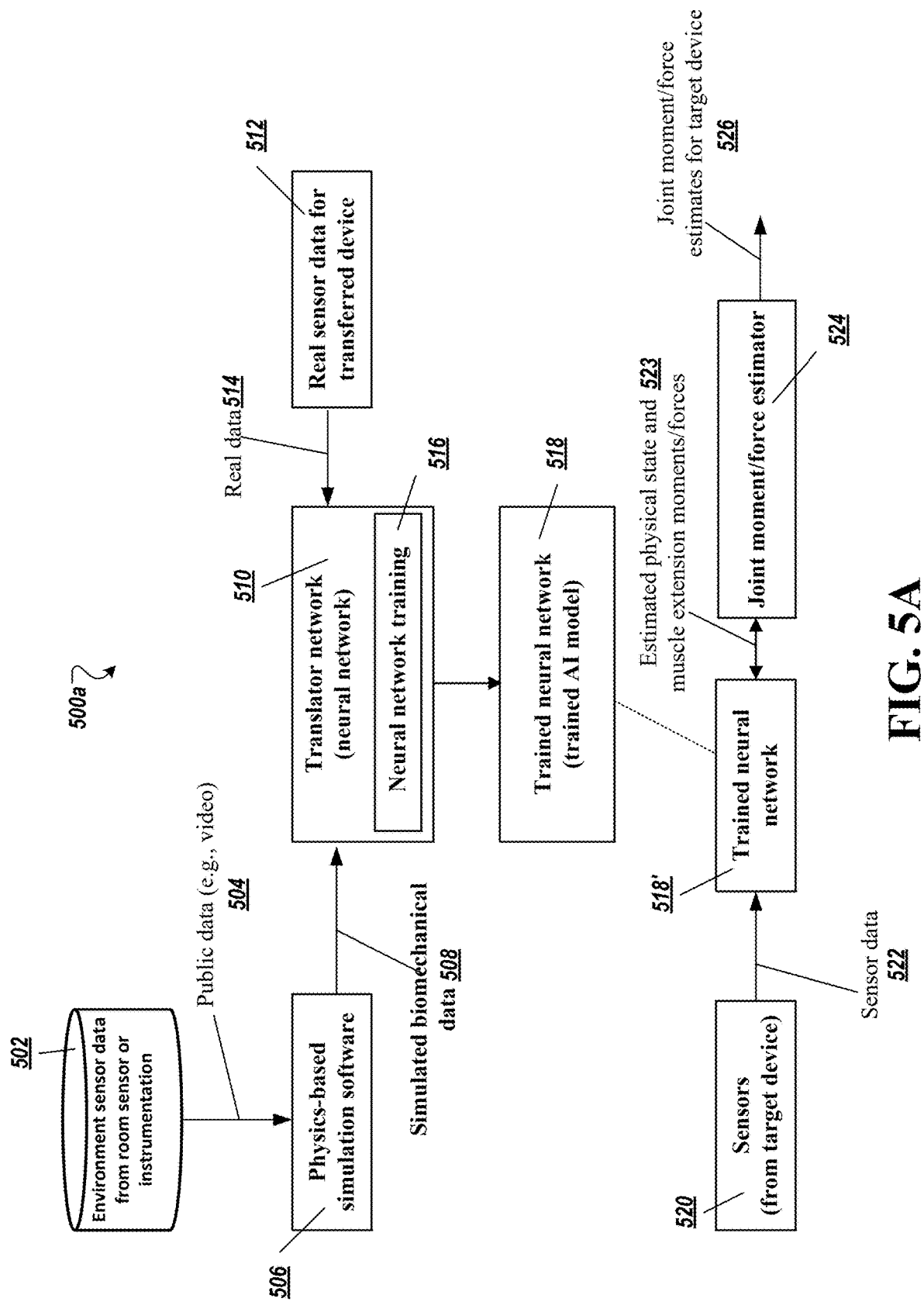
FIGS. 5A-5E shows an example control system in accordance with a second illustrative embodiment employing a deep domain adaptation method.
Figure 5B:
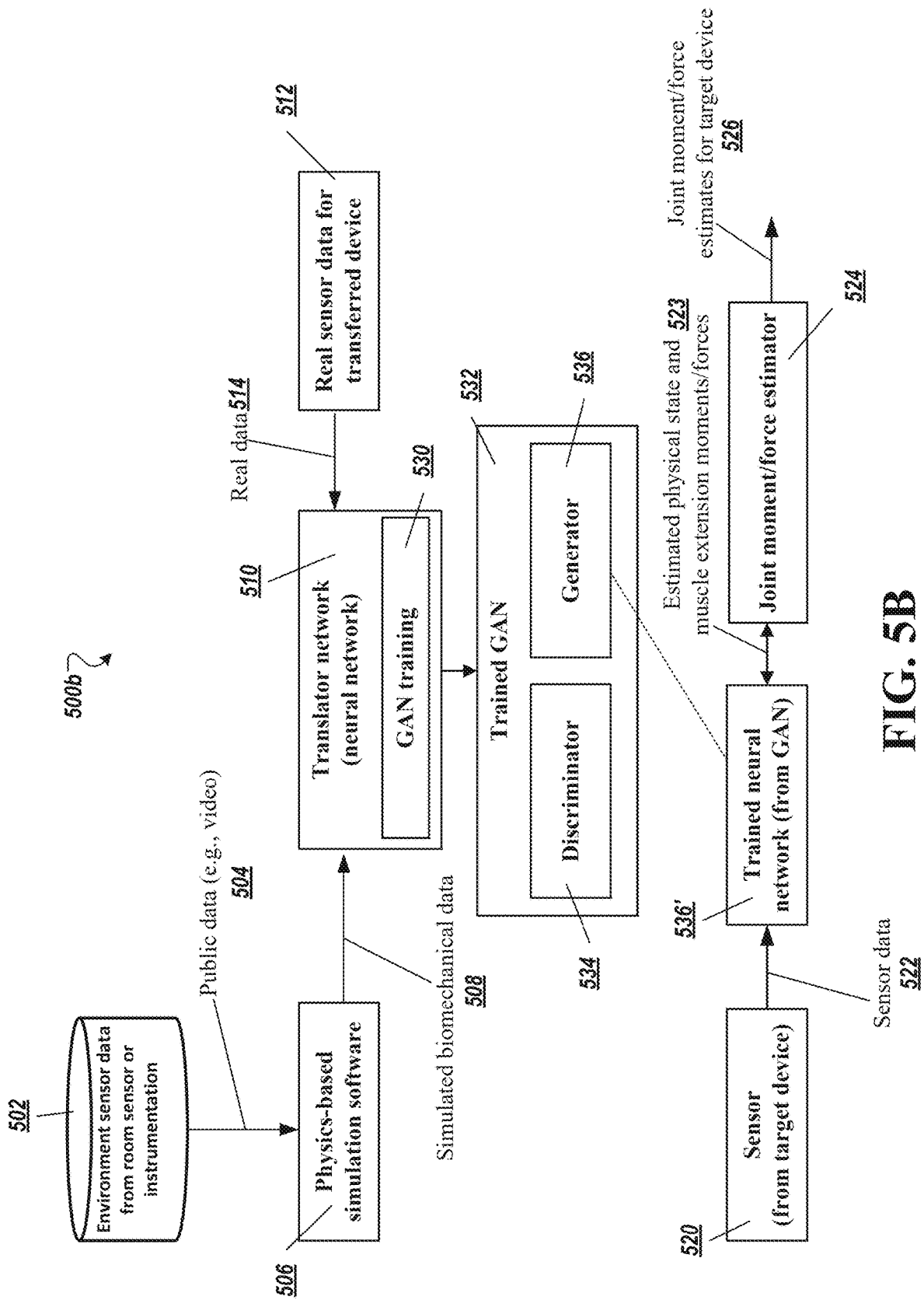

FIGS. 5A-5B each shows an example control system employing deep domain adaptation operation (i.e., DDA control system). The exemplary DDA control system shown in FIGS. 5A-5B employs physics-based simulation software, a translator network, real sensor data for the transferred device, sensors from a target device, and a joint moment/force estimator. FIG. 5B shows an example generative adversarial network (GAN) training module employed by the translator network of the exemplary DDA control system to train a neural network (e.g., GAN).

FIG. 5A shows an example DDA control system 500a employing a physics-based simulation software 506, a translator network 510, real sensor data for transferred device 512, sensors 520 from a target device, and a joint moment/force estimator 524.

In the example DDA control system 500a, the physics-based simulation software 506 may receive the public data (e.g., video) 504 from the environment sensor data 502 from room sensor or instrumentation. The physics-based simulation software 506 may generate and transmit simulated biomechanical data 508 to the translator network 510.

The translator network 510, coupled with the physics-based simulation software, may receive the simulated biomechanical data 508 from the physics-based simulation software 506. The translator network 510 may also receive real data 514 from the real sensor data for transferred device 512.

The translator network 510 may then generate simulated sensor data to simulate sensors for the transferred device using the received biomechanical data 508 generated from the physics-based simulation software 506 and the real data 514, wherein the simulation is performed at body segment positions for forces and/or for velocities constrained or defined at a same location or body segment for a target device to provide paired data of (i) the sensor data of the target device and (ii) the biomechanical data, wherein the paired data is used for training of at least one neural network.

The translator network 510 may train at least one neural network, via a neural network training module 516, using the simulated sensor data. The trained neural network 518 (i.e., trained AI model) (shown as 518'), generated from the translator network 510, is configured to map the simulated data associated with the biomechanical data 508 to a real data 514 associated with the sensor data.

The example DDA control system 500a may further configure the joint moment/force estimator 524 by (i) receiving, via a control loop, sensor data 522 from sensors 520 of a target device (e.g., robotic/prosthetic device), (ii) determining, via the trained neural network 518', estimated physical state and muscle extension moments or forces 523 using the sensor data 522 as input to the trained neural network 518', and (iii) and outputting, via the control loop, the joint moment/force estimates 526 from the physical state and muscle extension moments or forces 523 for use in controls or monitors of the target device.

FIG. 5B shows an example DDA control system 500b employing a physics-based simulation software 506, a translator network 510, real sensor data for transferred device 512, sensors 520 from a target device, and a joint moment/force estimator 524.

In the example DDA control system 500b, the physics-based simulation software 506 may receive the public data (e.g., video) 504 from the environment sensor data 502 from the room sensor or instrumentation. The physics-based simulation software 506 may generate and transmit simulated biomechanical data 508 to the translator network 510.

The translator network 510, coupled with the physics-based simulation software, may receive the simulated biomechanical data 508 from the physics-based simulation software 506. The translator network 510 may also receive real data 514 from the real sensor data for transferred device 512.

The translator network 510 may then generate simulated sensor data to simulate sensors for a transferred device using the received biomechanical data 508 generated from the physics-based simulation software 506 and the real data 514, wherein the simulation is performed at body segments for positions, for forces, for velocities, and/or for accelerations constrained or defined at a same location or body segment for a target device to provide paired data of (i) the sensor data of the target device and (ii) the biomechanical data, wherein the paired data may be used for training of at least one neural network. Examples of segments from which the position, velocity, acceleration can be ascertained include thigh, shank, foot, pelvis, and trunk. Examples of joints from which position, velocity, or acceleration can be ascertained include knee, hip, ankle. Example of forces includes ground reaction force or other interaction forces between body segments or joints with the external environment.

The body segment positions, forces, and/or velocities may be time-aligned with external data (e.g., motion sensor, force plates, time match data between simulated and real domain).

The translator network 510 may train at least one neural network, via a GAN training module 530, using the simulated sensor data. The trained GAN 532, generated from the translator network 510, may be configured to map the simulated data associated with the biomechanical data 508 to real data 514 associated with the sensor data. The trained GAN 532 may include a discriminator 534 and a generator 536 (shown as 536').

The example DDA control system 500b may further configure the joint moment/force estimator 524 by (i) receiving, via a control loop, sensor data 522 from sensors 520 of a target device (e.g., robotic/prosthetic device), (ii) determining, via the trained neural network 536' from the trained GAN 532, estimated physical state and muscle extension moments or forces 523 using the sensor data 522 as input to the trained neural network 536', and (iii) and outputting, via the control loop, the joint moment/force estimates 526 from the physical state and muscle extension moments or forces 523 for use in controls or monitors of the target device.

In both DDA control systems 500a and 500b shown in FIGS. 5A-5B, the at least one neural network may form in part a first GAN configured to generate the real data associated with the sensor data, or the second GAN configured to generate simulated data associated with the biomechanical data. A least squares objective may be employed as a loss function for each GAN of the at least one neural network. The first GAN and second GAN may collectively form a translator network 510, wherein the translator network 510 may be set up in a bidirectional CycleGAN.

The training (e.g., 516, 530) of the at least one neural network employs supervised loss, cycle consistency loss, GAN loss, and reconstruction loss. The reconstruction loss may be computed using an error value (e.g., mean squared error (MSE)) normalized by sensor modality weighed equally in reconstruction (e.g., wherein each sensor modality, e.g., thigh acceleration or shank angular velocity, is weighed equally in reconstruction, and individual vector components (e.g., thigh x acceleration or thigh y acceleration) are weighed by a maximum value across all components of that modality).

The cycle consistency loss employed by the training (e.g., 516, 530) may be computed by matching (i) the simulated data associated with the biomechanical data that was passed through both a sim-to-real translator and then a real-to-sim translator to (ii) original data.

The training (e.g., 516, 530) of the at least one neural network may further employ identity loss that ensures data from one domain passes through the neural network to that same domain itself. The training (e.g., 516, 530) may further employ a moment loss determined from real data and estimate of a user's biological moment, wherein samples used to train a portion of the network having the moment loss may include translated data from biomechanics datasets with respective labels (e.g., wherein in semi-supervised case using any available labeled real exoskeleton data with respective moment label).

The training (e.g., 516, 530) may determine a total loss for a translator portion of the network as a weighted sum of loss components. The training (e.g., 516, 530) may use (i) unlabeled, unpowered exoskeleton data collected from a human user wearing a specific target device and (ii) labeled human biomechanics data collected without an exoskeleton.

Figure 5C:
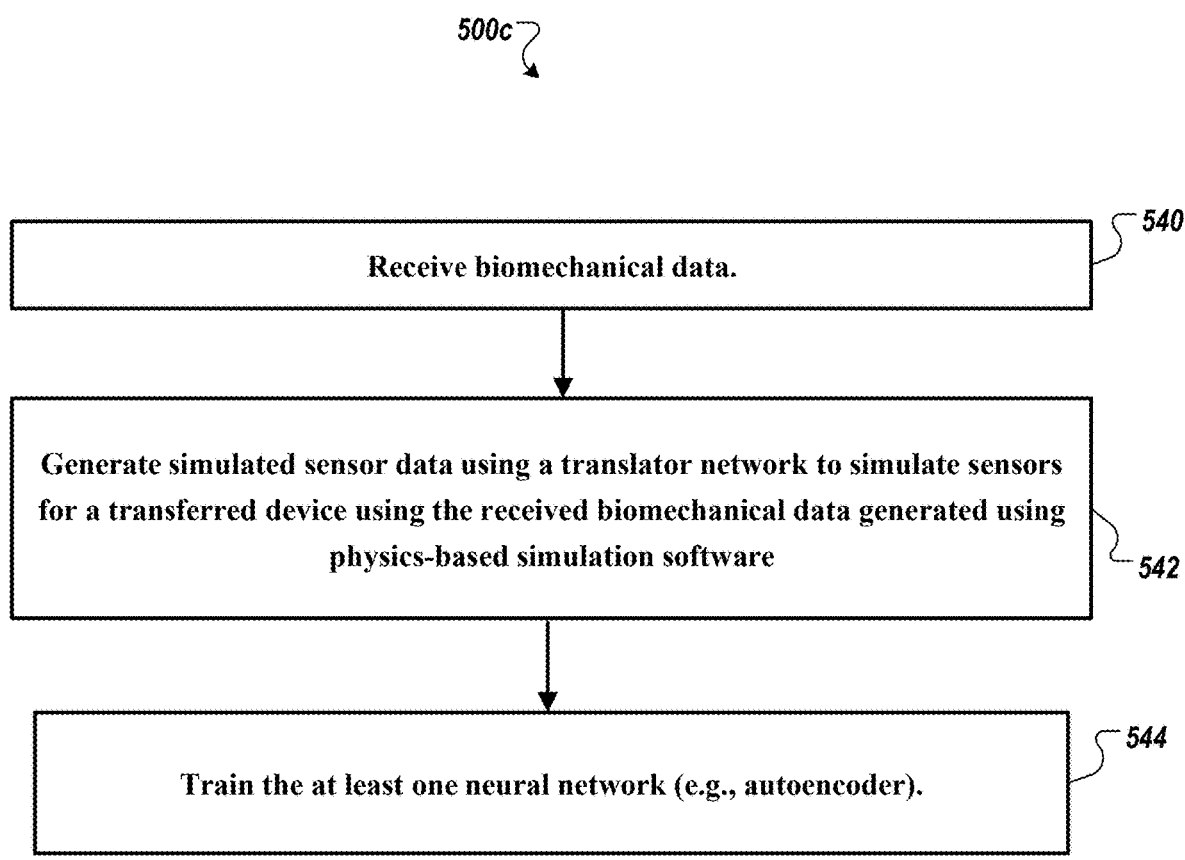

Example deep domain adaptation method. FIG. 5C shows an example operation flow 500c of the exemplary deep domain adaptation (DDA) control system, which may include 3 steps. At step 540, the exemplary DDA control system may receive biomechanical data.

At step 542, the exemplary DDA control system may generate simulated sensor data using a translator network to simulate sensors for a transferred device using the received biomechanical data generated using physics-based simulation software, where the simulation is performed at body segment positions, for forces, and/or for velocities constrained or defined at a same location or body segment for a target device to provide paired data of (i) the sensor data of the target device and (ii) the biomechanical data, wherein the paired data is used for training of at least one neural network.

At step 544, the exemplary DDA control system may train the at least one neural network (e.g., autoencoder).

Figure 5D:
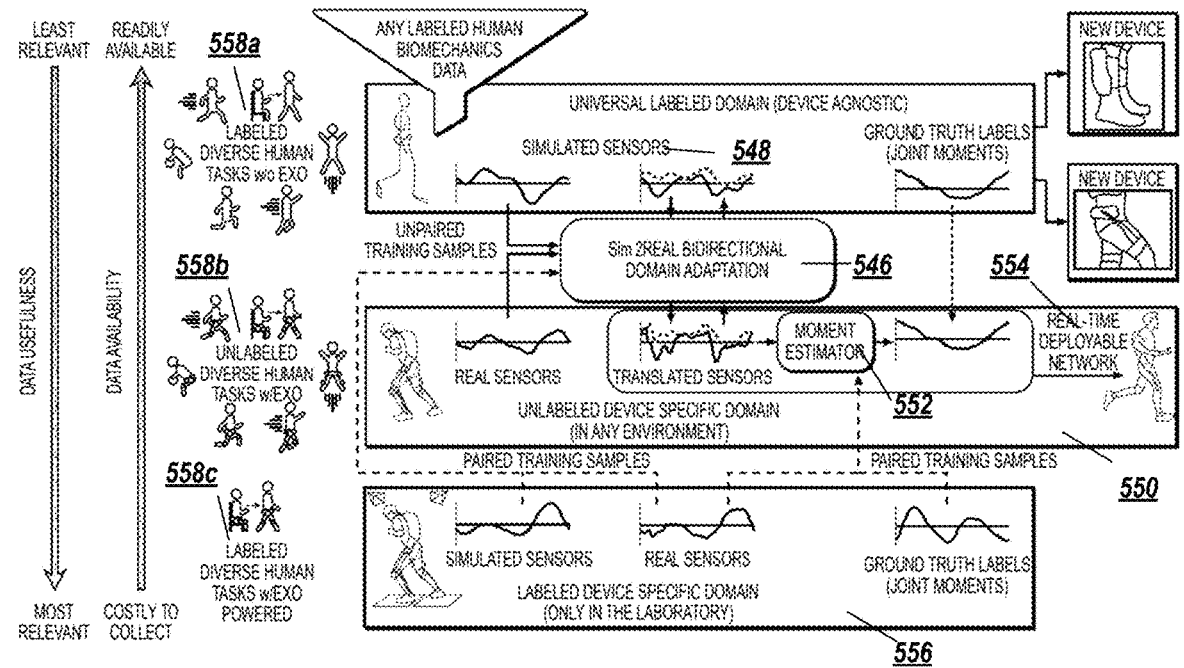

Deep domain adaptation method and system. FIG. 5D shows an example deep domain adaption method for replacing costly device-specific data with less costly data. As shown in FIG. 5D, the operation uses the biomechanical modeling domain with simulated sensors as a universal domain for aggregating data. To utilize this data, a translator network 546 was developed to perform bidirectional domain adaptation (e.g., bidirectional CycleGAN) to translate simulated sensors 548 into any specific device domain 550 based on unlabeled data from that device. This translated data may be used to train downstream deep learning models (e.g., a moment estimator 552) that are deployable in real-time on a device (e.g., 554). This method may be used to create models for new devices and new joints. Labeled device-specific data 556 may still be used in the translator network 546, but a fully unlabeled framework (e.g., 550) is possible.

Specifically, as shown in FIG. 5D, three separate sources of data (e.g., 558a-558c) may be considered, each with a different level of costliness to collect, and each lying within the simulated domain, the real sensor domain, or across both. Labeled human biomechanics data 558a collected without an exoskeleton were the least costly to obtain but also lay solely within the simulated domain. Unlabeled, unpowered exoskeleton data 558b may be collected from a human user wearing a specific target device but without any need for external measuring equipment or a stand-in controller providing assistance. Thus, unlabeled, unpowered exoskeleton data 558b may be easy to obtain in any environment but lay solely in the real domain. The third source, labeled exoskeleton data 558c, may be the costliest data to collect because it may require a gait lab with instrumented floors and motion capture; however, the third source contained information from both the real and simulated sensor domains that may be time-synched and, therefore, easy to use to create a translation between the two domains. The deep domain adaption (DDA) method used previously may under-utilize data from the first two less costly sources to reduce or even remove the need for the third costly data source, which may be traditionally the only source utilized for deployed machine learning algorithms [3'], [11'].

To achieve real-time deployable models for exoskeleton control, a two-part method may be developed. First, the domain adaptation problem may be addressed by training translator networks through several Generative Adversarial Networks (GANs) to convert between the real and simulated domains. For translation, many unpaired samples from the simulated domain (human biomechanics datasets) and the real domain (unlabeled exoskeleton data) may be openly available. While there was no direct time-point-by-time-point comparison for conventional supervised training, these unpaired samples may be used for domain adaptation. This was the only data accessible in the unsupervised case.

In the semi-supervised case, paired samples (i.e., paired data) from both the real and simulated domain (labeled exoskeleton data) may be available with limited access. These data may allow more direct comparison across real and simulated domains; however, this pairing did not represent the target translation because the simulated data from this source came from a person wearing an exoskeleton, whereas the target translation was from simulated data without an exoskeleton present. Thus, while this paired data captured the noise characteristics of real sensors and any orientation differences between the simulated and real sensors, it may not capture the user's kinematic changes due to wearing the device (whether from human adaptation to assistance or the exoskeleton mass and range of motion constraints). Those changes may be something the translator should learn. Thus, these data may provide a few samples with labels that partially constrain, although imperfectly, the translation. Second, using this translator network, data from the generic human biomechanical datasets (the common shared domain) may be translated into the real domain. Because this biomechanical data came from datasets that may contain inverse dynamics, the appropriate joint moment labels associated with the data may be available. These paired data samples (translated sensor data and joint moment labels) may be used to train a moment estimator that may operate based on data from the real device. When some real device data with joint moment labels (semi-supervised case) are accessible, they may be added to the training set for the moment estimator.

The sensor translation portion of the translation network may combine two GANs, one generating data in the real sensor domain conditioned on data from the simulated domain and the other operating in reverse. Each GAN may include a UNet-style translator as the generator and a convolutional neural network (CNN) as the discriminator.

The GANs may be set up bidirectionally, following a CycleGAN framework [35']. Results from image translation and human activity recognition may demonstrate that bidirectional translation may increase performance by encouraging minimal information loss across the cycle, as well as forcing the translations to be inverses of each other [24'], [35'], and [36']. For moment estimation, a temporal convolutional network (TCN) architecture may be selected based on its success in [11'], [12'], and [37']. Because of the bidirectional nature of the translation, the moment estimator may be trained to operate based on real data or on simulated data (thus, for real-time implementation requiring both the sim-to-real translator and the moment estimator to operate on incoming data). Training the moment estimator on the real side may outperform the moment estimator on the simulated side with the added benefit of only requiring one model to be deployed in real time. Thus, all results may be based on a moment estimator trained with data converted into the real domain.

Figure 5E:
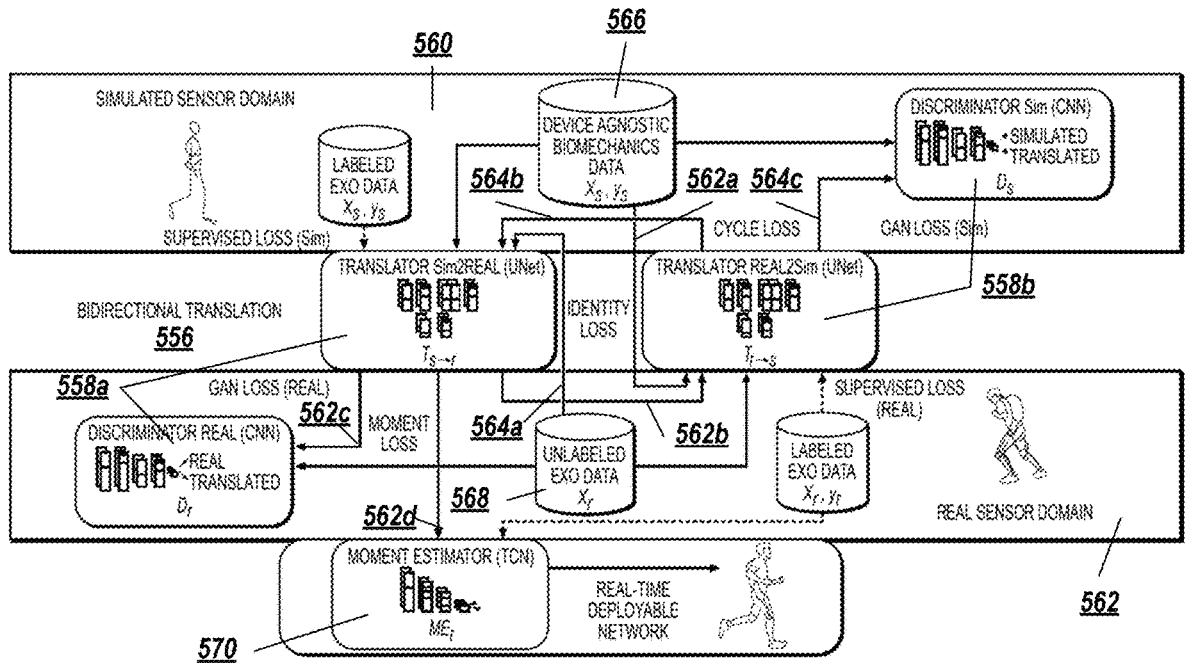

FIG. 5E shows the example deep domain adaptation system for training the translator and downstream moment estimator. As shown in FIG. 5E, bidirectional domain adaptation 556 (by a translator network) may be accomplished through two pairs of translator and discriminator networks (e.g., 558a, 558b) that function as generative adversarial networks (GANs) in both simulated domain 560 and real domain 562.

In FIG. 5E, the forward passes of data 562a-562d originate from the biomechanical data source 566, and the forward passes of data 564a-564c originate from the unlabeled exoskeleton data source 568.

The forward passes 562a and 564a contribute to the identity loss. The forward pass 562b and 564b contribute to the cycle loss. The forward pass 564c contributes to the GAN loss in the simulated domain, and the forward pass 562c contributes to the GAN loss in real domain. The forward pass 562d contributes to the moment loss.

The moment estimator 570 may be trained along with the components of loss function (e.g., supervised loss, cycle loss, GAN loss, identity loss, moment loss) but should be the only portion required at run time for deployment on the robotic/prosthetic device.

Supervised loss. In the semi-supervised case, sensors may be simulated using the body segment positions and velocities at the same location as the real sensors. This created paired data that may be used as part of the translator network loss. Data from the simulated domain ($X_s$) were compared with data from the real domain ($X_r$) that were translated using the appropriate translator ($T_{r \to s}$). To compute reconstruction loss, mean squared error (MSE) may be normalized by sensor modality. Thus, each sensor modality (e.g., thigh acceleration or shank angular velocity) may be weighted equally in reconstruction, but the individual vector components (e.g., thigh x acceleration or thigh y acceleration) may be weighted by the maximum value across all components of that modality. This ensured that off-axis signals did not get over-emphasized in reconstruction. Reconstruction loss for the sim-to-real translator and the real-to-sim translator were weighed equally as summarized in Equation 1.

$$L_{supervised} = \frac{1}{2}[MSE_{sensor\ normalized}(T_{r \to s}(X_r), X_s) + \\ MSE_{sensor\ normalized}(T_{s \to r}(X_s), X_r)] \quad \text{(Eq. 1)}$$

Cycle consistency loss. Due to the bidirectional translation of the translator network, sensor data from the simulated domain ($X_s$) that may be passed through both the sim-to-real translator ($T_{s \to r}$) and then the real-to-sim translator ($T_{r \to s}$) should return data that matches the original data. To compute the reconstruction loss for these signals, the same sensor normalized MSE metric as above may be used, and the loss from sim→real→sim and from real→sim→real may be equally weighted as summarized in Equation 2.

$$L_{cycle} = \frac{1}{2}[MSE_{sensor\ normalized} \cdot (T_{r \to s}(T_{s \to r}(X_s)), X_s) + \\ MSE_{sensor normalized} \cdot (T_{s \to r}(T_{r \to s}(X_r)), X_r)] \quad \text{(Eq. 2)}$$

Generative Adversarial Networks (GAN) loss. The least squares objective may be chosen as the loss function for the GAN portion of the network, which may give stability to training by providing more gradient information to the generator [38'] and may be used successfully for human activity recognition [36']. Thus, the discriminator may minimize the mean squared error between the output of the discriminator and the correct classification value (1 for data from the same domain, 0 for data translated from another domain), as shown in Equations 3 and 4.

$$\min L_{discriminator\ real} = MSE(D_r(T_{s \to r}(X_s)),0) + MSE(D_r(X_r),1) \quad \text{(Eq. 3)}$$

$$\min L_{discriminator\ sim} = MSE(D_s(T_{r \to s}(X_r)),0) + MSE(D_s(X_s),1) \quad \text{(Eq. 4)}$$

The translator (acting as the generator) may produce outputs that appear to come from the true data distribution. Thus, the translator may minimize the mean squared error between the discriminator's classification and the goal classification that it comes from the original domain (1 represented data that may come from the same domain). Again, the loss from both the sim and real sides may be weighed equally, as in Equation 5, to minimize the loss.

$$L_{GAN} = \frac{1}{2}[MSE(D_r(T_{s \to r}(X_s)), 1) + MSE(D_s(T_{r \to s}(X_r)), 1)] \quad \text{(Eq. 5)}$$

Identity loss. Some image-based techniques like Cycle-GAN may use an additional component of the loss function that may ensure data from one domain passed through the translator to that same domain returns itself (e.g., data from the simulated domain ($X_s$) when passed through the real-to-sim translator ($T_{r \to s}$) should produce the original data) [35'], [39']. When testing the unsupervised case, a similar loss may help to constrain the translators and stabilize convergence. Again, the sensor-normalized MSE may be used to compare the data, and the sim and real sides may be weighed as in Equation 6.

$$L_{identity} = \frac{1}{2} \\ [MSE_{sensor\ normalized}(T_{r \to s}(X_s), X_s) + \\ MSE_{sensor\ normalized}(T_{s \to r}(X_r), X_r)] \quad \text{(Eq. 6)}$$

Moment loss. The final component of the framework, the moment estimator ($ME_r$), may be trained to take real data and estimate the user's biological moment. Samples used to train this portion of the network may consist of translated data from biomechanics datasets in the simulated domain ($T_{s \to r}(X_s)$) with their respective labels ($y_s$) and in the semi-supervised case, any available labeled real exoskeleton data ($X_r$) with respective moment labels ($y_r$). MSE may be used as the metric to measure error between ground truth joint moments and estimates from the model. Thus, the objective for the moment estimator may be summarized in Equation 7.

$$\min L_{moment\ estimator} = MSE(ME_r(X_r),y_r) + MSE(ME_r(T_{s \to r}(X_s)),y_s) \quad \text{(Eq. 7)}$$

Because a portion of the moment estimation loss may be contingent upon the sim-to-real translator ($T_{s \to r}$), this loss may also be backpropagated through the translator and may be used as a component of the translator loss. This was summarized in Equation 8.

$$L_{moment} = MSE(ME_r(T_{s \to r}(X_s)),y_s) \quad \text{(Eq. 8)}$$

Total loss. The total loss for the translator portion of the network may be computed as the weighted sum of the above loss components. In the semi-supervised case, the moment loss (Equation 8) may be used with both a moment estimator operating on simulated data as well as the moment estimator on the real side, but the accuracy may not improve. Therefore, due to training time considerations, the moment loss for the translator (Equation 8) may be removed from the loss function for the semi-supervised case. Thus, the total loss for the semi-supervised case may be written in terms of Equations 1, 2, 5, and 6. The target total loss may be shown in Equation 9, where the weights ($\lambda_{cycle}, \lambda_{GAN}, \lambda_{identity}$) are hyperparameters to tune.

$$\min L_{total} = L_{supervised} + \lambda_{cycle} \cdot L_{cycle} + \lambda_{GAN} \cdot L_{GAN} + \\ \lambda_{identity} \cdot L_{identity} \quad \text{(Eq. 9)}$$

In the unsupervised case, there may be no data to compute a supervised loss; thus, the total loss for the translator may be written in terms of Equations 2, 5, 6, and 8. The target total loss may be shown in Equation 10, where the weights ($\lambda_{cycle}, \lambda_{identity}, \lambda_{moment}$) are hyperparameters to tune.

$$\min L_{total} = L_{GAN} + \lambda_{cycle} \cdot L_{cycle} + \lambda_{identity} \cdot L_{identity} + \\ \lambda_{moment} \cdot L_{moment} \quad \text{(Eq. 10)}$$

Training data. In training the neural network for the exemplary control system, hip, and knee moments were estimated [12']. For exoskeleton sensors, kinematic sensors may be placed on the thigh and shank. Thus, the sensor suite may consist of a hip and knee encoder (angle and velocity) and a thigh and shank inertial measurement unit (IMU), which may imitate the basic set of mechanical sensors available to a hip/knee exoskeleton without placing sensors outside the device.

Labeled biomechanics data (without an exoskeleton) may include joint angles, joint moments, and simulated inertial measurement units (IMUs) on each segment for 12 participants performing 28 cyclic and non-cyclic groups of tasks [40']. Encoders may be simulated from the hip/knee inverse kinematics, and IMUs may be simulated for the thigh and shank, matching IMU locations with those on the hip/knee exoskeleton.

Exoskeleton data may include several phases of collection with 22 different participants [12']. The unlabeled real exoskeleton data may consist of raw sensor data collected from the exoskeleton, while 10 participants perform tasks without exoskeleton assistance (actuators off). The real IMU data for the thigh and shank (OpenIMU, Tewksbury, MA) and encoder data from the hip and knee (T-Motor AK80-9s, Nanchang, China) may be used. For the semi-supervised model, a combination of actuated and unactuated data from the first 15 participants across a range of tasks may be included. Finally, 8 participants from "phase 3" of this dataset may form the true test set and may be used to evaluate performance.

A study was conducted to develop a task-agnostic exoskeleton control system (i.e., exemplary control system) utilizing instantaneous estimates of lower-limb biological joint moments from a deep neural network to assist the user movements. By estimating both hip and knee moments in the loop, the exemplary control system provided multi-joint assistance through an autonomous, clothing-integrated exoskeleton. The exemplary control system also deployed a deep domain adaptation (DDA) method configured to translate human movement data between a simulated sensor domain and a real sensor domain.

Without any manual controller modifications, the exemplary control system may reduce user energetics (e.g., metabolic cost, lower-limb biological joint) and enable exoskeletons to aid users across a broad spectrum of human activities.

Fabricated Control System

During most modes of ambulation, the hip and ankle joints were the dominant power providers [47], [56], [57], and recent research in human-in-the-loop optimization demonstrated that assisting the hip and ankle yielded greater metabolic benefits to the user than assisting the knee [8]. Thus, most exoskeleton studies focused on assisting the hip and ankle joints during ambulation [14]. However, the knee joint may play a critical role in many non-cyclic activities, such as squatting, jumping, and lunging [47]. In fact, from a recently published dataset of human lower-limb biomechanics during cyclic and non-cyclic tasks, the positive work demanded from each lower-limb joint averaged across non-cyclic activities was larger than that of any joint during cyclic tasks (i.e., during ambulation) [47]. As such, assisting the knee joint may be a viable approach for general-purpose human augmentation, potentially augmenting users through demanding, non-cyclic tasks while mitigating the effects of distal-borne mass during walking compared to ankle-based devices [51].

Autonomous robotic exoskeleton for hip and knee assistance. The study developed a Raspberry Pi 4B (RPi) (Raspberry Pi, Cambridge, UK) as the primary onboard computer, which ran a control loop at 55 Hz on an exoskeleton. The RPi managed CAN (Controller Area Network) and Bluetooth communication with peripherals, saved experimental data locally, and provided all functions other than joint moment estimates. The study generated joint moment estimates on a machine learning co-processor (e.g., NVIDIA Jetson Nano, Santa Clara, CA) also mounted onboard the device; thus, all computation was fully onboard the exoskeleton.

The Jetson Nano provided a low power consumption (5V, 2A) co-processor, easily integrated into the exoskeleton via ethernet connection and commonly available portable charging banks. Actuated hip flexion/extension and knee flexion/extension were provided by quasi-direct drive actuators (T-Motor AK80-9s, Nanchang, China), with a peak intermittent torque constrained to 15 Nm. Open-loop torque commands were sent to the actuators from the RPi over CAN, and encoder measurements were returned to the RPi. Encoder velocity was lowpass filtered using a $2^{nd}$ order Butterworth filter with a 10 Hz cutoff frequency. 6-axis inertial measurement units (IMUs) (OpenIMU, Tewksbury, MA) were mounted to the shank and thigh struts and communicated with the RPi via CAN. Pressure-sensitive insoles (e.g., Moticon, Munich, Germany) measured vertical ground reaction force (GRF) and center of pressure (COP) and had an embedded 6-axis IMU. They communicated with the RPi via Bluetooth and were powered by coin-cell batteries. The RPi and actuators were powered by two 20V 3 Ah drill batteries (DeWalt, Towson, MD) connected in parallel, providing power for ~2 hours of continuous walking at a minimum. The RPi interfaced via Wi-Fi with a laptop for data visualization using a custom user interface.

Real-time deployment of the joint moment estimator. To deploy the joint moment estimator within the exoskeleton controller, the machine learning co-processor (i.e., the Jetson Nano) was integrated into the device using an asynchronous TCP/IP connection over wired ethernet with the RPi. With each control loop, sensor data were measured from the actuators, IMUs, and pressure insoles. The sensor data were sent from the RPi to the co-processor, which returned estimates of the total hip and knee flexion/extension moments from the neural network. Biological joint moment estimates were then computed by subtracting the measured actuator torques from the previous loop from each corresponding joint moment estimate.

Desired torque assistance was computed from the resulting biological joint moment estimates using three steps. 1) The biological joint moments at the hip and knee were scaled by 20% and 15%, respectively, to maximize assistance while maintaining safe operating regions for the device hardware (15 Nm at each joint). 2) The scaled hip and knee moments were then delayed by 100 and 50 ms, respectively. This delay was chosen at the knee because 50 ms was the minimum possible delay to guarantee a consistent relationship between biological joint moment estimates and exoskeleton assistance due to limitations in the loop rate reliability of the exoskeleton. Hip assistance was further delayed by an additional 50 ms since this approach may maximize the positive work done by the exoskeleton during walking, which may lead to additional benefits for the user [40], [48]. 3) The exoskeleton assistance was lowpass filtered using a 2nd order 10 Hz Butterworth filter to preserve the frequency content of human motion [47], [56], [58], [59] while removing jitter from the estimator [40]. This filter added an additional delay of 25 ms, resulting in a total hip delay of 125 ms and a knee delay of 75 ms. In the case that the resulting assistance was larger than the peak torque available from the actuators, the commanded torque was clamped to the peak actuator torque.

Because the exoskeleton controller intentionally delayed the hip moment estimates by an additional 50 ms relative to the minimum achievable system delay with the fabricated control system, the network was trained to estimate hip moments delayed by 50 ms relative to the input sequence. A previous study found that delaying joint moment estimates relative to the input sequence may further improve model accuracy [60], which resulted in an additional 5% improvement in hip moment validation mean absolute error (MAE).

Deep neural network architecture selection and optimization. The temporal convolutional network (TCN) for the fabricated control system was based on a previous study [61] and modified for joint moment estimation [34], [40], [60]. The TCN input consisted of a sequence of unilateral hip and knee encoder data, thigh, shank, and foot IMU data, and pressure insole data (vertical GRF and center of pressure). Due to the exoskeleton loop rate of 55 Hz, the data were upsampled in real-time to 200 Hz to match the sampling frequency previously used for the TCN. Each of the model inputs was also normalized using their corresponding mean and standard deviation computed from the training set. The TCN was designed with two output heads for the instantaneous estimates of the total hip and knee flexion/extension moments (i.e., the sum of exoskeleton torque and human biological moment). Joint moment labels in the training set were scaled by participant body mass during training, such that the model was trained to estimate joint moments in units of Nm/kg [34], [60]. Additionally, the TCN was trained to estimate the total joint moments to maintain the relationship between exoskeleton sensor data and TCN joint moment outputs, regardless of the specific parameters of the exoskeleton controller, such as assistance magnitude. Biological joint moments later in the fabricated control system were then computed by subtracting the exoskeleton torque from the total estimated moment.

A previous study conducted a thorough hyperparameter optimization of the TCN for estimating sagittal-plane hip moments [34]; however, this approach did not consider model generalizability (i.e., during the hyperparameter optimization the model training set and validation set consisted of the same ambulation modes). Additionally, this optimization was conducted under different conditions (only sagittal plane hip moments, cyclic ambulatory activities, and kinematic sensors only). Thus, a rigorous hyperparameter optimization was conducted using a multi-stage approach, specifically targeting model generalizability under conditions consistent with the fabricated control system (Table 1). In Stage 1 of the optimization, the dataset of human lower-limb biomechanics during cyclic and non-cyclic activities [47] was used to optimize a large, 11-dimensional hyperparameter space using Bayesian optimization implemented in Vizier [62] (training and testing over 10,000 models). In Stage 2, the network hyperparameters were finetuned using actual exoskeleton sensor data from Phase 1 and 2 of the experimental protocol over a smaller, 6-dimensional search space that may be rigorously optimized using grid search (training and testing 1,440 models). The 6-dimensional space was constructed to finetune the most sensitive network hyperparameters determined from the marginal and conditional results of the Stage 1 optimization. The resulting network hyperparameters (Table 1) resulted in an 8% improvement in MAE using leave-one-subject-out cross-fold validation compared to using the original hyperparameters [34].

Optimizing the training set for generalizability. Because the collection of actuated, motion capture-labeled data was difficult and costly, a subset of tasks should allow a user-independent biological moment estimator to generalize to the rest of human activities. To determine the subset of training activities that best promoted generalization, the same dataset for Stage 1 of the hyperparameter optimization was utilized to conduct a forward activity selection optimization (shown in FIG. 3D, subpanel a). During each optimization step, the TCN was trained and tested using leave-one-subject-out validation to compute the expected model performance when evaluated on a novel subject. First, model performance was computed by training the model using only the level ground walking data but tested on all activities. The TCN was then iteratively trained from random initialization, including one activity from the candidate task set into the training set at a time. On the $i^{th}$ optimization step, the relative improvement in generalizability $s_g[i]$ associated with including a candidate activity (g) into the training set (i.e., the relative improvement in model performance on all activities beside g) was computed as shown in Equations 11 and 12.

$$s_g[i] = \frac{1}{n-1} \sum_{j=0}^{n-1} e_{g^*,j}[i-1] - e_{g,j}[i], j \neq g \qquad \text{(Eq. 11)}$$

$$g^*[i] = \underset{g}{\operatorname{argmax}}\, s_g[i],\, \forall\, g \in G[i] \qquad \text{(Eq. 12)}$$

In Equation 11, n is the total number of tasks and $e_{g,j}[i]$ is the MAE of estimating joint moments during the $j^{th}$ task when trained using the updated training set over the first i−1 optimization steps and the additional candidate task g. Thus, $s_g[i]$ evaluated the overall improvement in model performance across all activities, excluding the relative improvement of the task at hand. Additionally, in Equation 12, g*[i] was the activity associated with the largest improvement score, which was then added to the training set for all further optimization steps and removed from the set of candidate tasks G to be selected in the next optimization step. This process was repeated until all tasks were selected.

The activity set saturating model generalization was defined as the minimum set of selected activities that contributed over 95% of the sum total of relative improvement in generalizability across the complete optimization. After the first seven tasks, the model had reached this threshold, indicating that additional tasks failed to substantially improve the model's ability to estimate joint moments on other tasks (FIG. 5, subpanel b). Aside from level ground walking, which was used to seed the optimizer, none of the selected tasks were cyclic, and four were unstructured.

Although model generalization saturated rapidly, task-specific data continued to improve user-independent, task-specific validation error (FIG. 3B, subpanel c). The overall model performance required 19 selected activities before validation MAE fell within 5% of the validation MAE when trained on all activities. This demonstrates that there was an additional benefit to be gained from training on task-specific data even after generalization was saturated. For all further analyses, the TCN was trained using the data from these 19 selected tasks unless otherwise stated.

Novel task analysis. As highlighted above, 19 of the 28 total tasks were used to train the final model tested in this study. This left 9 tasks out of the training set that were then tested online in the validation experiment with the results presented above. The hold-out tasks were lunge, stair ascent, declined walking, start and stop, medicine ball toss, step over, squat, curb, and step up. Thus, these tasks were new to the fabricated control system. To further test the generalizability of the fabricated control system, eight new novel tasks were designed to test the absolute limits of the deep neural network controller and attempt to find edge cases where performance might deteriorate.

Three participants completed these eight tasks while wearing the exoskeleton running the exemplary task-agnostic control system. The accuracy of the exemplary estimator was then compared to the ground-truth joint moments (shown in FIG. 6A).

Figure 6A:
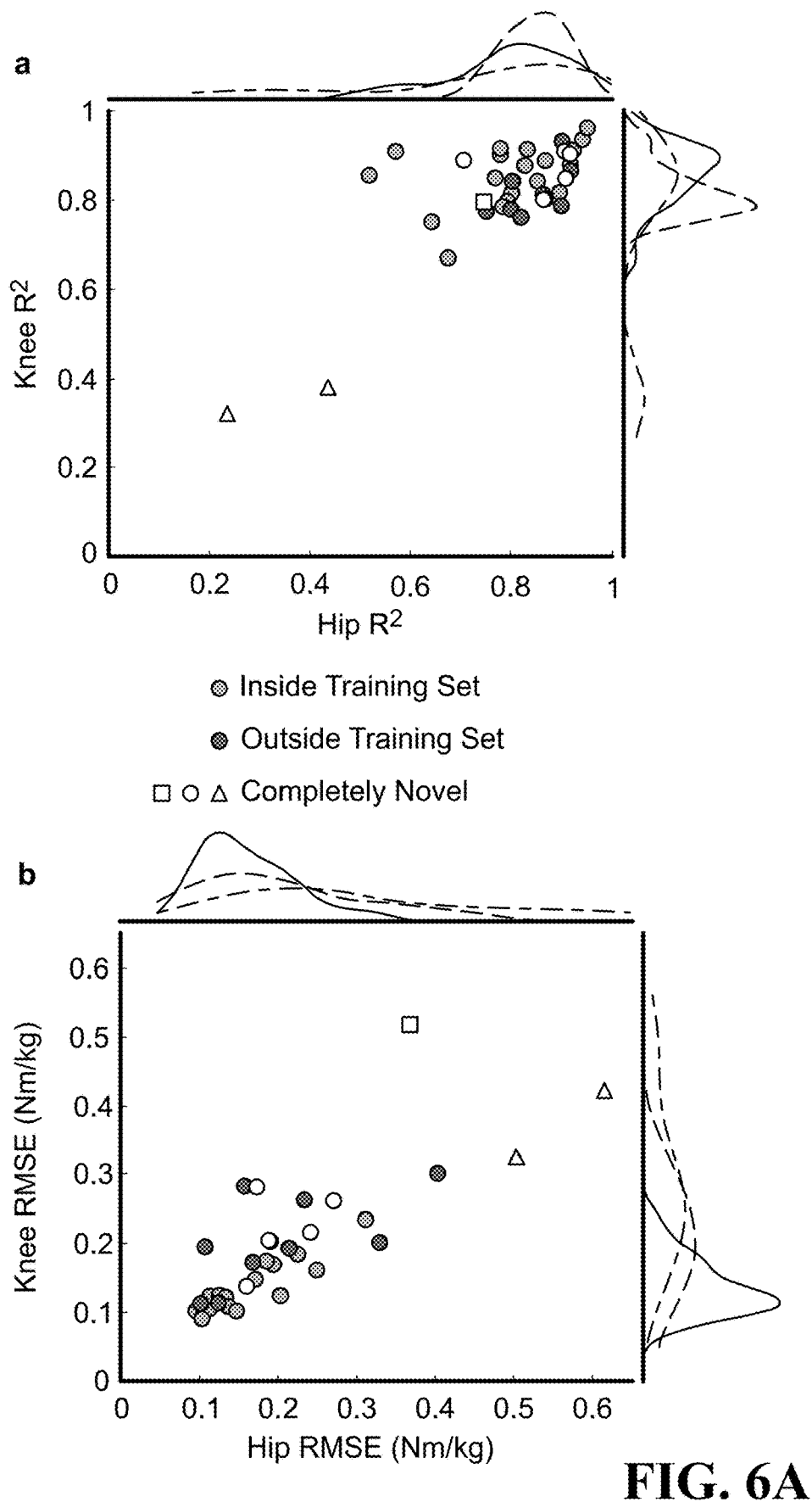
FIGS. 6A-6H show specifications and evaluations of a fabricated task-agnostic control system without optimization.

FIG. 6A shows the novel task analysis for the training dataset for the exemplary estimator. Subpanels (a) and (b) compare the $R^2$ and RMSE for both hip and knee for 3 categories (e.g., 19 tasks matching those inside the training set, 9 tasks matching those withheld from the training set, and 8 novel tasks). Each symbol represented a 3-subjects average across the subjects that performed the novel tasks.

Subpanels (c) and (d) groups the $R^2$ and RMSE of hip and knee for the eight novel tasks based on the estimator's performance on the tasks. The bars represented the average across the three subjects and the error bars represented ±1 standard deviation.

Subpanel (e) shows a single representative time series from 3 selected activities where the ground-truth joint moments are referred to as line 602 and the exemplary estimator's estimate are referred to as line 604. The exact RMSE and $R^2$ for each specific time-series trace was included at the top of each graph.

Subpanel (f) shows a comparison of the ground-truth joint moments between the training-set tasks and those outside the training set in terms of moment magnitude and shape similarity.

In general, the exemplary estimator performed well for the 9 left-out tasks as well as the majority of the novel tasks (shown in subpanels a and b). However, three of the extreme activities showed decreased estimator performance (shown in subpanels c and d). For the layup task, $R^2$ remained within the distribution of the training tasks, but RMSE was much higher than the other tasks. This indicates that the shape of the estimated moment curve approximated the true joint moments; however, the magnitude was not scaled correctly (shown in subpanel e). For burpees and mountain climbers, both $R^2$ and root mean square error (RMSE) were worse than other tasks.

To explore the uniqueness of these novel tasks relative to the distribution of the training set, the ground-truth joint moments were compared across different tasks using two metrics. 1) The average peak joint moment for each task was computed for both the hip and knee. The hip and the knee were then averaged to give a magnitude score for each task. 2) Each task was also broken into its constituent subtasks (e.g., walking has several speeds, each of which is a subtask) and created a reference table of kinetic profiles was based on all of the subtasks within the training data. $R^2$ was then used to compare the joint moment profiles from each of the subtasks (both those inside the training set and those outside) to each of the profiles in the training data for both the hip and knee. The maximum $R^2$ value for each subtask (best match between shape in the training set and each task shape) was chosen (this returned 1.0 for every task in the training set since it had a perfect match, whereas those outside the training set returned a score based on how similar they were to their best matching subtask in the training set). These values were then averaged across subtasks within each task group and across the hip and knee to give a similarity score for each task.

These two metrics, a joint moment magnitude score and a kinetic similarity score, were used to compare all of the task groups (shown in subpanel f). These results show that the areas where the estimator performance decreased were on tasks at the extreme boundaries of the tasks that were tested. For tasks where the joint moment magnitude was excessively higher than any training data, the model had difficulty correctly scaling the estimated torque even though the shape was accurate (as shown by a high $R^2$ but also high RMSE). For tasks where the kinetic shape was substantially different from those tasks in the training data (possibly due to the fact that both of these tasks involve using the hands for bodyweight support), the model had difficulty accurately estimating moments. However, even in these cases, the exemplary moment estimator remained stable and defaulted to low torque estimates that did not impede the user's movements (shown in subpanel e). This effect may have also been compounded by the insole sensing breakdown when most of the force was transmitted through the ends of the toes, which was the case for both burpees and mountain climbers. These results demonstrated the ability of the fabricated control system to handle novel tasks, which was vital to exoskeleton performance in the real world. Even when confronted with tasks at extreme ranges of human movement, the fabricated control system remained stable without hampering human movement.

Impact of specific sensors on joint moment estimation. Previous joint moment estimation studies often used data from IMUs and joint encoders as model inputs [34], [36], [40], [60], [63], [64]; however, the relative importance of each of these sensors (and others) on model performance was less explored. Additionally, the sensitivity of model performance relative to sensor dropout (e.g., from sensor disconnection) was also a critical real-world consideration. To investigate these two topics, several additional models were trained under two different conditions: first, using different subsets of available sensors, and second, simulating sensor disconnection during model deployment. The performance of these models was tested offline on the data from the 10 participants used to test the fabricated control system online. For the first condition, two of the sensor sets were inspired by common exoskeleton design choices: (1) removing the vertical ground reaction force (GRF) and center of pressure (COP) contributed by the insoles (i.e., -Insoles) and (2) removing all foot mounted sensing (i.e., -Insoles, -Foot IMU). The other three sensor sets were chosen to demonstrate the contribution from each unique sensor modality: (1) only using the thigh and shank IMUs (IMU only), (2) only using the hip and knee encoders (Encoder only), and (3) only using the GRF and COP from the foot insole (Insole Only). For the second condition, a single sensor was effectively dropped out during model testing by zeroing that respective sensor's inputs to simulate a sensor losing connection during device deployment. These comparisons were presented in FIG. 6B.

Figure 6B:
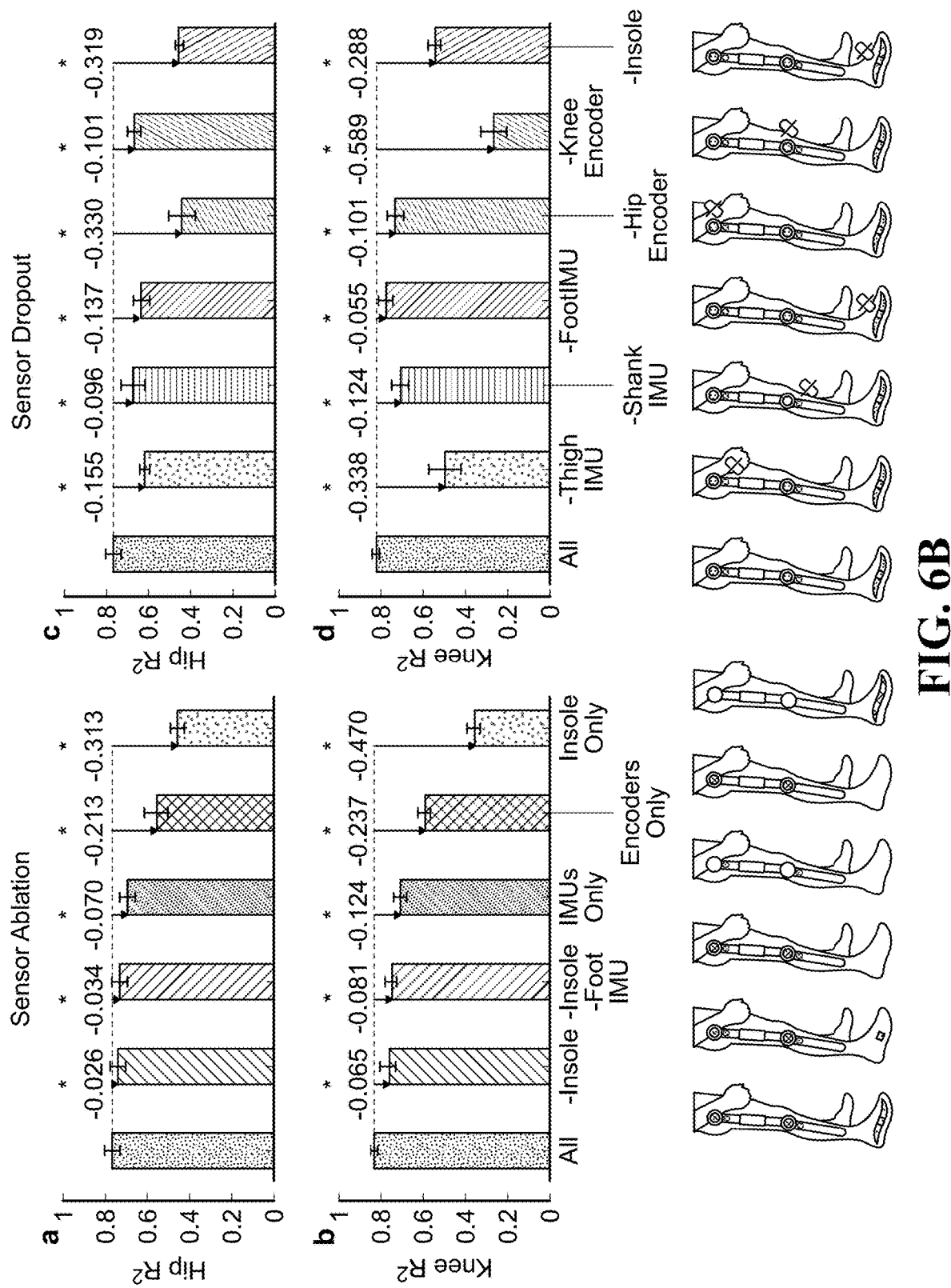

FIG. 6B shows sensor ablation and dropout conditions for joint moment estimation. In the first condition (i.e., sensor ablation), removing the GRF and COP resulted in a 0.03 and a 0.07 reduction in $R^2$ at the hip and knee, respectively, demonstrating the moderate benefit of adding kinetic-based sensing. While statistically significant, removing the foot IMU had the smallest effect. The "IMU only" condition resulted in a further drop in performance; the benefit gained from the encoders indicated that the 6-axis IMUs did not fully capture the kinematics. Overall, the IMUs contributed the most to the accuracy of the model, followed by the encoders and, lastly, the insole. Previous work has shown that kinematic sensors may be effectively used to estimate GRFs, indicating a potential reason the IMUs contributed the most to the model [36], [65]. Likewise, since the insoles initially measure pressure, from which the GRF was calculated, the amount of information provided to the model may be less than other more accurate sensors, such as in-ground force plates.

In the second condition (i.e., sensor dropout), dropping out the different sensors showed the reliance of the convolutional neural network on each sensor. In general, the loss of a sensor resulted in a significant drop in accuracy, indicating that the model generally used all available sensing inputs in the neural network weights. The loss of the knee encoder, however, was worse for estimating knee joint moments, and similarly, the loss of the hip encoder was worse for estimating hip joint moments. The loss of the thigh IMU and foot insole were more consequential to model accuracy when compared to the loss of the shank or foot IMU. These results indicated that the trained neural network learned to rely on each sensor for generating joint moment estimates, underscoring the importance of the need for high-quality hardware and sensor integration; however, additional analyses may explore training the network with synthesized sensor dropout to potentially improve robustness.

Lower-limb kinematic effects from wearing the exoskeleton. To understand the potential kinematic impact of wearing the exoskeleton, the joint angles at the hip, knee, and ankle were compared under three conditions (Exo On, No Exo, and Zero Torque) during the six joint work tasks (shown in FIG. 6H). As explained in Table 4, environmental factors, such as squat depth and timing, were controlled across conditions, allowing a fair comparison between the kinematics. These results demonstrated that there was very little difference between the kinematics when wearing the exoskeleton (powered on or off) and not wearing the exoskeleton. Even though each task was controlled with a metronome, some tasks (like squatting, lunges, and step-ups) had greater variability in the exact timing of the task within each individual condition (as shown by the higher standard deviation); however, across conditions, the average kinematics still followed the same profile. These results indicated that the exoskeleton was able to achieve transparency with respect to the desired range of motion of the participant while still providing enough assistance to significantly reduce the positive lower-limb biological joint work. This also confirmed the validity of the joint work analysis by demonstrating that the improvements seen with the exoskeleton assistance were not primarily coming from a change in the way participants performed the tasks; however, upper body kinematics were not measured or investigated.

Detailed processing and biomechanical modeling. The procedure for processing motion capture marker trajectories and vertical ground reaction force (GRF) followed a previous study [47]. Ground-truth joint kinematics and moments were computed in OpenSim using the Inverse Kinematics and Inverse Dynamics tools, respectively [45], [46]. The OpenSim gait [23], model was used as the base model for each subject-specific anthropometric model. To model the participant in the exoskeleton, the OpenSim model was first scaled based on a biological static pose and biological body mass from a neutral standing trial collected without donning the exoskeleton. This initial model ensured that the model's segment masses and sizes were accurate with those of each participant. This biological model was used to compute joint kinematics and moments during the No Exo trials.

To model the exoskeleton, cylindrical masses were placed on the shank and femur segments of the scaled biological model at locations that matched the exoskeleton actuators. The mass of each modeled actuator was 0.485 kg and was constant across participants. The mass of the exoskeleton, aside from the actuators, was added to the model torso segment since the additional weight was mainly from the electronics housed in the exoskeleton backpack. Finally, the markers were adjusted based on a static pose with the participant wearing the exoskeleton; however, the dimensions, mass, and inertia of each segment were held constant to maintain an accurate model of the participant's anthropometry when wearing the exoskeleton. The resulting OpenSim model was used to compute joint kinematics and moments during the Exo On, Zero Torque, and model accuracy trials.

Experimental data collection. The study collected data over three phases to facilitate model training and online testing of the joint moment estimator. Over the three phases, a total of 22 able-bodied participants participated in the study protocol. Participants provided written informed consent to participate in the study under Georgia Institute of Technology IRB protocol H21184. In each phase, participants completed a set of 28 cyclic and non-cyclic activities, consisting of 66 total conditions and outlined in FIG. 3C. During these activities, the study tracked retroreflective markers on both the body and exoskeleton using a motion capture system at 200 Hz (Vicon Motion Systems, United Kingdom). Additionally, the study used overground force plates and an instrumented treadmill (Bertec, OH, USA) to measure GRFs at 1000 Hz. Due to software limitations, the study collected motion capture data for two participants during Phase 1 at 120 Hz and subsequently upsampled to 200 Hz.

To sync the exoskeleton data with the participants' ground-truth joint biomechanics, the study first upsampled the exoskeleton data to 200 Hz to match the frequency of the motion capture data. At the start of each exoskeleton trial, when the study collected motion capture and GRF data, participants kicked three times with their right leg while exoskeleton actuation was off. Based on this movement, the study time shifted the exoskeleton data to maximize the $R^2$ between the right knee encoder and the resulting right knee joint kinematics computed from the biomechanical model.

Table 2 shows the data collection process for model training of the fabricated control system comprising 3 phases.

TABLE 2

| Phase | Description |
| --- | --- |
| 1) Initial training data collection. | In Phase 1, 10 participants (6 males, 4 females, age of 23.7 ± 2.0 years, height of 176.3 ± 8.7 cm, and body mass of 76.5 ± 13.3 kg) participated in a single-day protocol collecting exoskeleton data and ground-truth human joint moments during the 28 cyclic and non-cyclic activities. Since the study did not deploy the exemplary task-agnostic control system until initial training data were collected, participants completed all |

TABLE 2-continued

| Phase | Description |
|---|---|
|  | activities with exoskeleton assistance turned off while the study collected sensor data. To further increase the richness of the training data, the study also hand-designed activity-specific controllers to collect actuated data for 46 out of the 66 total experimental conditions. The study implemented spline-based assistance as a function of the gait phase for cyclic tasks using eight- and six-node piecewise cubic Hermite interpolating polynomials at the hip and knee, respectively. The study estimated the gait phase in real-time based on the duration of the previous two strides measured from the pressure insole data [27]. The study shaped the splines based on the biological hip and knee moments [47]. Additionally, the study used an impedance-based stance-swing state machine during non-cyclic, impedance-like activities to control the device. The study determined stance and swing phase were based on the vertical GRF data measured from the pressure insoles. During leg swing, the study set assistance to zero. During stance, the exoskeleton commanded torques using a spring-mode with a stiffness of 5 Nm/rad and an equilibrium angle of zero degrees, which allowed all tasks to be completed without exceeding the actuator capabilities. These controllers were not intended to provide optimal assistance but instead were used to collect a rich dataset for model training that included actuated exoskeleton data as well as unactuated data. |
| 2) Training data collection with preliminary task-agnostic control. | In Phase 2, 5 new participants (4 males, 1 female, age of 23.4 ± 4.9 years, height of 171.4 ± 7.4 cm, and body mass of 68.0 ± 12.7 kg) participated in a single-day protocol similar to Phase 1. However, during Phase 2, the study deployed the exemplary task-agnostic control system on the exoskeleton using a preliminary joint moment estimator trained using the Phase 1 dataset. Each participant completed all 28 tasks while the exoskeleton provided assistance, which generated a dataset closely representing the controller to be deployed in the final phase. |
| 3) Neural network online accuracy and user outcomes testing. | In Phase 3, 10 participants (7 males, 3 females, age of 21.8 ± 2.5 years, height of 174.8 ± 8.5 cm, and body mass of 71.7 ± 10.2 kg) participated in a multi-day protocol consisting of three sessions, each centered on a specific outcome metric: model accuracy, metabolic cost, and lower-limb biological joint work. The study assessed model accuracy with $R^2$, root mean square error (RMSE), and normalized mean absolute error (MAE) with respect to ground-truth hip and knee moments [33], [34], [66]. The study normalized MAE to the peak-to-peak range of the corresponding ground-truth joint moments per trial. Metabolic cost and lower-limb biological joint work provided an indication of the exoskeleton's impact on user effort [3], [14], [57], [67], [68], with metabolic cost more directly related to user energetics but only possible to measure and fairly compare during long bouts of repetitive tasks with consistent mechanical work requirements. During each session, the study controlled the exoskeleton using the exemplary task-agnostic control system informed by the model trained on Phase 1 and 2 data. Three of the participants were already enrolled in previous phases of the protocol. To ensure that the fabricated control system was evaluated on a subject-independent basis, the study retrained separate models from random initialization for each of these participants while withholding the subject-specific data from the training set, ensuring that each participant was novel to the network. |

The study performed the network accuracy session using the same protocol as Phase 2, where the exoskeleton was powered on for all 28 activities. During each condition, the study collected motion capture and GRF data to compute ground-truth joint moments, which were then used to evaluate model performance. Each participant completed this session first which served as a training session for the participant to adapt to the exoskeleton assistance, a critical component to evaluating human-exoskeleton interactions [69]. Three participants returned to perform eight novel tasks while collecting the same data to compare estimates to ground-truth moments (shown in Table 3).

During the lower-limb biological joint work session, participants completed six additional tasks detailed in Table 4. The study selected these tasks for a joint work analysis since measuring their resulting metabolic cost was infeasible due to subject fatigue and time constraints. The study repeated each activity under three conditions: (1) wearing the exoskeleton with the task-agnostic controller providing assistance (Exo On), (2) without wearing the exoskeleton (No Exo), and (3) wearing the exoskeleton without actuation (Zero Torque). The study randomized the order of these conditions; however, to minimize the time taken to complete the experimental protocol, the study placed the No Exo condition either at the beginning or at the end, and all of the No Exo activities were completed in succession, while the study alternated the Zero Torque and Exo On between each activity. The study computed the lower-limb positive biological joint work of the participant by summing the average positive biological joint work from the hip, knee, and ankle joints. The study computed positive biological joint work for each joint as the integral of the positive biological joint power for each joint, which was calculated as the product of the biological joint velocity and the biological joint moment (i.e., the joint moment computed from ground-truth inverse dynamics after subtracting exoskeleton assistance torque). The study presented the results as the average right leg positive joint work per repetition or stride. Due to a bug in the exoskeleton data logger during the experimental protocol, the study did not include stair ascent results for one participant and lunging results for one participant. Further, while this analysis quantified changes in the energetics of the biological joints, it did not account for muscle-level changes, such as muscle co-contraction.

At the beginning of the metabolic cost session, each participant completed a habituation protocol to reacclimate to the device. The habituation protocol consisted of level-ground walking on the treadmill at 1.25 m/s while wearing the exoskeleton controlled by the task-agnostic controller. Exoskeleton assistance was sequentially ramped up in four evenly spaced increments every 2 minutes until the participant reached full torque assistance. The participant then walked at full assistance (20% and 15% of the estimated biological hip and knee moments, respectively) for 5 minutes to complete the habituation protocol.

During each metabolic trial, the study measured oxygen intake ($\dot{V}O_2$) and carbon dioxide exhaust ($\dot{V}CO_2$) from each breath using a metabolic measurement system (TrueOne 2400, ParvoMedics, UT, USA). The study computed metabolic costs from the $\dot{V}O_2$ and $\dot{V}CO_2$ measurements using the modified Brockway equation [24], [70]. The study took these measurements during four tested activities: level ground walking at 1.25 m/s, lifting a 25 lb weight, 5° incline walking at 1.25 m/s, and running on level ground at 2.5 m/s. For the lift weight trials, a metronome played a tone at 10 bpm, and participants were instructed on each tone to use both hands to lift a 25 lb kettlebell off a shelf at waist height, touch the weight to the ground between their feet, and then replace the weight on the shelf before returning to neutral standing and waiting for the next tone. For each activity, the study tested the same three conditions as those of the joint work protocol: No Exo, Exo On, and Zero Torque. Additionally, the study measured the basal metabolic rate for each participant from a six-minute standing trial while not wearing the exoskeleton. Due to experimental time constraints, the study did not collect motion capture data during the metabolic experiments.

The level ground walking, lift a weight, and incline walking trials were each completed using a within-participant counter-balanced design (ABCCBA) [27], wherein "A," "B," and "C" denote a position (i.e., condition) of a participant. Each condition lasted six minutes, and the study computed the steady-state metabolic cost for each trial as the average of the last three minutes of data [24], [71]. Due to the strenuous nature of running, especially during Zero Torque, the running conditions were only completed once (ABC) and lasted 3.5 minutes. The study then computed steady-state metabolic cost from the output of a first-order model fit to the running data [24], [71]. The study subtracted the basal metabolic rate measured for each participant from the steady-state metabolic cost of each condition to compute the user's net metabolic rate required to complete each activity. Within each activity, the study pseudorandomized the order of conditions, with the No Exo condition either in the "A" or "C" position to minimize don/doff time. Due to improper calibration of the metabolic system, the study omitted the metabolic data for one participant.

To further understand the effect of the fabricated control system on user metabolic cost during transient activities, the study developed an additional protocol where the study recorded metabolic cost during a varying speed and incline treadmill circuit for three of the participants. Each 6-minute trial involved walking at speeds varying from 0.6 to 1.5 m/s and running speeds of 2.0, 2.25, and 2.5 m/s. The study changed the speed of the treadmill according to the profile shown in FIG. 10, subpanel (b). Similarly, the treadmill incline varied between 0° and 15° throughout the trial (FIG. 10, subpanel b). The study designed the speed and incline profile of the treadmill to decrease walking speeds at higher inclines, to keep the subject within an acceptable aerobic respiration range for valid metabolic cost measurements. Similar to the outcomes testing described above, the subject completed a randomized ladder protocol consisting of No Exo, Exo On, and Zero Torque conditions (ABCCBA [27]) while wearing a metabolic measurement system (TrueOne 2400, ParvoMedics, UT, USA). Due to an exoskeleton malfunction, the study removed one trial of data from one participant; however, this trial was part of the C condition within the protocol, which should mitigate any adverse ordering effects from the removed datapoint. As described above, the study computed metabolic cost using the Brockway equation, and the study averaged the metabolic cost across the last three minutes of the treadmill trial. This represented a consistent snapshot of metabolic cost across varying conditions.

While the study did not collect qualitative feedback from participants about exoskeleton assistance, some participants expressed that the knee extension assistance did not feel helpful during level ground walking and occasionally felt uncomfortable. Otherwise, the overall response from participants about the exoskeleton assistance was positive across the trials used to evaluate the metabolic cost and lower-limb biological joint work.

Detailed description of the baseline method. Because no previous studies tested an exoskeleton controller in such a wide array of tasks, the study developed a best-case baseline method to compare against the joint moment estimator (i.e., exemplary estimator) employed by the fabricated control system, implemented as an extension of previous mode-based exoskeleton controllers. Many exoskeleton controllers use an activity classifier to switch between exoskeleton control modes [1], [18-23]. Within each state, different control laws may be applied [23], [26-28], [30]. The study used a 28-mode classifier approach for the best-case baseline since it matched the delineation of task groups for the study. Although a 28-mode classifier may result in many mode misclassifications when trained and deployed online, substantially fewer classes would result in poorly tuned control laws within each task group, and increasing to a separate class for each subtask (66-mode classifier) would increase possible misclassifications. This baseline was a best-case model because, whenever possible, the study gave this approach ideal inputs that represented the ceiling of what a real system may achieve. For the classifier, this meant that the study applied the model post hoc and assumed perfect classification accuracy, which currently may be unachievable in a real scenario, especially given 28 classes to choose from.

The study used data from the same 15 training participants that the study used to train the deep learning approach to create the baseline method. The study then tested it on data from the same 10 participants that the study collected to verify the deep learning-based approach. To design the control laws to apply during each mode, the study used the three categories of cyclic, impedance-like, and unstructured. During cyclic tasks, many controllers relied on gait events and gait phase percentages to look up the corresponding biological moment [25], [72], [73]. Thus, to create the control law during cyclic tasks, the study used the stride averaged curves from the training data (Phase 1 and Phase 2) to design a single moment profile for the hip and one for the knee in each of the cyclic activities. The study accomplished this by first segmenting the weight-normalized ground-truth moment data by gait cycle, normalizing time to percent cycle, and then averaging the curves across participants for each subtask. The study then averaged those subtask participant-averaged curves across all the subtasks within a larger task group. This gave a single average biological moment profile that may be applied to any task that was classified as belonging to that task group. Although any real-time gait phase estimator had associated errors in the estimate, the study chose again to use a best-case model assumed to have perfect gait phase estimates when the study applied these splines to the real data.

During impedance-like tasks, many controllers used spring and damper parameters along with joint angles and joint velocities to compute the desired torque [28-30]. To create impedance control laws, the study concatenated the ground-truth weight-normalized joint moment data, joint angle data, and joint velocity data across training participants and subtasks within each larger task group. The study then used an optimizer (fmincon in MATLAB) to find the optimal spring stiffness and damping to minimize the error between the impedance-based estimate of the net joint moment and the actual ground-truth values. The study performed this process for each task group within the impedance-like category as well as separately for the hip and the knee. Although real-time implementations of this method may operate on joint angles and velocities from exoskeleton encoders, which may not resemble the biological kinematics due to soft tissue deformation and sensor noise, the study again chose to use a best-case model where the study provided the impedance equation with the actual biological joint angles and velocities based on motion capture and inverse kinematics. Because standard control architectures had no methods for handling highly unstructured activities, the study did not compute a baseline method for the unstructured tasks.

Statistical analysis. The study conducted the statistical analyses using Minitab v19 with an alpha level of significance of 0.05. Due to the experimental design, the study computed all statistical tests using within-subject differences (i.e., repeated measures), and all tests were two-sided. The first hypothesis was that the exemplary joint moment estimator would significantly increase $R^2$ and significantly reduce RMSE and normalized MAE relative to the baseline method. To test this hypothesis, the study used a two-way analysis of variance (ANOVA) to test for main and interaction effects between estimators (i.e., the exemplary estimator and the baseline method) and among activity types (i.e., cyclic and impedance-like activities) with respect to model $R^2$, RMSE, and normalized MAE.

Prior to computing the results, the study time-aligned the joint moment estimates and corresponding ground-truth values to account for any delays in the online joint moment estimator. In the case that the ANOVA found a significant main effect between the estimators, the study also ran a post hoc multiple comparisons test using a Bonferroni correction to evaluate pairwise differences between the exemplary estimator and the baseline method. Since the Bonferroni correction may substantially reduce statistical power in the presence of many pairwise comparisons and since the study only intended to compare the performance of the exemplary estimator with the baseline method within each activity type, the study only evaluated a subset of the possible pairwise comparisons during this test, which was determined a priori (i.e., before looking at the results). Specifically, the only pairwise comparisons considered were those that compared the exemplary estimator to the baseline method within the same activity type. Given that Minitab did not support this type of planned comparison, the study ran a full multiple comparisons test in Minitab and subsequently corrected the p-values manually based on the reduced set of comparisons.

Figure 6C:
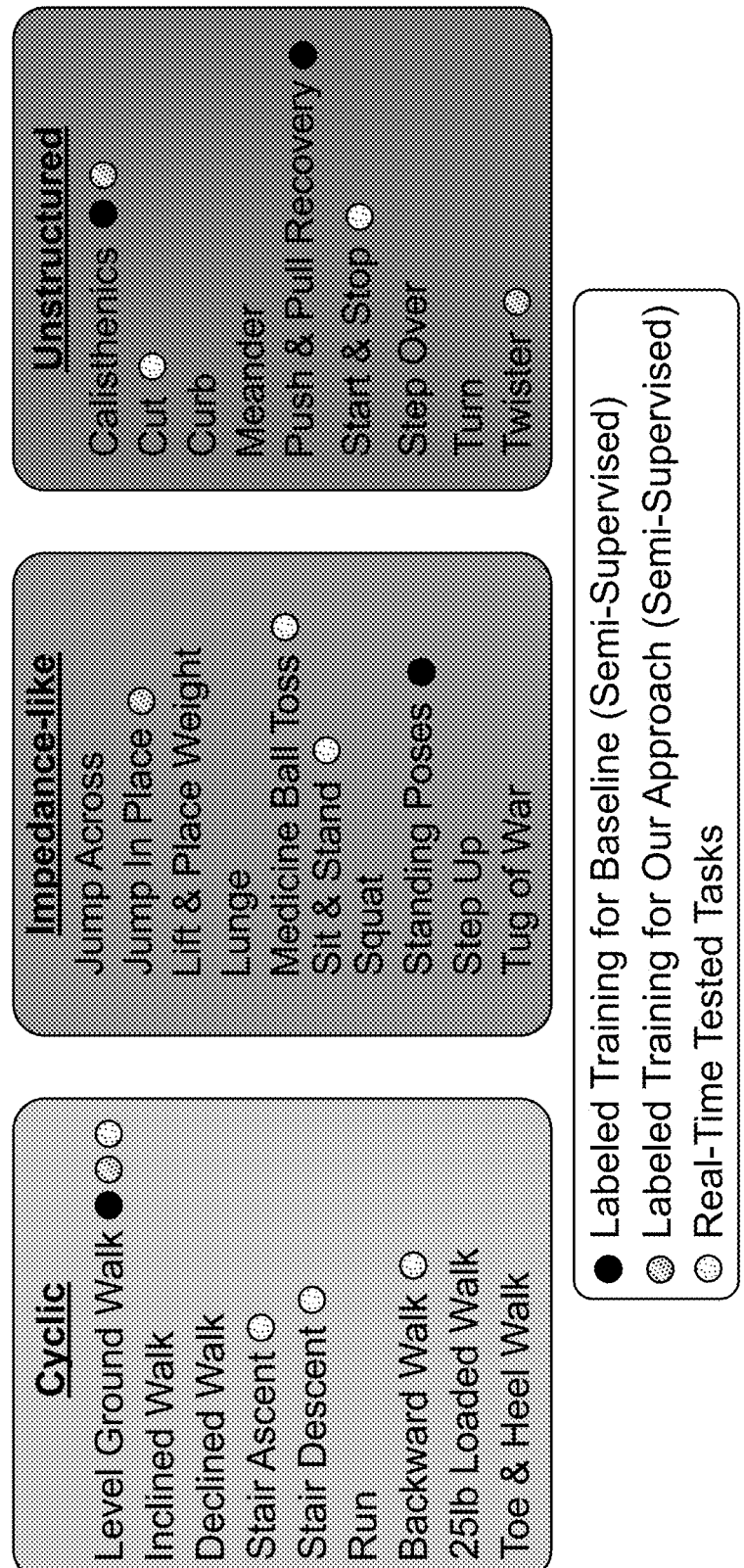
Figure 6D:
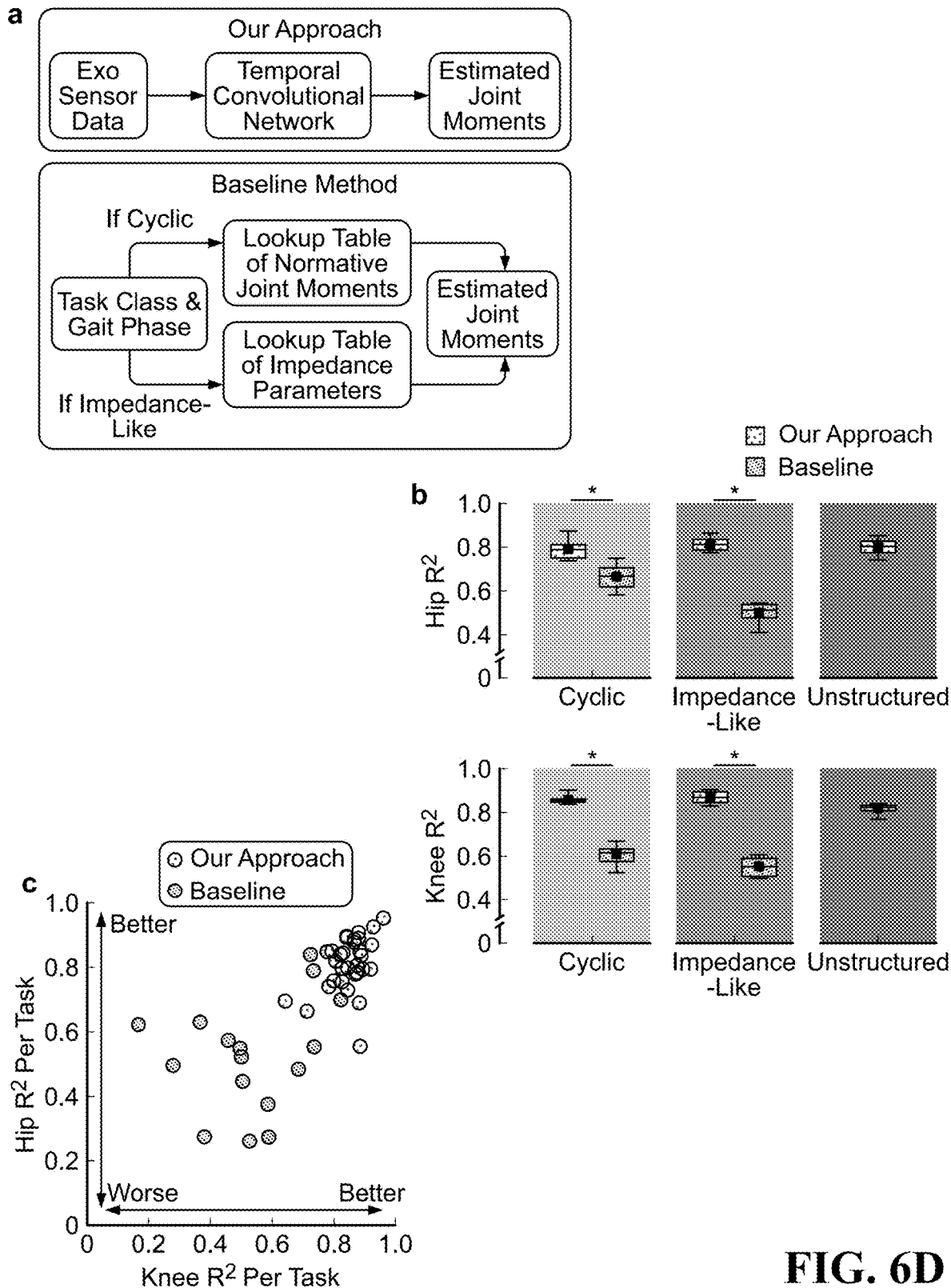
Figure 6D:
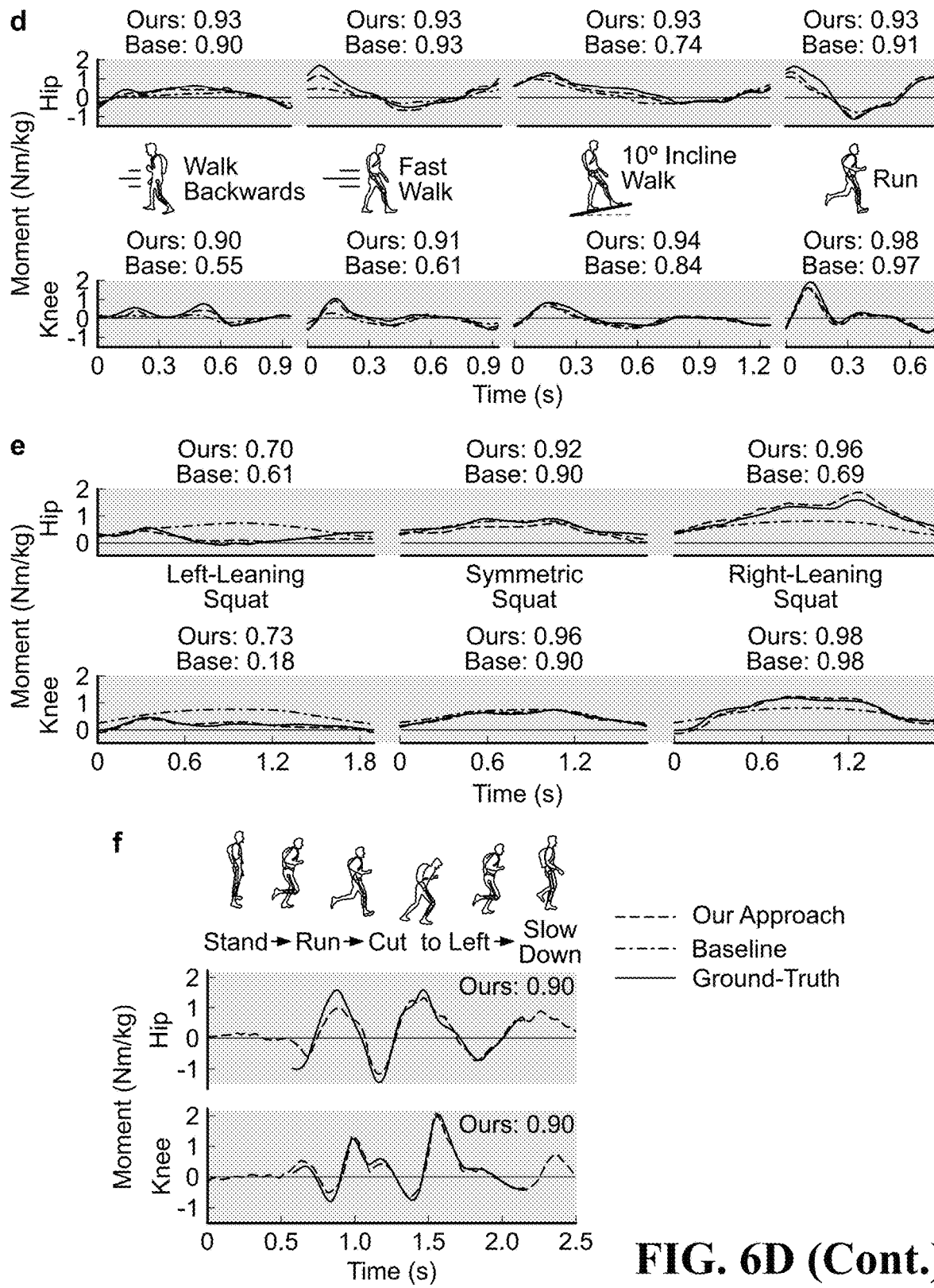
Figure 6E:
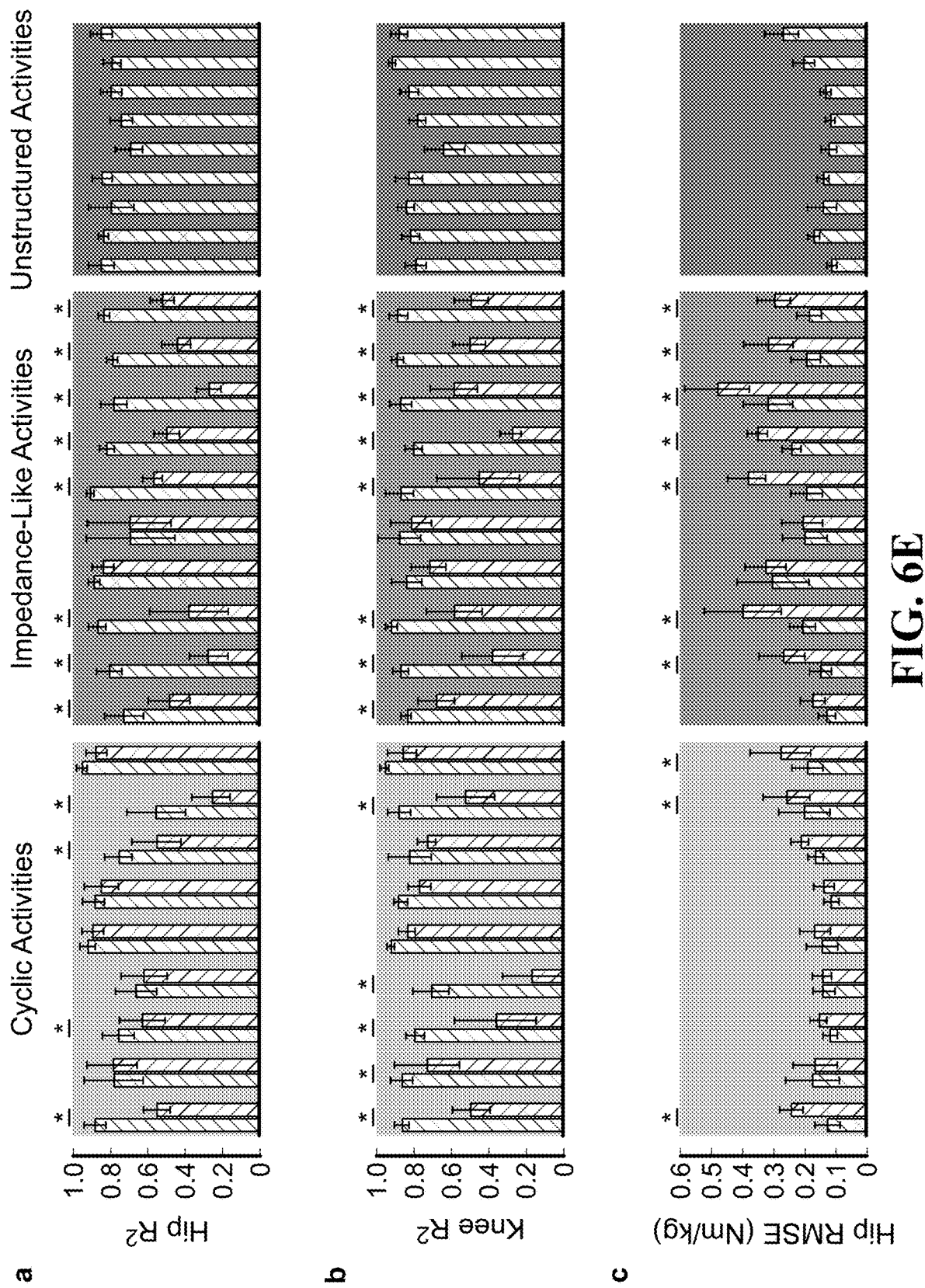
Figure 6E:
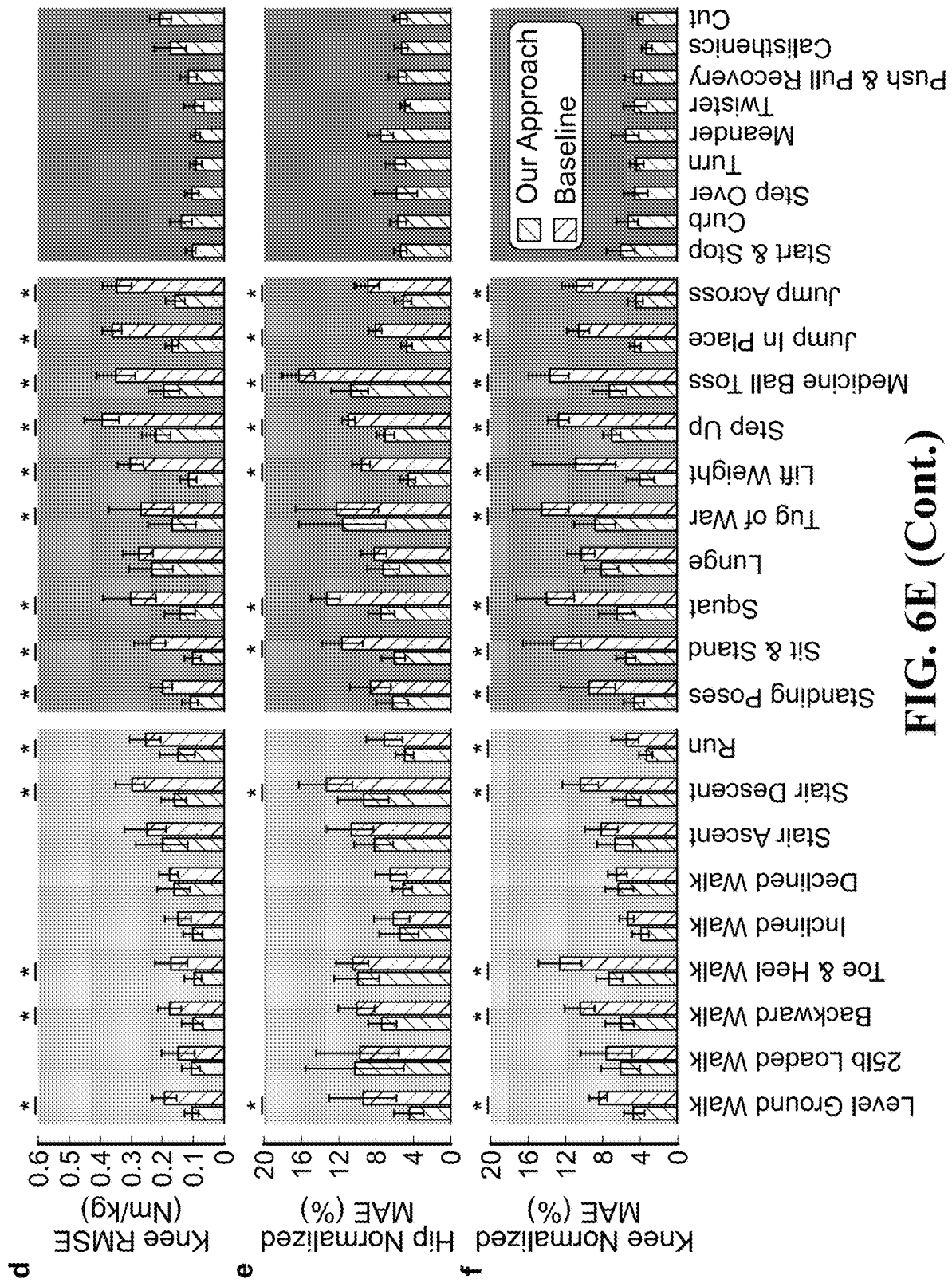

Within each type of activity (cyclic and impedance-like), the study used an additional two-way ANOVA to test for main and interaction effects between estimators and among each activity, which corresponded to the results presented in FIG. 6E for $R^2$, RMSE, and normalized MAE. In the case that the ANOVA found a significant effect between the estimators, the study also ran a post hoc multiple comparisons test using a Bonferroni correction to test for differences between the exemplary estimator and the baseline method during each task. The study again used a planned comparisons approach to evaluate the pairwise comparisons between the results of the exemplary estimator and the baseline method only when each result pertained to the same task.

Additionally, the study hypothesized that the exemplary task-agnostic control system would significantly reduce user metabolic cost and lower-limb positive biological joint work relative to the Zero Torque condition for each evaluated activity. To analyze metabolic cost (FIG. 6G, subpanel a) and lower-limb joint work (FIG. 6G, subpanel c), the study used a one-way ANOVA to test for a significant main effect among the exoskeleton controllers (i.e., Exo On, No Exo, and Zero Torque) for each activity. Following a significant effect, the study used multiple comparison tests with a Bonferroni correction to determine pairwise differences within each activity.

Since each sensor modality provided unique information to the joint moment estimator (joint 1D positions and velocities from encoders, 3D acceleration and 3D angular rate from IMUs, and ground reaction force information from pressure insoles), the study also hypothesized that retraining the model with a reduced sensor suite would reduce $R^2$. Similarly, since the study trained the model on a specific sensor suite (thigh, shank, and foot IMUs, hip and knee encoders, and pressure sensing insoles), the study hypothesized that the loss of a sensor during deployment would significantly reduce the $R^2$ of the model. To compare the effects of each sensor combination or loss of sensor data on overall estimator performance (shown in FIG. 6B), we used a one-way ANOVA to test for a main effect in $R^2$ at the hip and knee. To evaluate pairwise comparisons between the All condition and each sensor ablation or dropout condition, the study used a planned comparisons approach with a Bonferroni correction.

Comparison to state-of-the-art moment estimators. While state-of-the-art biological moment estimators have only been validated on a small subset of activities and typically rely on offline analyses, the exemplary joint moment estimator performed similarly to or outperformed previous subject-independent hip and knee moment estimators [20], [33], [40], [60], [66]. For instance, a moment estimator was evaluated on four non-locomotion tasks in addition to level ground walking and running with the performance of 0.85 Nm/kg RMSE at the hip and 0.37 Nm/kg RMSE at the knee [74]. The results of the exemplary estimator (hip RMSE 0.17 Nm/kg and knee RMSE 0.14 Nm/kg) substantially outperformed this approach and were validated on more than 20 additional, demonstrating the breadth of the exemplary estimator. Averaging Pearson's correlation coefficient (r) across treadmills, ramps, and stair modes resulted in a r of 0.904 for the hip flexion moment and 0.919 for the knee moment [36]. The results of the exemplary estimator for those modes (Pearson's correlation of 0.904 for the hip and 0.928 for the knee) were similar; however, the comparison was not direct because different sensors were used in the previous study, and its approach estimated both moments and GRFs. For only ambulation modes (level walking, ramps, and stairs), another previous study reported offline RMSE results of 0.13 Nm/kg at the hip [34], with follow-up work reporting an RMSE of 0.14 Nm/kg when deployed onboard a hip exoskeleton [40]. The study found similar performance during these activities (average RMSE of 0.15 Nm/kg); however, the exemplary estimator simultaneously estimated knee joint moments and was capable of estimating joint moments over a much broader range of tasks.

Assessing the joint moment estimation performance of the model. The study assessed the estimator performance using root mean squared error (RMSE) between the model estimated moments and the actual ground truth joint moments calculated using inverse dynamics from OpenSim [12']. The study then averaged the RMSE as well as $R^2$ across subtasks within the larger 28 task groups and then across tested participants.

To provide suitable comparisons to demonstrate the performance of the deep domain adaption (DDA) method, the study presented the results relative to 1) a best-case model and 2) a baseline model, which is trained without domain adaptation. To construct the best-case comparison, the study trained a moment estimator using all of the training tasks and subjects, thus replicating the results of a previous study [12'] but without insoles or a foot IMU and using all 28 tasks for training. For the baseline model in the semi-supervised case, the study trained a moment estimator in the same way as the best-case but with only the same limited number of tasks and a limited number of participants that the study gave to the fabricated control system. For the baseline model in the unsupervised case, the study trained the model with only the simulated data (10 participants and 28 tasks).

The study computed the percent increase in error for the fabricated control system and for the baseline with respect to the best-case model, as seen in Equation 13.

$$\% \text{ increase in } RMSE = \frac{RMSE_{approach} - RMSE_{bestcase}}{RMSE_{bestcase}} \cdot 100 \quad \text{(Eq. 13)}$$

The value of this percent increase expressed how far an approach was away from the best-case, and the percentages may be compared between the fabricated control system and the baseline.

Real-time experiments. To validate online performance, the study deployed three models in a real-time controller loop. For the semi-supervised case, the study deployed both the baseline and the fabricated control system in real-time. The study selected four tasks and four participants for use in the labeled training set. The specific four tasks were based on their respective optimal task ranking. For the unsupervised case, the study deployed a model trained with the fabricated control system. Although the study attempted to deploy the baseline model for this case, the model accuracy with only simulated data was so poor that the controller was not stable for real-time deployment, so the study omitted the real-time comparison, but the study still ran it in post-hoc with the same data collected with the real-time unsupervised case for a direct offline comparison.

To deploy the models in real-time, the study used the autonomous hip and knee exoskeleton. Because the moment estimators were directly real-time deployable, no additional computational time loss was incurred by running the models in comparison to previous studies. As in a previous study, a main single-board computer (Raspberry Pi, Cambridge, UK) handled the I/O for the device as well as data logging, while a separate co-processor handled deep learning inference (NVIDIA Jetson Nano, Santa Clara, CA). All experimenter interaction was handled through an offboard laptop connected to a Wi-Fi network hosted by the onboard microprocessor. The device as well as the mechatronics, are pictured in FIG. 6C, subpanel (a).

FIG. 6C shows training models including labeled exoskeleton data (semi-supervised), wherein each model included four tasks. Seven of the real-time tested tasks were selected to be novel to both approaches, while the eighth, level ground walking, was part of the semi-supervised training set. Unlabeled exoskeleton data and biomechanics datasets included all tasks.

The study performed a similar protocol to collect the training data [12'], [40'] with a pared-down task list. Eight participants (4 male, 4 female, age: 23.0±3.8 years, height: 173.4±2.6 cm, body mass: 68.2±10.7 kg) performed eight tasks with three different controllers. The study split the tasks between the three larger task categories [12'] with seven outside of the labeled training set for both models in the semi-supervised case, as seen in FIG. 14, subpanel (b). These tasks were: medicine ball toss (15 lb center, right, left), cutting (left & right, fast & slow), sit-to-stand (short and tall chair, with and without armrests), starting & stopping, stair ascent (slow, normal, fast), stair descent (slow, normal, fast), and walking backward (0.6 m/s, 0.8 m/s, 1.0 m/s). The study also included one task that was in the training set for both semi-supervised models: level ground walking (0.6 m/s, 1.2 m/s, 1.8 m/s, and shuffle). The order of the models was randomized for each participant; all tasks were performed with a single model before switching models. During each task, the study recorded exoskeleton data for the encoders (hip and knee) and IMUs (thigh and shank), as well as the estimated joint moment from the current model. The study recorded motion capture data at 200 Hz and ground reaction forces at 1000 Hz.

Data processing was performed in a similar manner to [12'], where subject-specific models were fitted to each participant standing in a static pose. The study then added exoskeleton mass for the actuators at their respective joints and the additional mass at the torso. Inverse kinematics matched the model to the measured motion capture locations, and inverse dynamics were then calculated based on the ground reaction forces using OpenSim [30'], [31']. The study computed an activity flag to determine when the activity was occurring and then the study used the activity flag as the sections to assess model performance. The study filtered ground truth joint moments before comparing them to real-time estimates.

To assess the real-time model performance, the study captured the joint moment estimates and then post hoc aligned those estimates with the ground truth moment labels as in [12']. The study did not deploy the best-case model in real-time but instead ran the collected sensor signals through the best-case model post-hoc, thus allowing a fairer comparison of performance. The study did this individually for the data from each model; thus, the best-case model performance was unique to each specific model's data (except in the case of the unsupervised baseline, as noted above).

Real-time performance results. FIG. 6D shows the online joint moment estimation performance (e.g., $R^2$ RMSE, normalized MAE) between the exemplary estimator and baseline method. The model for the exemplary estimator was validated online with 10 participants to assess its ability to accurately estimate human joint moments while providing assistance. No user-specific data were included in the training to keep the tests user-independent. Additionally, a best-case baseline method was developed based on current state-of-the-art exoskeleton control to compare against a joint moment estimator of the fabricated control system; for cyclic activities, the baseline method estimated the user- and stride-averaged hip and knee moments from each activity (e.g. for level walking, the baseline used the average level walking curve), and for "impedance-like" activities (e.g., jumping in place), the baseline method estimated the hip and knee moments by estimating zero moments when in swing or flight and by using a linear spring-damper model fit to each activity during stance.

In FIG. 6D, subpanel (a) shows the exemplary estimator (referred to as Our Approach) and the best-case baseline method, wherein the baseline method relied on perfect task classification and gait phase.

As shown in subpanel (b), the exemplary estimator (referred to as Our Approach) improved $R^2$ at the hip by 0.13±0.04 (19±6%, $P=2\times10^{-7}$) and at the knee by 0.25±0.04 (40±7%, $P<10^{-16}$) compared to the baseline method during cyclic activities. For impedance-like tasks, the exemplary estimator improved $R^2$ by 0.31±0.05 (63±10%, $P=4\times10^{-16}$) at the hip and by 0.32±0.02 (57±3%, $P<10^{-16}$) at the knee compared to the baseline method. The exemplary estimator estimated hip and knee moments better than the baseline method for both cyclic (Hip $R^2$: 0.79, Knee $R^2$: 0.86) and impedance-like activities (Hip $R^2$: 0.81, Knee $R^2$: 0.87) without any subject-specific calibration.

Subpanel (c) shows $R^2$ per task for the exemplary estimator and the baseline method. Each marker corresponds to the inter-subject average $R^2$ for a single task. Subpanel (d) shows representative strides extracted from various cyclic tasks. The baseline method required a different task classification for each depicted ambulation mode, while the exemplary estimator did not require any discrete mode switching.

Subpanel (e) shows representative trials when squatting to the left, squatting symmetrically, and squatting to the right. The impedance control-based approach did not capture changes in the joint moments by relying solely on kinematics. Instead, the exemplary estimator accurately modified the joint moments with the change in weight distribution across the user's legs.

Subpanel (f) shows a representative trial during leftward cutting, depicting the ability of the exemplary estimator to modulate assistance during highly unstructured behaviors. Since it was unclear how to extend the baseline method to these types of activities, the baseline method was omitted.

FIG. 6E shows the detailed online joint moment estimation performance between the exemplary estimator (referred to as Our Approach) and the baseline methods. As shown in FIG. 6E, comparing within each activity, the exemplary estimator (also referred to as Our Approach) outperformed the baseline method for 12 of the 19 total comparisons of $R^2$ at the hip and 13 of the comparisons at the knee (subpanels a and b), with similar results in RMSE (cyclic hip and knee RMSE: 0.15 and 0.13 Nm/kg, impedance-like hip and knee RMSE: 0.21 and 0.16 Nm/kg) and in normalized mean absolute error (MAE) (cyclic hip and knee normalized MAE: 7.3% and 5.5%; impedance-like hip and knee normalized MAE: 7.1% and 6.0%) (FIG. 6E subpanels c-f and FIG. 6F subpanels a-d). The baseline method did not outperform the exemplary estimator on any individual activity in $R^2$, RMSE, or normalized MAE. In reality, the high-level state estimators required for the baseline method (i.e., a task classifier, gait phase estimator, and pose estimator) also have nonzero error [19-22], [25], [27], further highlighting the benefits of the exemplary estimator. During unstructured tasks that were not well-defined as cyclic or impedance-like (shown in FIG. 6C), the exemplary estimator maintained performance with an average hip $R^2$ of 0.80 and knee $R^2$ of 0.82. Thus, the exemplary task-agnostic control system mimicked the natural behaviors of human movement, seamlessly modulating assistance throughout the transient motions common in daily life [31].

Figure 6F:
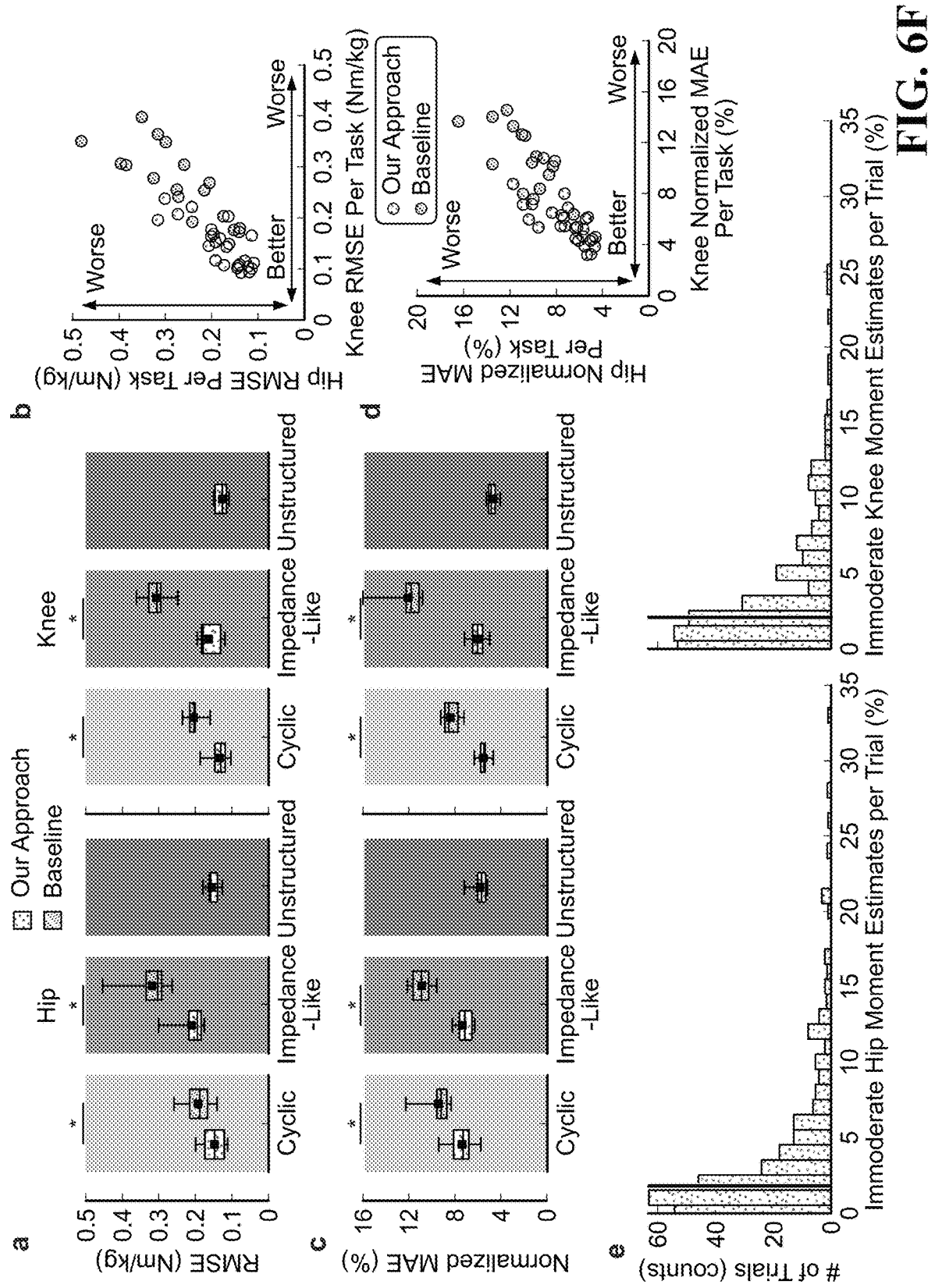

FIG. 6F shows the summary results of online joint moment estimation (e.g., RMSE, normalized MAE, and frequency of immoderate moment estimates). In FIG. 6F, subpanel (a) shows the exemplary estimator (referred to as Our Approach) reducing RMSE at the hip by 0.04±0.02 Nm/kg (22±10%, $P=0.03$) and at the knee by 0.07±0.02 Nm/kg (35±8%, $P=3\times10^{-8}$) compared to the baseline method during cyclic activities. For impedance-like tasks, the exemplary estimator reduced RMSE by 0.11±0.03 Nm/kg (35±9%, $P=8\times10^{-7}$) at the hip and by 0.14±0.03 Nm/kg (47±9%, $P=3\times10^{-15}$) at the knee compared to the baseline method.

Subpanel (b) shows the RMSE per task for the exemplary estimator and the baseline method. Subpanel (c) shows the exemplary estimator reducing normalized MAE at the hip by 22.2%±11.8% ($P=6\times10^{-5}$) and by 34.1%±8.9% ($P=6\times10^{-7}$) at the knee compared to the baseline method during cyclic activities. For impedance-like tasks, the exemplary estimator reduced normalized MAE by 34.4%±8.0% ($P=3\times10^{-9}$) at the hip and by 50.2%±14.2% ($P=8\times10^{-14}$) at the knee compared to the baseline method.

Subpanel (d) shows normalized MAE per task for the exemplary estimator and the baseline method. Subpanel (e) shows the histograms depicting the frequency of immoderate joint moment estimates per trial that exceeded ground-truth joint moments by more than 10% of the per trial peak-to-peak range.

The neural network may generate large, erroneous joint moments, leading to undesirable exoskeleton assistance. As shown in FIG. 6F, subpanel (e), immoderate joint moment estimates from the neural network that exceeded the ground-truth joint moments by more than 10% of the peak-to-peak range per trial only occurred with a median frequency of 1.8% and 2.0% at the hip and knee, respectively. Additionally, large, erroneous joint moment estimates with errors exceeding more than 50% of the peak-to-peak trial range only occurred during 238 of the total 10,232,680 instances of hip and knee moments evaluated (overall frequency of 0.002%), making them uncommon. These results show that, in practice, the fabricated control system provided reliable joint moment estimates despite its black-box nature. Additionally, the lowpass filter implemented in the fabricated control system smoothed any large, erroneous joint moment estimates before they were commanded to the user in the rare case that they occurred.

Of the 28 evaluated activities, 9 were withheld from the training set. The average $R^2$ of the exemplary estimator on these held-out tasks was 0.83 and 0.85 for the hip and knee, respectively, demonstrating the ability of the network to generalize to the hold-out tasks. To further investigate estimator generalization, three users also completed eight novel tasks, described in Table 3, that had not been previously tested or analyzed (shown in FIG. 6A).

activities with highly different dynamics (e.g., when off-loading bodyweight through the hands on the ground).

To quantify the impact of the exemplary task-agnostic control system on the user, user metabolic cost during four tested activities were measured under three assistance conditions: wearing the exoskeleton with the exemplary task-agnostic control system (Exo On), without wearing the exoskeleton (No Exo), and wearing the exoskeleton without assistance (Zero Torque).

Figure 6G:
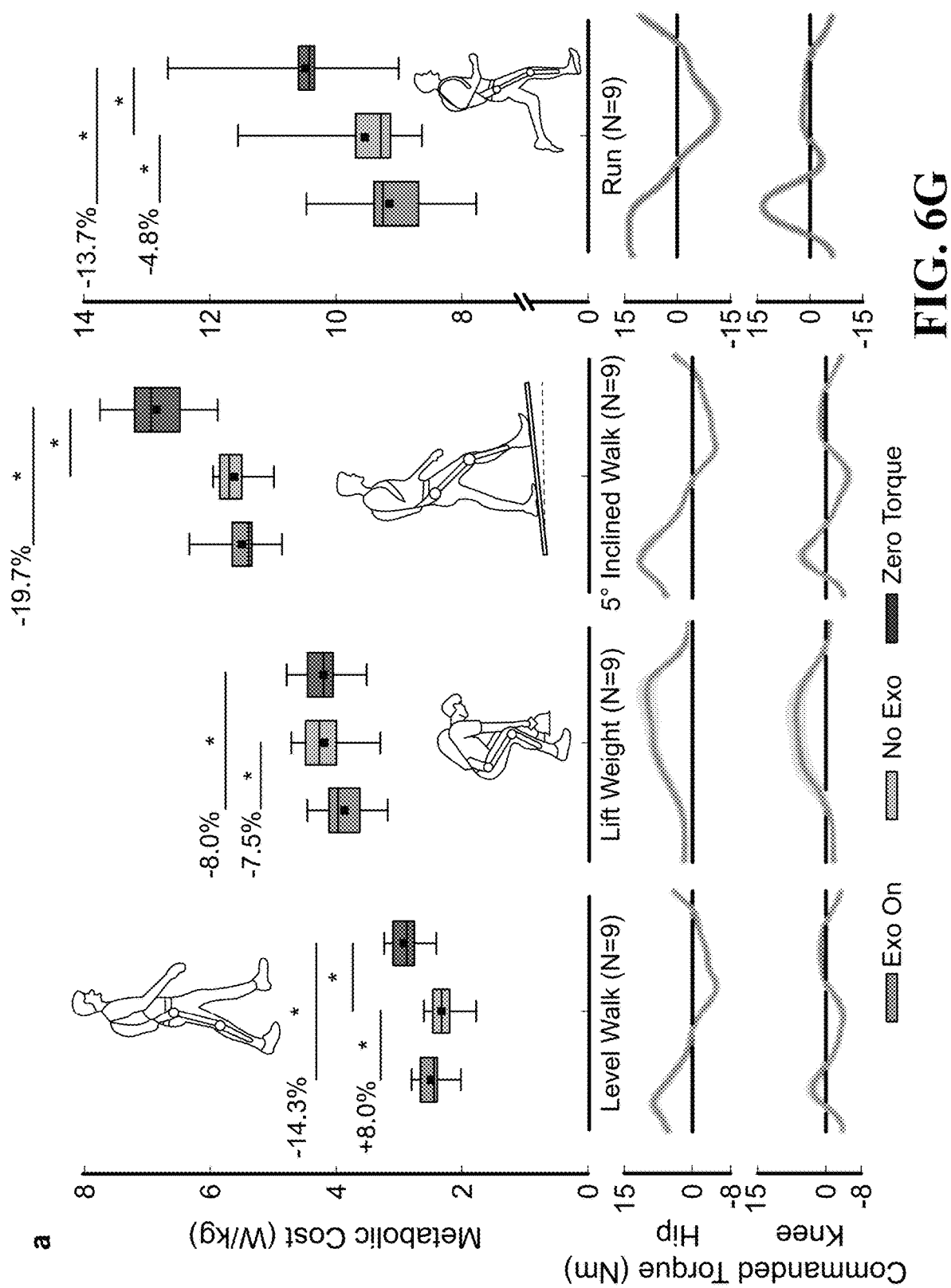

FIG. 6G shows the human outcome performance under three conditions (e.g., Exo On, No Exo, Zero Torque). Subpanel (a) shows participant metabolic cost measurements during four tested activities while wearing the exoskeleton using the fabricated control system (Exo On), without wearing the exoskeleton (No Exo), and while wearing the exoskeleton without assistance (Zero Torque). Tasks other than running were conducted using 6-minute trials and a counter-balanced design (ABCCBA), wherein "A," "B," and "C" denote a position (i.e., condition) of a human. Due to the strenuous nature of the running trials, conditions were only completed once (ABC), and each trial only lasted 3.5 minutes. Below each activity is the cycle-averaged commanded torque during Exo On as a function of movement percentage. The shaded region around each curve depicts ±1 standard deviation about the mean.

TABLE 3

| Task | Description |
| --- | --- |
| Burpees | Participants were instructed to place their hands on the ground and step back into a push up posture. Then they stepped forward to return to standing. This was performed 3 times leading with the right leg and 3 with the left. |
| Cart Walk | Participants were instructed to push a stationary rod (simulating a heavy cart) while walking on the treadmill at 0.8 m/s for 20 seconds. They then performed the same task while pulling on the rod and walking backward. |
| Crouch Walk | Participants were instructed to walk on the treadmill at 0.8 m/s while in a crouched posture for 20 seconds. |
| Dizzy Walk | Participants spun around for 10 seconds and then walked back and forth across the force plates until no longer showing signs of dizziness. |
| Steep Incline/Decline Walk (15°) | Participants were instructed to walk up a 15° incline at 1.2 m/s for 20 seconds. They then repeated this while walking down the same decline. |
| Layup | Participants were instructed to run up to the force plates, plant a single foot, and jump to maximum vertical height while landing with both feet on the force plates. This was performed 3 times for both right and left legs. |
| Mountain Climbers | Participants were instructed to assume a push-up posture and then alternate bringing each knee up toward their chest as quickly as possible. This was performed for 20 seconds. |
| Split Walk | Participants walked on a treadmill with the right leg belt at 1.6 m/s and the left leg belt at 0.8 m/s for 20 seconds. They then repeated this task with the left belt at 1.6 m/s and the right at 0.8 m/s. |

These tasks were designed to be unique from the original dataset to push the limits of the exemplary estimator, including burpees, mimicking a basketball layup, and walking on a split-belt treadmill with differing belt speeds. The exemplary estimator generalized well to the tasks reflective of typical human movement, and when pushed to extremely dynamic behaviors outside of the training set, the exemplary estimator provided directionally correct assistance, but the magnitude and shape lost accuracy (average hip $R^2$ ranged from 0.24 to 0.92 and average knee $R^2$ range from 0.32 to 0.91 for the eight novel tasks; FIG. 6A, subpanels c, and d). These results demonstrated the ability of the exemplary estimator to generalize to never-before-seen activities but highlighted that task-specific training data was beneficial for Subpanel (b) shows three participants returned and performed a varying speed and incline protocol while metabolic cost was measured. Individual traces are provided for each participant as well as the average. The detailed variations in speed and incline are shown below the activity.

Subpanel (c) The average positive biological joint work per movement cycle summed across each participant's hip, knee, and ankle are shown. Participants completed the six activities under the same three assistance conditions as the metabolic trials. The cycle-average commanded torque during Exo On for each activity is shown as a function of movement percentage while the shaded region around each curve depicts ±1 standard deviation about the mean. Each black square depicts the inter-subject mean; each colored box depicts the interquartile range; each horizontal line within the boxes depicts the inter-subject median; each error bar depicts the inter-subject minimum and maximum. Asterisks indicate statistical significance (P<0.05).

The task-agnostic control system significantly reduced metabolic cost for all four tasks compared to Zero Torque (P<0.05), with relative reductions ranging from 8.0% during the lift weight task to 19.7% during 5° inclined walking (subpanel a). Relative to No Exo, the fabricated control system reduced user metabolic cost during the weightlifting task and during running (P<0.05); however, the fabricated control system increased metabolic cost during level ground walking (P<0.05), possibly due to the added mass penalty and efficient natural dynamics of human walking [51]. Nevertheless, these results demonstrate the ability of the fabricated control system to autonomously modulate assistance across tasks in a beneficial manner, a critical hurdle in developing task-agnostic exoskeleton controllers.

Additionally, the study also evaluated user-positive lower-limb biological joint work during six additional tasks described in Table 4, which provided insight into the joint-level effects of the fabricated control system [40], [52]-[55] and was less taxing on the participants than the metabolic trials.

Figure 6H:
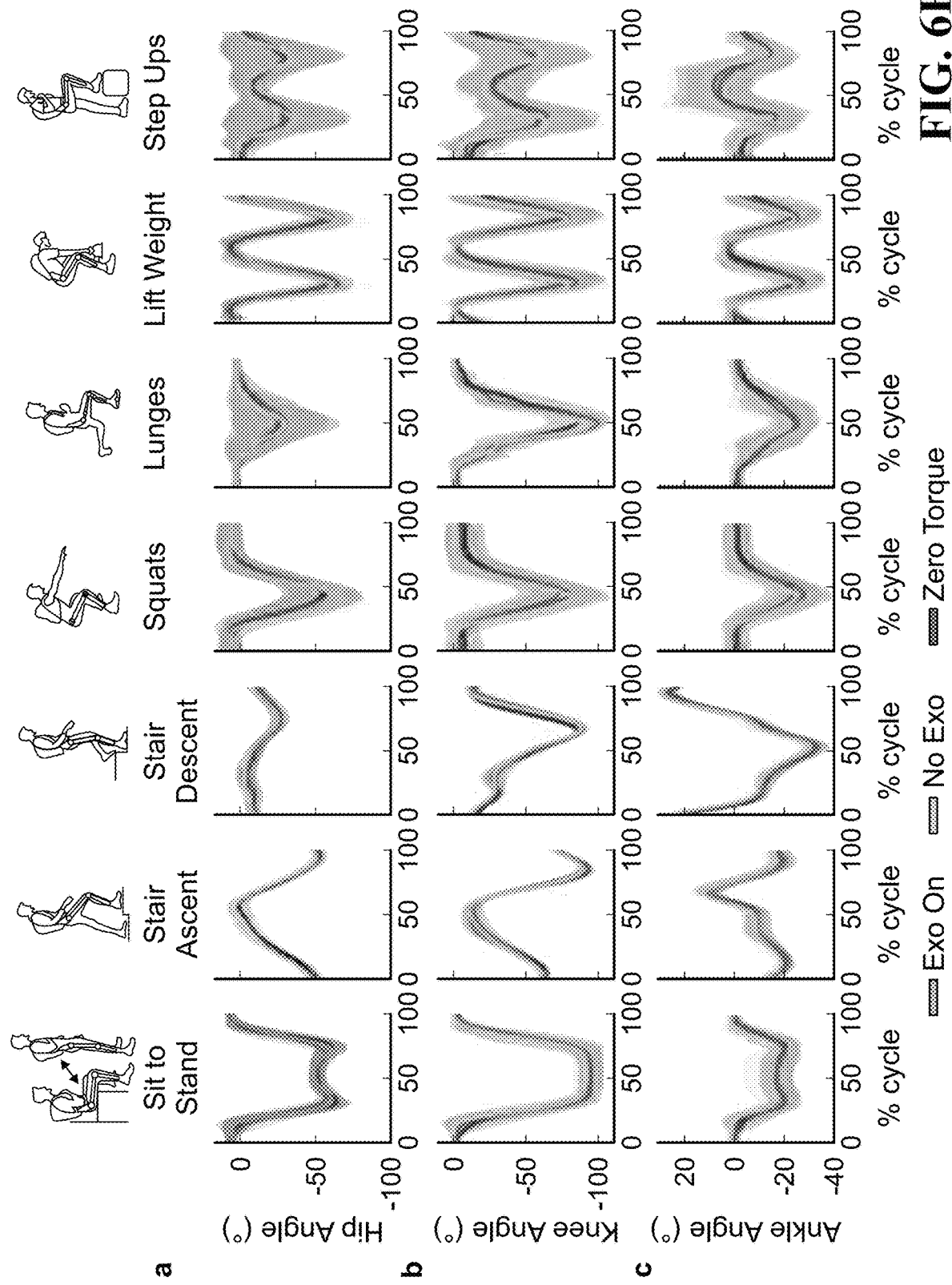

FIG. 6H shows the lower limb joint angle comparison between joint work activities performed by the participants. Subpanels (a)-(c) show the hip, knee, and ankle angles during three conditions: wearing the exoskeleton using the exemplary task-agnostic control system (Exo On), without wearing the exoskeleton (No Exo), and wearing the exoskeleton without assistance (Zero Torque). The solid lines represent the subject-average joint angle, and the shaded fill represents the standard deviation.

The study further assessed human performance outcomes by having three participants (2 male and 1 female) return to collect metabolic cost measurements during lifting. A metronome was set at 10 bpm, and participants were instructed on each tone to use both hands to lift a 25$lb$ kettle bell weight off a waist-height shelf, touch that weight to the floor between their feet, and then replace the weight on the shelf [12']. The study tested four conditions for each activity: the semi-supervised model, the unsupervised model, the best-case model, and No Exo. Participants performed the activity for six minutes, and conditions were tested using a within-participant counter-balanced design (ABC-CBA), wherein "A," "B," and "C" denoted a position (i.e., condition) of a participant. The order of the three conditions was pseudo-randomized; however, within a given task, the No Exo

TABLE 4

| Task | Speed | Description |
| --- | --- | --- |
| Lift & Place Weight | 12 lifts per minute | Participants were instructed to lift a 25 lb weighted bag with both hands. On the first tone, participants started from standing and lifting the bag to waist height. They then paused for the second tone, at which they set the bag back on the floor and then returned to standing. |
| Squat | 15 squats per minute | Participants were instructed to squat with the 25 lb weight until they barely touched a pillow resting on a low stool. Then they returned to standing. |
| Lunge | 15 lunges per minute | Participants were instructed to lunge with their right leg forward until their left knee barely touched a pillow laid on the ground. Then they returned to standing. |
| Sit & Stand | 12 sit and stands per minute | Participants were instructed to alternate sitting down and standing up on the tone without using their arms for assistance. |
| Right Leg Step Up | 12 step-ups per minute | Participants were instructed to step up onto a 46 cm box with their right leg. On the first tone, participants stepped up with their right leg and paused standing on one foot. On the second tone they stepped back down to have both feet on the ground. |
| Stair Ascent | Self-selected speed | Participants were instructed to complete four bouts of walking up a six-step staircase at their natural walking pace. |

Total positive lower-limb biological joint work was computed as the sum of the components computed at the hip, knee, and ankle. Positive biological joint work was computed by integrating the positive biological power at each joint, which involved subtracting the exoskeleton torque from the ground-truth total joint moment from inverse dynamics. The fabricated control system reduced user-positive lower-limb biological joint work during all six tasks compared to Zero Torque (P<0.05), with decreases ranging from 5.3% to 15.5% (subpanel c). During four of the six tasks, the fabricated control system also reduced positive joint work compared to No Exo, with decreases ranging from 8.5% to 22.3%. The other two tasks, stair ascent and step up, showed no significant difference. Additionally, participant lower-limb kinematics showed little variation across exoskeleton conditions, suggesting that reductions in biological joint work were achieved through reductions in biological joint moments as opposed to modified kinematics (shown in FIG. 6H).

condition was placed at either the beginning (A) or the end (C) for don/doff efficiency. The study reported results for all metabolic cost measurements based on an average of instantaneous metabolic cost (as calculated with the Brockway equation) for the final three minutes of each activity.

Further improvements to the exoskeleton, such as reducing exoskeleton mass, relocating knee actuators more proximal to the body [51], and increasing the maximum magnitude of assistance to the fabricated control system, may enhance human performance across activities compared to this first evaluation. Additionally, the fabricated control system may not be optimal for all tasks and similarly may not be optimal for populations outside of young, able-bodied individuals. Nevertheless, these comparisons demonstrate the efficacy of the fabricated control system to dynamically and beneficially modulate assistance with changing user behavior without user- or task-specific tuning, which is a critical component for exoskeleton controllers deployed in the real-world. This may be the first exoskeleton controller to improve user energetics across such a wide array of tasks without any manual controller modifications between tasks [14].

Fabricated HILO Control System

The study also fabricated the exemplary system that employed Human in the Loop Optimization (HILO) (i.e., fabricated HILO system) in an experiment to optimize the relationship between biological joint moment and output exoskeleton torque at the hip joint.

The exoskeleton's assistance was limited to one-degree-of-freedom sagittal plane (hip flexion and extension) torque assistance supplied by actuators with a max output torque of 18 Nm and transmitted to the subject's lower body through carbon fiber thigh struts. The exoskeleton's onboard sensors included inertial measurement units (IMUs) at the back of the pelvis and on each thigh and encoders available via the actuators. The backpack attached to the exoskeleton contained batteries, two microcontrollers, and electrical breakout boards required to control the exoskeleton. The total weight of the entire system was 4.8 kg.

The T-CNN model employed by the fabricated HILO system was contained on an NVIDIA Jetson Microprocessor which communicates with the first microprocessor (e.g., MyRio) during the experimental optimization loop. The flow of data from the subject exerting joint moment to the exoskeleton producing a desired torque assistance profile required significant communication between the 2 microprocessors.

Controller. The mid-level control law uses three terms to transform from the biological hip moment ($\hat{\tau}_{bio}$) to exoskeleton assistance torque ($\tau_{cmd}$) at a given time (t). The scale ($\alpha$) term changes the magnitude of torque assistance as the motor's max torque may be less than that of the hip joint. In the experiment, the scale term was not optimized and instead held constant at 20% of the subject's biological hip joint moment based on device limitations. The delay term (d) determined the time difference in milliseconds between when the subject exerted a biological joint moment and when they received the exoskeleton assistance corresponding to that exertion. In Molinaro et. al [67'], the delay term was held to 125 ms in correspondence to the hypothesis proposed in Camargo et al [81'] that this timing could maximize the work the exoskeleton supplies to the user. The. The shape term ($\lambda$) was a non-linear transformation based on a power law to change the impulsiveness of the torque profile. During the optimization process, within an ambulation mode, any combination of shape and delay parameters should have result in the same magnitude of $\tau_{cmd}$. However, because the shape term was exponential, the magnitude of the exoskeleton assistance torque increased at times where $\lambda > 1$. To account for this, the study formulated a denominator term that was equal to the subject's maximum biological torque for the specified mode $\hat{\tau}_{max}$ to normalize the peak torque values as parameters are adjusted in the experiment. The (simplified) version of the controller formula may be defined per Equation 14.

$$\tau_{cmd}(t) \approx \left( \frac{(\hat{\tau}_{bio}(t-d))^\lambda * \alpha}{\hat{\tau}_{max}} \right)^{**} \quad \text{(Eq. 14)}$$

Data collection. N=9 young adult subjects (8 male, 1 female) participated in the experiment in which the exoskeleton controller parameters were optimized across three different treadmill conditions in three separate 3-hour long sessions. The three treadmill conditions were as follows: 0-degree incline at 1.5 m/s (i.e., level fast), 0-degree incline at 1.1 m/s (i.e., level slow), and 5-degree incline at 1.1 m/s (i.e., inclined slow). Each session began with a 15-minute habituation period in which the subject was exposed to a range of parameter combinations to condition them to walking in the exoskeleton. Then, the subjects walked for 25 2-minute recorded trials consisting of two trials with no exoskeleton, two trials walking in the unpowered exoskeleton, and 21 trials walking with exoskeleton assistance.

Figure 7A:
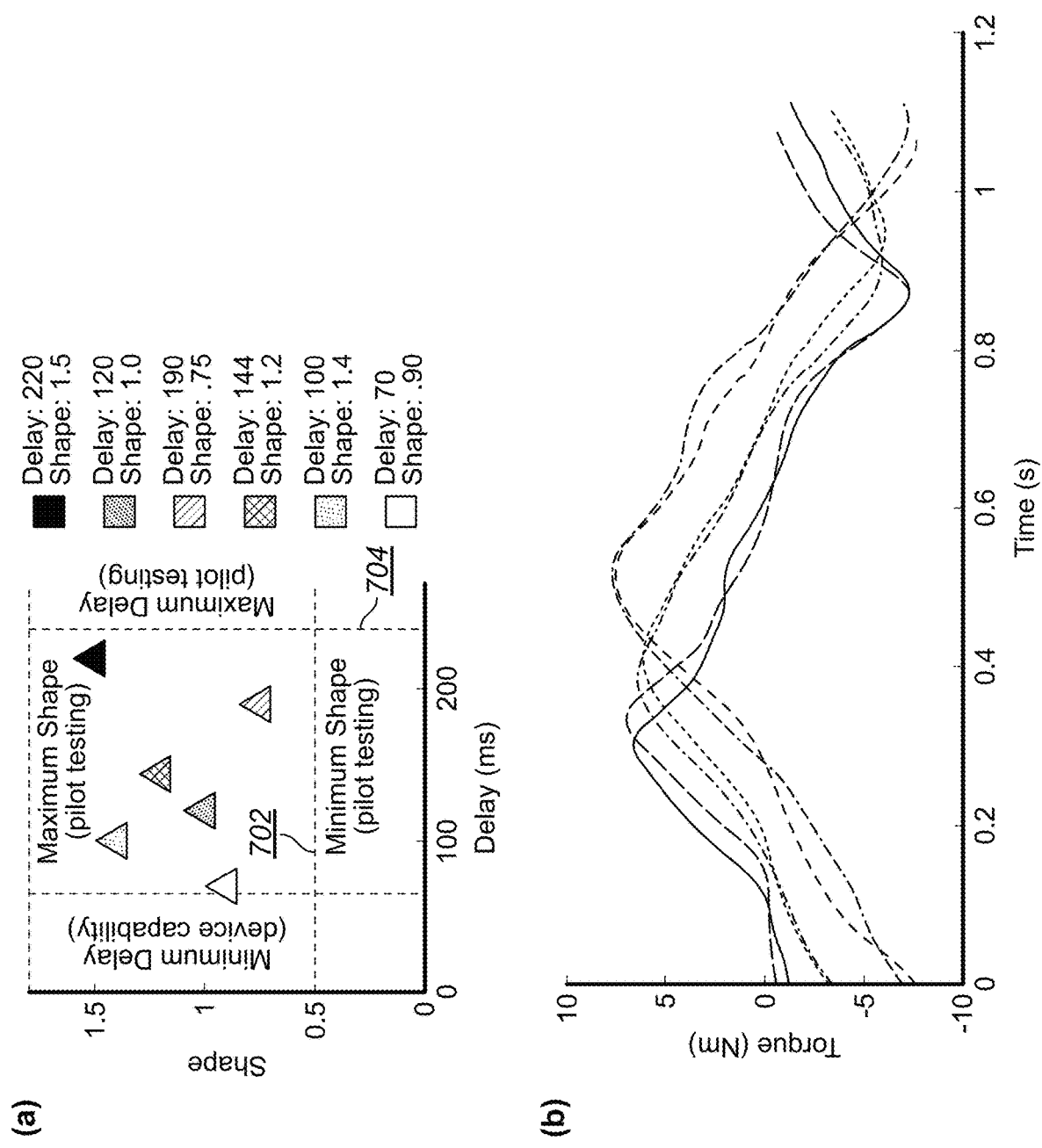
FIGS. 7A-7F shows specifications and evaluations of a fabricated task-agnostic control system employing a human-in-the-loop optimization (i.e., HILO system).

FIG. 7A shows a graphical representation of the exoskeleton control parameter space (subpanel a) and the exoskeleton assistance torque profiles generated by control parameters (subpanel b).

As shown in subpanel (a), the dotted lines 702 and 704 represent the minimum and maximum values of each parameter, respectively, that bounded the human-in-the-loop Bayesian optimization, the values of which were determined during an N=3 pilot testing of the experiment (apart from the minimum delay which was limited by the time it took to estimate biological moments). The triangles represent the six control parameter combinations that were used to initiate the Bayesian optimization for each subject and every ambulation mode. The starting points were selected as they represented a wide range of possible control profiles, as well as 2 points that were near optimal points found in previous studies.

Subpanel (b) shows the exoskeleton assistance torque profiles that are generated by the control parameters in subpanel (a).

The HIL-Optimization occurred during the 21 trials (or iterations) where the exoskeleton provided the subject assistance. During these trials, the study collected 90 seconds of sensor data from the exoskeleton and 2-minute indirect calorimetry estimations via the Parvo metabolic cart. Across all subjects and conditions, the first 6 iterations of assistance were made up of pre-selected parameters to seed the optimization process with a few data points (shown in subpanel a). One of these 6 points, the purple triangle in subpanel (a), was selected as the optimal point from a previous study on biological torque-based hip exoskeleton control [67'].

A second pre-determined parameter combination, represented by the orange triangle in subpanel (a), was chosen using an offline global optimization of the controller to another HIL-Optimal control profile as determined using a spline-type exoskeleton controller [75'], [82']. Real biological torque data, along with MATLAB's built-in global optimization function, was used to determine the shape and delay terms that minimized the RMSE (root mean squared error) between the optimal control profile from Franks' study and a control profile generated using Equation 14's parametrization. The final four preselected parameters (the pink, light blue, green, and dark blue triangles in subpanel a) were chosen to provide a broad sampling of the parameter space to seed the Bayesian optimization process. In each session, the order of the 6 pre-selected points was randomized to reduce bias. Note that these 6 control parameters were used to habituate the subject to the exoskeleton and controller during the habituation session.

Bayesian optimization was used to select the next fifteen iterations of assistance parameter combinations. When the exoskeleton control parameters were altered between iterations, the subject was allotted about thirty seconds to adjust to the new parameters before the data collection for the next iteration began. Additionally, the subject's preference between the current and previous iterations' assistance was queried after each parameter change. The subjects signaled better, worse, or no difference using hand signals (as their mouths were covered by the metabolic mask). As this data collection was physically taxing, the subjects had predetermined break periods after every six iterations or by request.

Custom MATLAB code using the provided Gaussian process regressor (GPR) package was created to run the in-experiment human-in-the-loop Bayesian optimization process. The acquisition function used was an expected improvement equation with an additional restriction so that a parameter combination too close to any of the previously tested parameter combinations could not be selected. The study restricted the optimizer to selecting delay terms between 65 ms and 240 ms and shape terms between 0.5 and 1.6 (shown in FIG. 7A); these bounds were determined to be within a reasonable range of comfort in pilot testing of the controller. The optimization model was set to be moderately explorative rather than exploitative so that similar parameters weren't tested repetitively. The last ($21^{st}$) point of the powered iterations was chosen not by the acquisition function but by using pure exploitation using the best estimated point by the Gaussian process regressor model with twenty iterations of data.

Figure 7B:
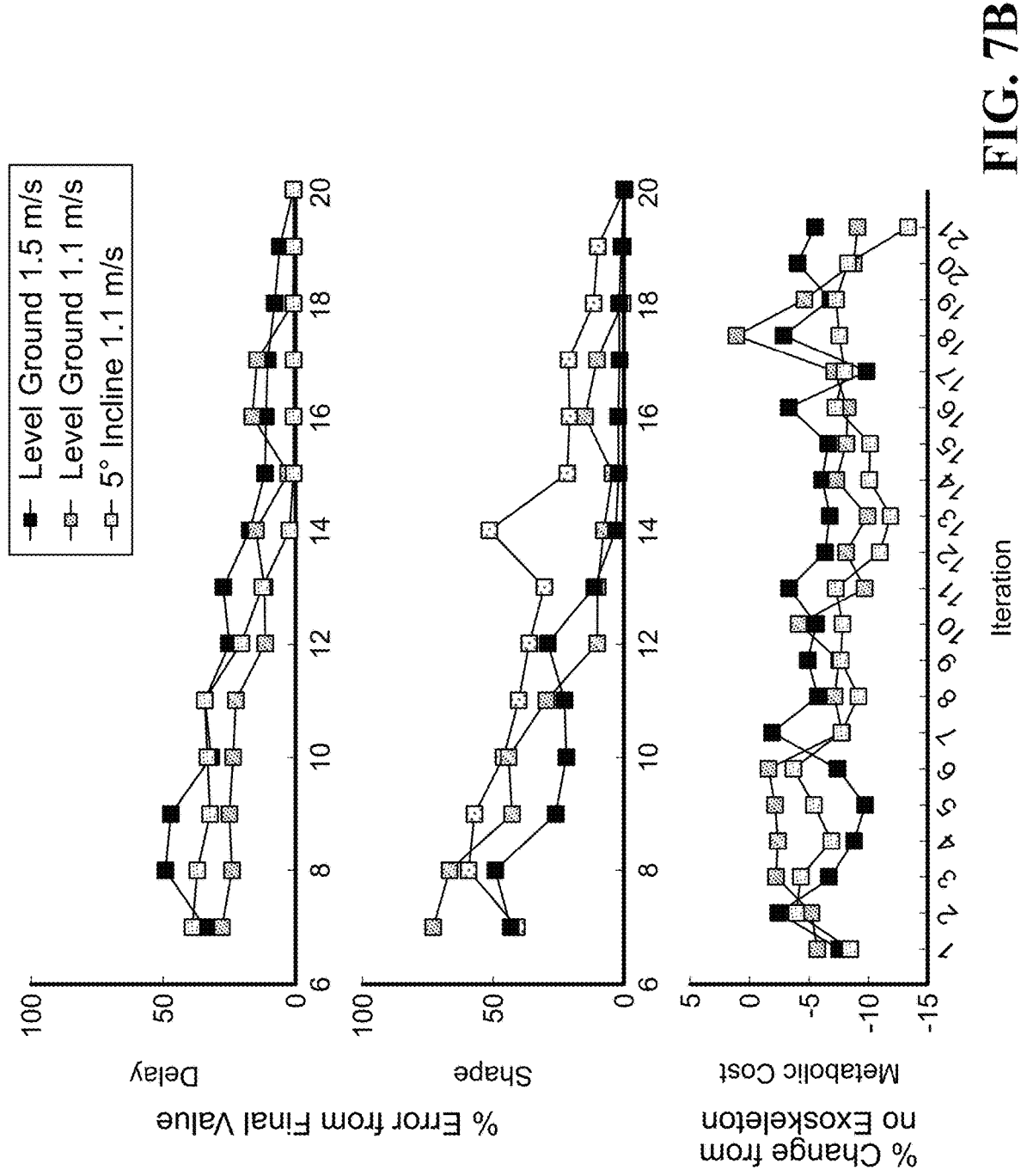

FIG. 7B shows the convergence analysis graph of the human-in-the-loop Bayesian optimization across all 3 ambulation modes. Each plot in subpanels (a)-(c) begins at iteration seven after the six in pre-selected parameter combinations shown in FIG. 7A.

The model's convergence to the final delay value (subpanel a) and shape value (subpanel b) in absolute percent change between the Gaussian process regressor's (GPR) believed optimal parameter and the actual value of the optimal parameter (meaning the percent error at iteration may be 0). For both the shape and delay parameters, the model may converge in fewer iterations during the inclined walking trials in comparison to the level ground trials.

Subpanel (c) shows the metabolic cost of the GPR's believed optimal parameters (shown in subpanels a and b) as determined post hoc using individual subject metabolic landscapes.

Data processing: metabolic cost. Because the study used 2-minute metabolic collections rather than the standard six-minute metabolic collection period [83'], the study extrapolated a steady state value based on the two minutes of data. To make comparisons both across subject and walking condition, the study normalized the metabolic data by the no exoskeleton metabolic value using Equation 15, meaning all metabolic analysis is in units of percent change from no exoskeleton (% Δ No-Exo).

$$Norm.Met. = \frac{Met. - No\ Exo\ Met}{No\ Exo\ Met} \quad (Eq.\ 15)$$

Figure 7C:
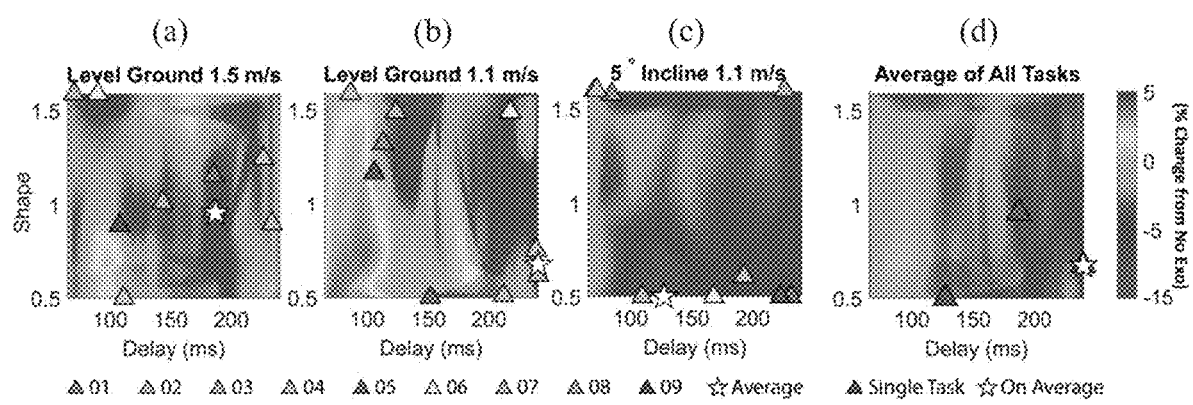

FIG. 7C shows metabolic landscapes for each subject and 3 walking conditions, including fast-level ground walking (subpanel a), slow-level ground walking (subpanel b), inclined walking (subpanel c), and averaged over all 3 walking conditions (subpanel d) derived from the experimental data. As shown in subpanels (a)-(c), the X and Y axes show the exoskeleton parameters and the color (shade) shows metabolic cost relative to the subject's no exoskeleton metabolic cost. The surfaces were created using cubic interpolation and radial basis function (RBF) kernel extrapolation. Each surface seen here is the average of all nine subjects' individual metabolic landscapes for the specified walking condition. The colored triangles represent the parameters that correspond to the minimum metabolic cost of each subject's individual metabolic landscape (as coded in the legend). The white star on each landscape represents the parameters that correspond to the minimum metabolic cost of the average surface (the surfaces depicted).

As shown in subpanel (d), the X and Y axes show the exoskeleton parameters, and the color shows metabolic cost relative to the subject's no-exoskeleton metabolic cost. This surface represents the results from 27 metabolic cost surfaces (9 subjects×3 walking conditions). The white triangles represent the parameters that correspond to the minimum metabolic cost of the single walking condition metabolic landscapes (i.e., they line up with the white stars in FIG. 3). The red star represents the parameters that correspond to the minimum metabolic cost of the multi-condition average surface.

For each subject and walking condition, the study created metabolic landscapes using the controller parameters and their corresponding normalized metabolic cost from the 21 assisted iterations within each session using cubic interpolation and bounded RBF extrapolation in areas that were outside of the convex hull of the data points tested. Each subject's best parameters, as approximated by their specific metabolic landscape, is denoted on individual condition surfaces as well as the mean best parameters for that condition. The averaged condition surface shows the best points for the individual surface as well as the overall average best point.

The study used a one-way ANOVA to compare the metabolic cost of the (1) task-dependent subject-dependent best controller parameters, (2) task-dependent subject-independent best controller parameters, (3) task-independent subject-independent best controller parameters. The 27 (i.e., 9 subjects×3 conditions) metabolic cost landscapes were used to determine each of these 3 values. Given a target metabolic landscape for a single subject and walking condition, the metabolic values may be calculated as shown in Table 5.

TABLE 5

| Metabolic value | Description |
| --- | --- |
| Task-Dependent, Subject-Dependent | This is the lowest normalized metabolic cost on the landscape for a given subject in a specific task. |
| Task-Dependent, Subject-Independent | Average the 8 landscapes belonging to the other subjects for the same walking condition, find the parameters that correspond to the lowest metabolic cost of that landscape, use the metabolic cost on the target landscape at those parameters. |

TABLE 5-continued

| Metabolic value | Description |
| --- | --- |
| Task-Independent, Subject-Independent | Average the 24 landscapes belonging to the other subjects for all three walking conditions, find the parameters that correspond to the lowest metabolic cost of that landscape, use the metabolic cost on the target landscape at those parameters. |

For each subject and walking condition, all four of these values may be calculated. A one-way ANOVA with Bonferroni correction via SSPS with a 0.05 significance value was used to compare means. This analysis was done across conditions as well as on average.

Data processing: exoskeleton power and torque. The study unilaterally (right leg) analyzed how the power and torque provided by the exoskeleton trended with metabolic cost reduction. Average torque, peak positive power, and average positive power were calculated using the data from the exoskeleton's sensors. Torque ($\tau$) was directly available via the exoskeleton's motors. Positive Power (+P), however, may be calculated per Equation 16, where $\theta$ represents the angle of rotation of the motor.

$$+P = \begin{cases} \text{if } P > 0 & P \\ \text{else} & 0 \end{cases} \quad \text{(Eq. 16)}$$

The denominator term $\hat{\tau}_{max}$ in Equation 14 stabilized the exoskeleton's peak torque for a given subject and walking task. Post-hoc, the study checked that this may be true by taking the maximum of the absolute value of the torque in the recording period (shown in FIG. 7E, subpanel a). Similarly, peak positive power was the maximum of the positive power in the recording period. Average torque and average positive power may be calculated by applying the average value formulas to both signals, as defined per Equations 17 and 18, where t is time and $t_{max}$ is the maximum time of the data recording.

$$\bar{\tau} = \frac{1}{t_{max}} \int_0^{t_{max}} \tau(t) dt \quad \text{(Eq. 17)}$$

$$\overline{+P} = \frac{1}{t_{max}} \int_0^{t_{max}} +P(t) dt \quad \text{(Eq. 18)}$$

Figure 7D:
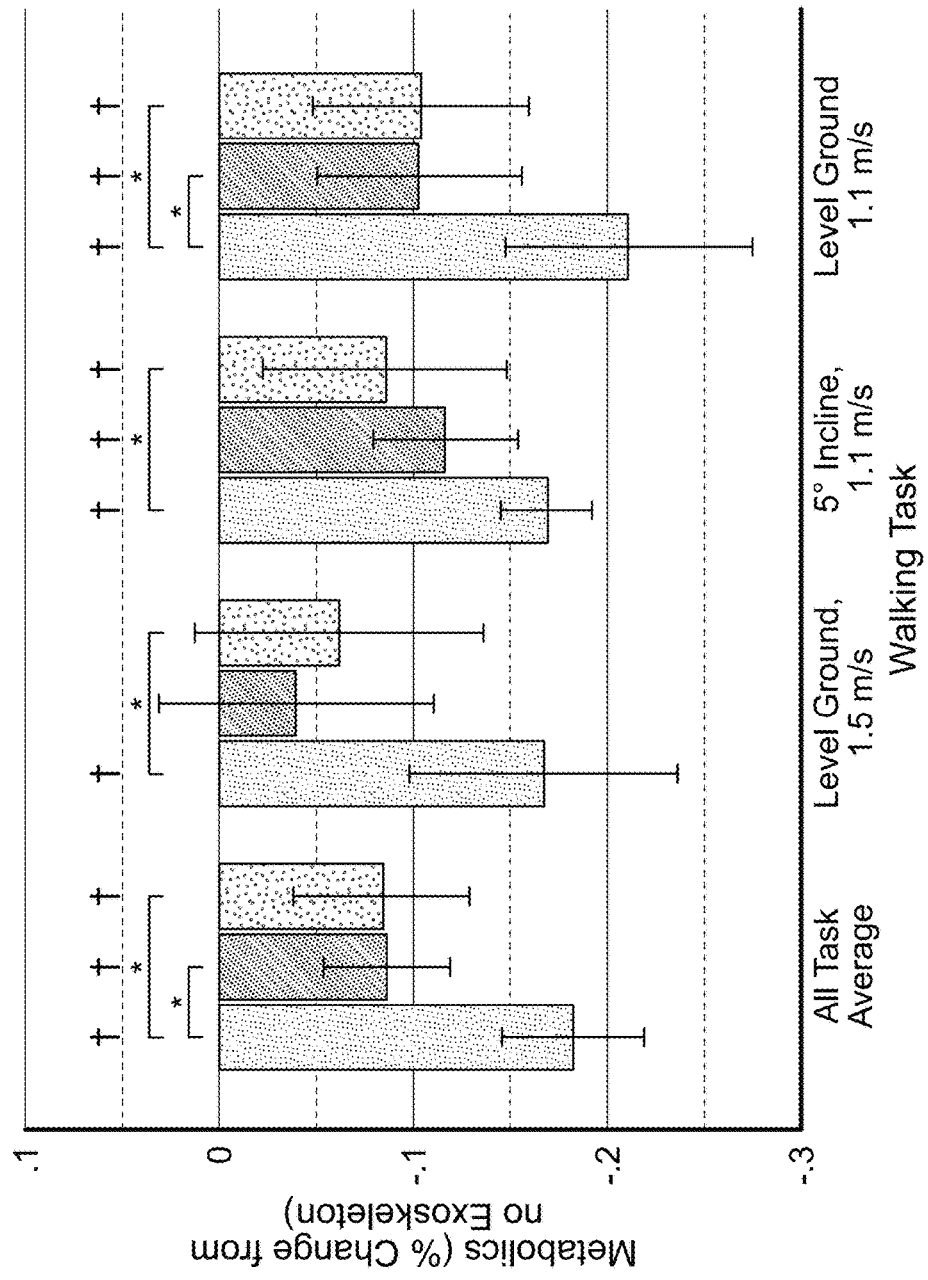
Figure 7E:
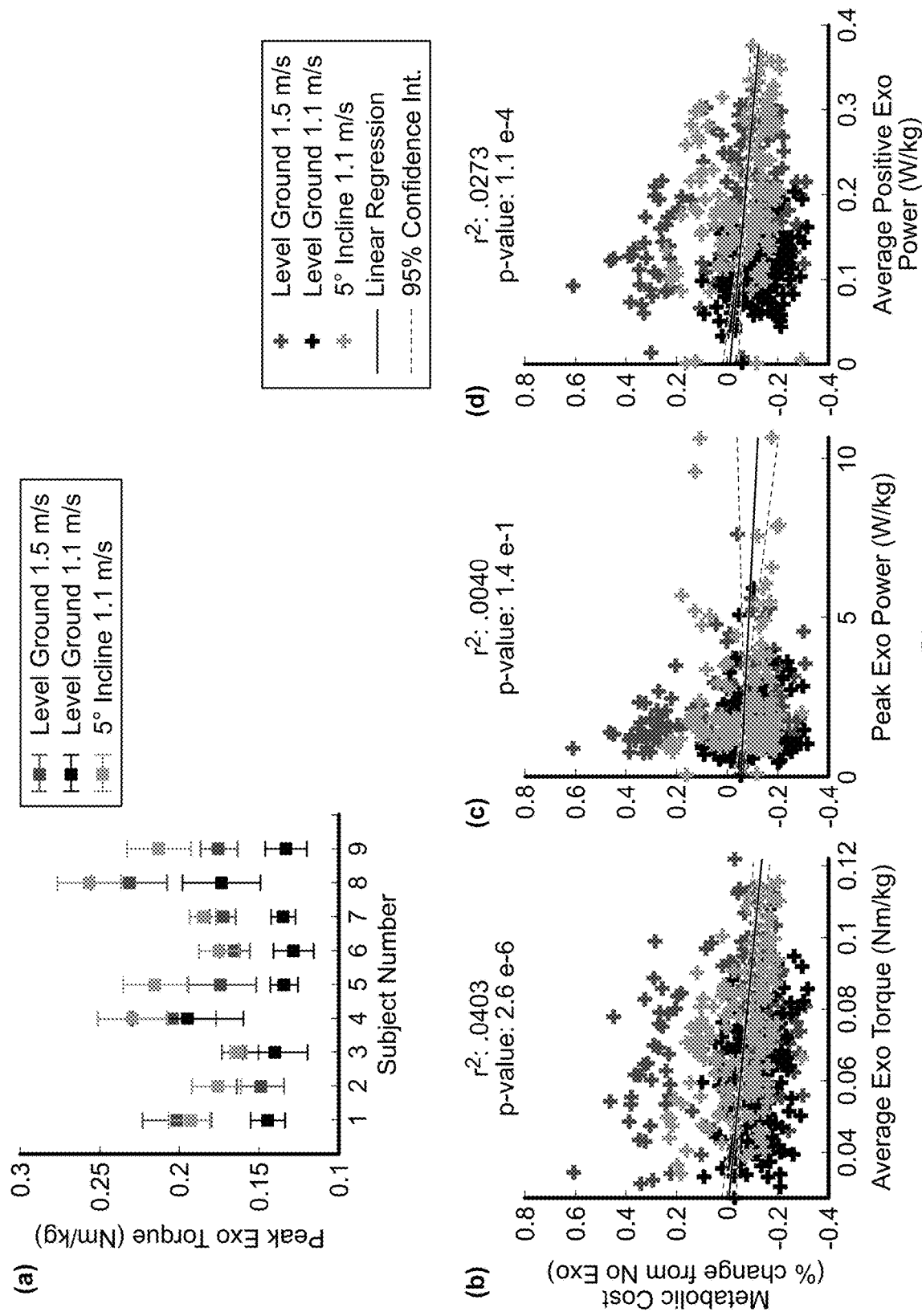

For a given iteration, average torque, peak positive power, and average positive power had a corresponding normalized metabolic cost value to which they were linearly regressed (shown in FIG. 7E, subpanels b-d).

Data processing: preference. The study gave numeric values to the pairwise preference comparisons of the control parameters queried from the subjects during the optimization process. For a given chain of 21 control parameters and corresponding pairwise comparisons, every time a control parameter was rated as worse than another, it lost 1 point of value and every time a control parameter was rated as better than another, it gained some point of value (no points were gained or lost when subjects rated two parameter pairs as equal). Once every control parameter in each 21-iteration trial was given a numerical value, the study created "preference landscapes" (shown in FIG. 7F) with a similar process of making the metabolic landscapes shown in FIG. 7C.

The study then separated the parameter space into 4 quadrants to determine if controller preference could be reasonably predicted using this method. Across all modes, the ~20 pairwise comparisons across 9 subjects were grouped by which two quadrants they were comparing (note that if a pairwise comparison was done within a quadrant, it would not be reflected in this analysis), and the percentage of times subjects preferred one quadrant to another was calculated.

FIG. 7D shows the average metabolic results in groups of ambulatory conditions. All percentage changes were with respect to the metabolic cost when the subject was not wearing an exoskeleton (No Exo), and all standard deviations are using a 95% confidence level. Significance in the differences between both the no exoskeleton condition (or the "0" line shown in FIG. 7D]) and between bars within an ambulatory condition, cluster were determined using ANOVA testing with a Bonferroni correction at the 0.05 level using IBM's SPSS statistical program. The Metabolic Cost vs Power results (shown in FIG. 7E) were statistically analyzed using a linear regression done in MATLAB in which the slope, R-squared, and p-values were generated to determine the significance of the trends in this relation.

Evaluation results. All conditions significantly ($p<0.05$) outperformed the no exoskeleton condition, with the only exceptions being the task agnostic and task dependent conditions during fast level ground walking. On average, across all tasks, the personalized controller condition reduced metabolic cost on average across tasks by 18.3% which was significantly better ($p<0.05$) than both the task dependent (8.6% reduction) and task agnostic (8.4% reduction) conditions.

For the individual tasks, all personalized control reduced metabolic costs significantly ($p<0.05$) as compared to the task-agnostic condition. Personalized control reduced metabolic cost significantly ($p<0.05$) as compared to the task-dependent condition during slow-level ground walking, but the difference was not significant during fast-level ground and inclined walking tasks. On average and in each individual walking task, there was no significant ($p<0.05$) difference between using the task agnostic or task-dependent methods. The greatest metabolic reduction experiment-wide were accomplished on the level ground slow walking mode in which the subject's average metabolic reduction was 21.1% as compared to walking with no exoskeleton.

FIG. 7E shows the multi-modal peak exoskeleton torque for each subject (subpanel a), the average torque provided by the exoskeleton (subpanel b), the peak power provided by the exoskeleton (subpanel c), and the average positive power provided by the exoskeleton (subpanel d). As shown in FIG. 7E, metabolic cost reduced as exoskeleton torque and power increased, however, the p-values indicate that this relation was significant only for average exoskeleton torque and average positive exoskeleton power As shown in subpanels (b)-(d), the values of interest when analyzing metabolic cost's relation to average exoskeleton power, peak exoskeleton power, and average positive exoskeleton power were the values of the slope, the r-squared value, and the p-value. Metabolic cost and average exoskeleton torque had a slope of −1.379 percent-change per Nm/Kg (p<0.05) and an r-squared of 0.0403. Metabolic cost and peak exoskeleton power had a slope of 0.0067 percent-change per W/Kg, an r-squared of 0.0040, and a p-value of 1.4e-1. Metabolic cost and average exoskeleton power had a slope of 0.2985 percent-change per W/Kg, an r-squared of 0.0273, and a statistically significant p-value of 1.1e-4.

Figure 7F:
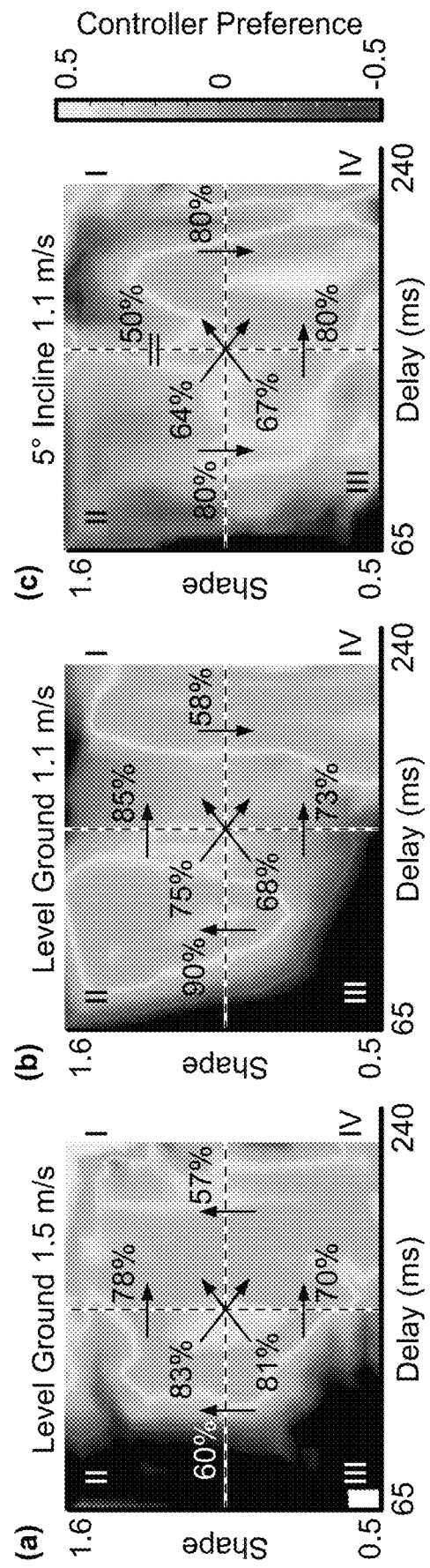

FIG. 7F shows the preference landscapes for fast-level ground walking (subpanel a), slow-level ground walking (subpanel b), and inclined walking (subpanel c) using the pairwise comparison queried from subjects during the HIL optimization. Higher values were preferred over lower values. The study separated the parameter space into four quadrants to analyze the frequency of which subjects preferred certain quadrants over others. The black arrows superimposed over the surfaces denote the quadrant analysis. The direction of the arrow indicates quadrant preference.

Qualitatively, trends in the preference surfaces shown in FIG. 7F matched those of the metabolic surfaces shown in FIG. 7C. Across all ambulatory tasks, subjects had a major bias towards quadrants I and IV (longer delays) with reasonably high uniformity. However, in terms of shapes, subjects preferred smaller shape valued (quadrant IV over I) about 69% of the time at the slower walking speeds, and during the higher walking speed trial, subjects tended to prefer the higher shape quadrant around 57% of the time. For both level ground trials, subjects showed a strong distaste for control parameters that had both a low delay and low shape (quadrant III) were especially bad.

Domain Adaptation Method

Statistical analysis for domain adaptation method. The study performed all the statistical analyses in MATLAB (MathWorks, Natick, MA) using a significance level of α=0.05.

For the task and participant performance sweeps, the study assessed significance by controlling the false rate of discovery (q<0.05) across model conditions (the exemplary control system versus the baseline) where percent RMSE increase compared to the best-case was the dependent variable [41'], [42']. The study assessed the significance of the exemplary control system versus the baseline with each added task or participant and used the false rate of discovery to control the family-wise error rate across all comparisons (9 comparisons for the task case and 13 for the participant case).

For the final offline testing set, the study assessed significance using paired t-tests between the baseline and the exemplary control system at the hip and separately at the knee. Percent RMSE increase compared to the best-case was the dependent variable, which was averaged across task groups. The independent variable was the model type; participants were the fixed effect.

For real-time testing, the study performed comparisons between the baseline and the exemplary control system with paired t-tests separately at the hip and the knee and for the supervised and unsupervised cases. The study performed tests with a percent RMSE increase compared to the best-case as the dependent variable. Again, the independent variable was the model type, and participants were the fixed effect. To assess the statistical significance for each individual task with $R^2$ as the dependent variable, the study again controlled the false rate of discovery to account for the number of comparisons between model type (3 models were run in real-time) and the number of tasks (8 performed in the real-time validation). Thus, controlling for all 24 comparisons.

The study tests were performed with $R^2$ as the dependent variable separately for each model type, with offline versus online as the independent variable. The study also compared the average performance across all tasks directly between the three models that were run in real-time using a one-way analysis of variance (ANOVA) test with participants as the random effect. This was followed up by Bonferroni's multiple comparison tests between model types. To assess offline versus online performance, the study performed separate two-sample t-tests with assumed equal variance for each deployed model at each joint to determine if running the model in real-time had a statistically significant impact on performance.

Figure 8A:
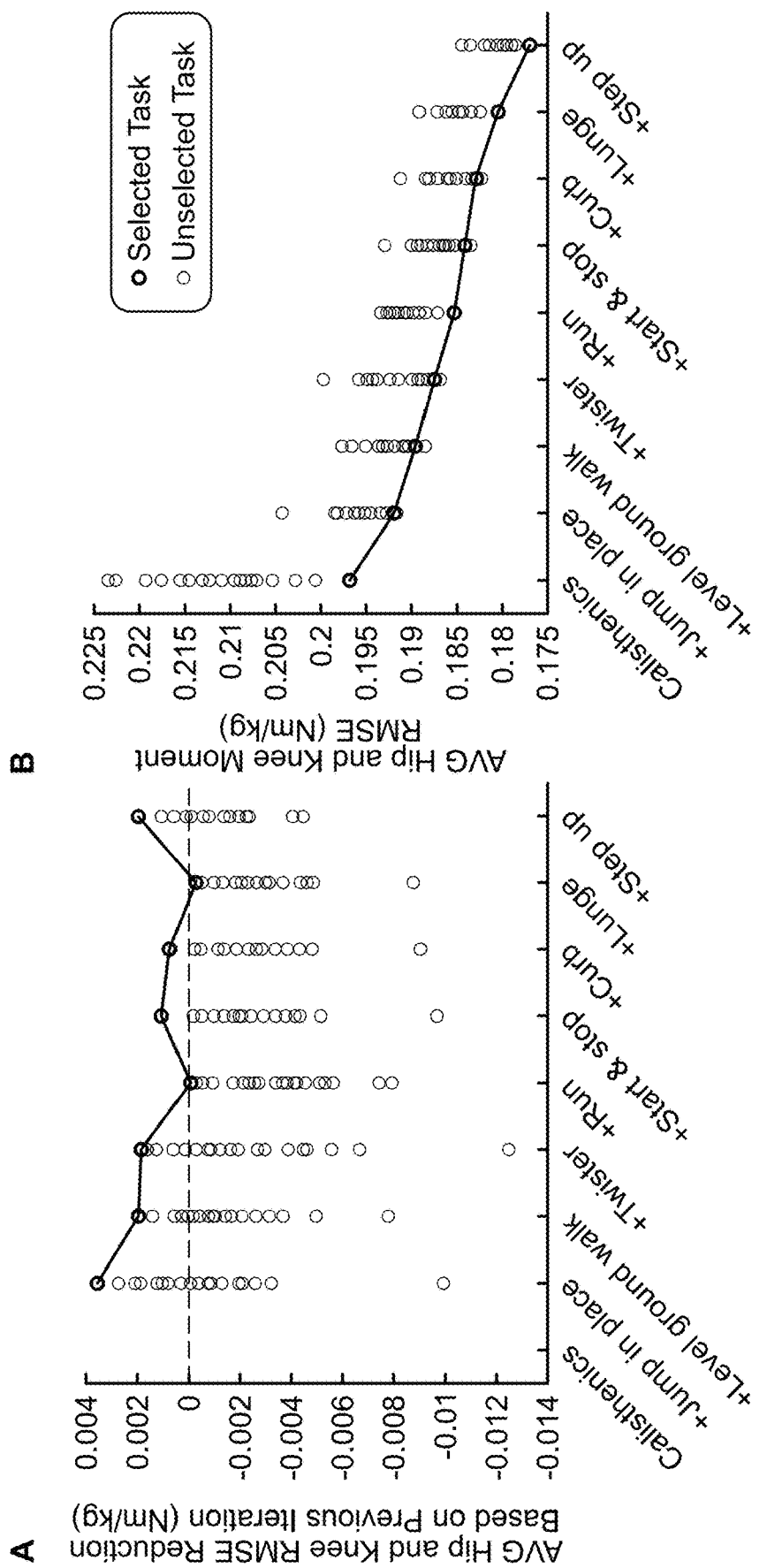
FIGS. 8A-8E shows the evaluations of the deep domain adaptation system and method.

Deep domain adaptation (DDA) optimization results. FIG. 8A shows the task optimization and performance across limited task and participant training sets. Error bars represent standard deviation across five cross-folded, left-out participants (omitted from subpanels a and b for clarity). Statistical significance was determined by controlling the false rate of discovery (q<0.05) across all nine tasks (shown in subpanels c and d) and all 13 participants (shown in subpanels e and f).

To minimize the data needed for the semi-supervised model, as shown in subpanel (a), the study optimized the tasks included in the training set by sequentially adding labeled tasks based on the average hip and knee generalization score, a score measuring how well each additional task improved moment estimation on the other tasks.

Subpanel (b) shows the corresponding RMSE across all tasks averaged between hip and knee for each task addition. Optimization was terminated after 9 tasks when the DDA method (referred to as Our Approach) was not statistically different from the best-case model. Even after additional tasks no longer improve generalization, overall RMSE may continue to decrease due to improvement on that particular added task.

Using the optimized set of tasks for each approach, the exemplary control system statistically outperformed the baseline approach (one without domain adaptation) with the same number of included tasks. This is presented as a percentage error increase compared to a best-case model (a model with access to all tasks) for both the hip and knee (subpanels c and d).

The study chose four tasks based on the plateau in the generalization score (shown in subpanel a). The resulting percentage error increase from the best-case model at four tasks was 12.0±3.8% at the hip, 13.6±6.9% at the knee (compared to the baseline of 37.9±4.4% at the hip and 44.8±6.1% at the knee). For future analyses, the study may limit both the baseline and exemplary control system to include only labeled exoskeleton data from those four optimized tasks. These tasks included calisthenics, jump in place, level ground walk, and twister while the baseline tasks included level ground walk, standing poses, calisthenics, and push & pull recovery [12'].

In pursuance of minimizing the necessary labeled data, the study also considered how many participants were necessary. By folding across left-out participants, the study assessed the average performance benefit of including additional participants. Subpanels (e) and (f) show the performance of the baseline approach versus the exemplary control system for the hip and knee in terms of percent increase compared to the same best-case model as above (all participants and tasks included). Regardless of the number of participants included, the exemplary control system statistically outperformed the baseline approach. The study only included the four optimized tasks from above for each participant.

To select the number of labeled participants to include for the semi-supervised models, the study averaged the hip and knee RMSE for the DDA method and determined the number of participants needed to reach 5% of the RMSE with all 13 participants. This occurred in four participants with a percent increase in RMSE compared to the best-case of 13.7±5.2% at the hip and 19.7±9.7% at the knee (compared to the baseline of 42.5±8.5% at the hip, and 55.6±12.1% at the knee). Thus, based on these optimizations, the following semi-supervised models (both exemplary control system and the baseline) include labeled data from four participants performing four tasks.

DDA performance on the offline testing set. The study tested the models trained using the baseline approach (without domain adaptation), exemplary moment estimator, and the best-case model (using costly device-specific data from all participants and all tasks) on a true testing set of eight novel, held-out participants performing 28 tasks.

Figure 8B:
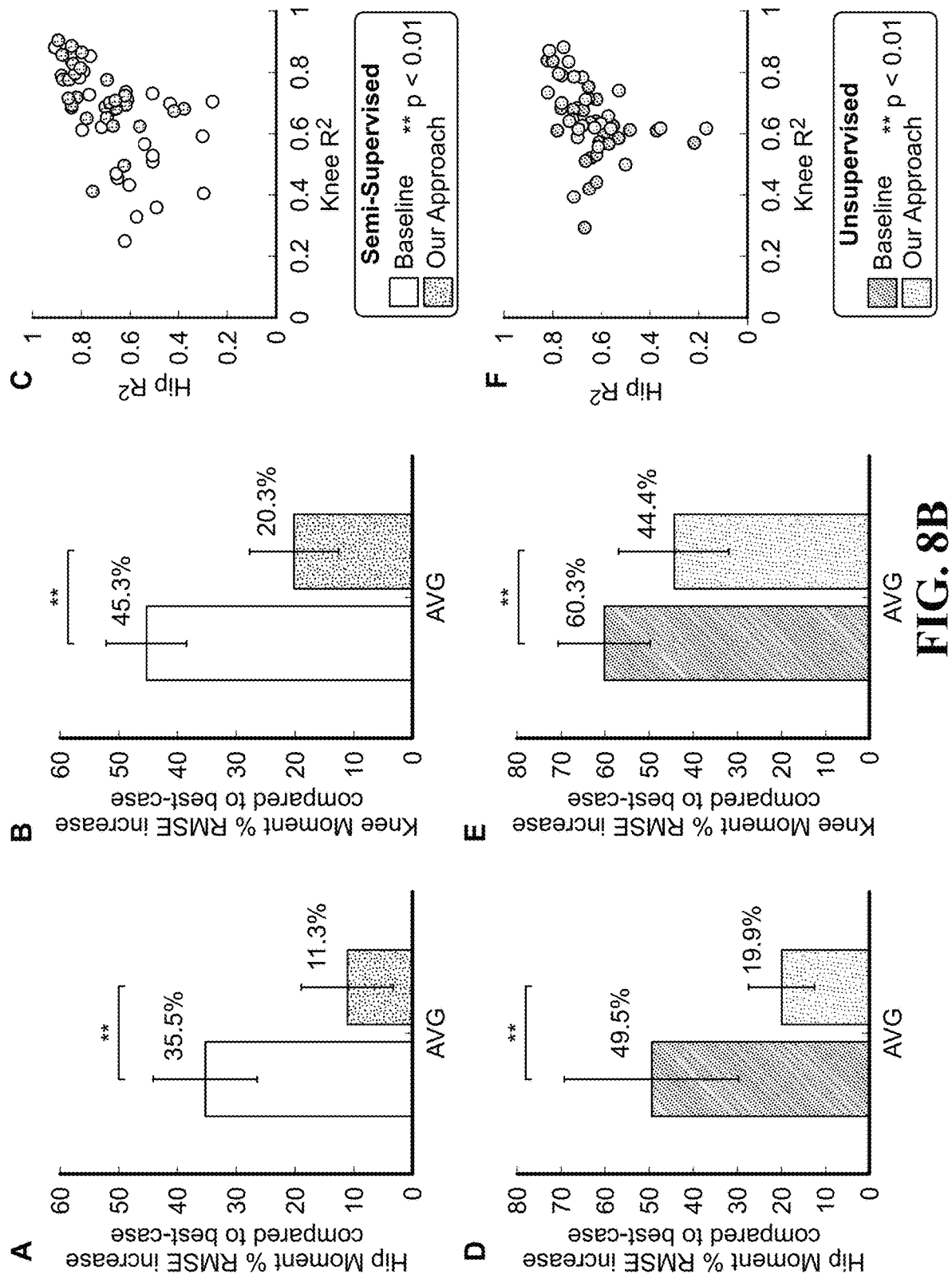

FIG. 8B shows the offline model performance for the exemplary moment estimators trained with translated sensors. For the semi-supervised case, the exemplary estimator (percent increase in RMSE compared to the best case of 11.3% at the hip and 20.3% at the knee) outperformed the baseline approach (percent increase in RMSE compared to the best case of 35.5% at the hip and 45.3% at the knee) as seen in subpanels (a) and (b) ($p<0.01$).

For the unsupervised case, the exemplary estimator (percent increase in RMSE compared to the best case of 19.9% at the hip and 44.4% at the knee) outperformed the baseline approach (percent increase in RMSE compared to the best case of 49.5% at the hip and 60.3% at the knee) as seen in subpanels (d) and (e) ($p<0.01$).

Subpanels (c) and (f) present a comparison between the baseline and exemplary estimator for both the semi-supervised and unsupervised cases in terms of $R^2$. Each point on the scatter plot represented one of the 28 tasks where higher numbers at the hip and the knee (closer to the upper right-hand corner) indicated a better match between the estimate and the ground truth joint moment.

Figure 8C:
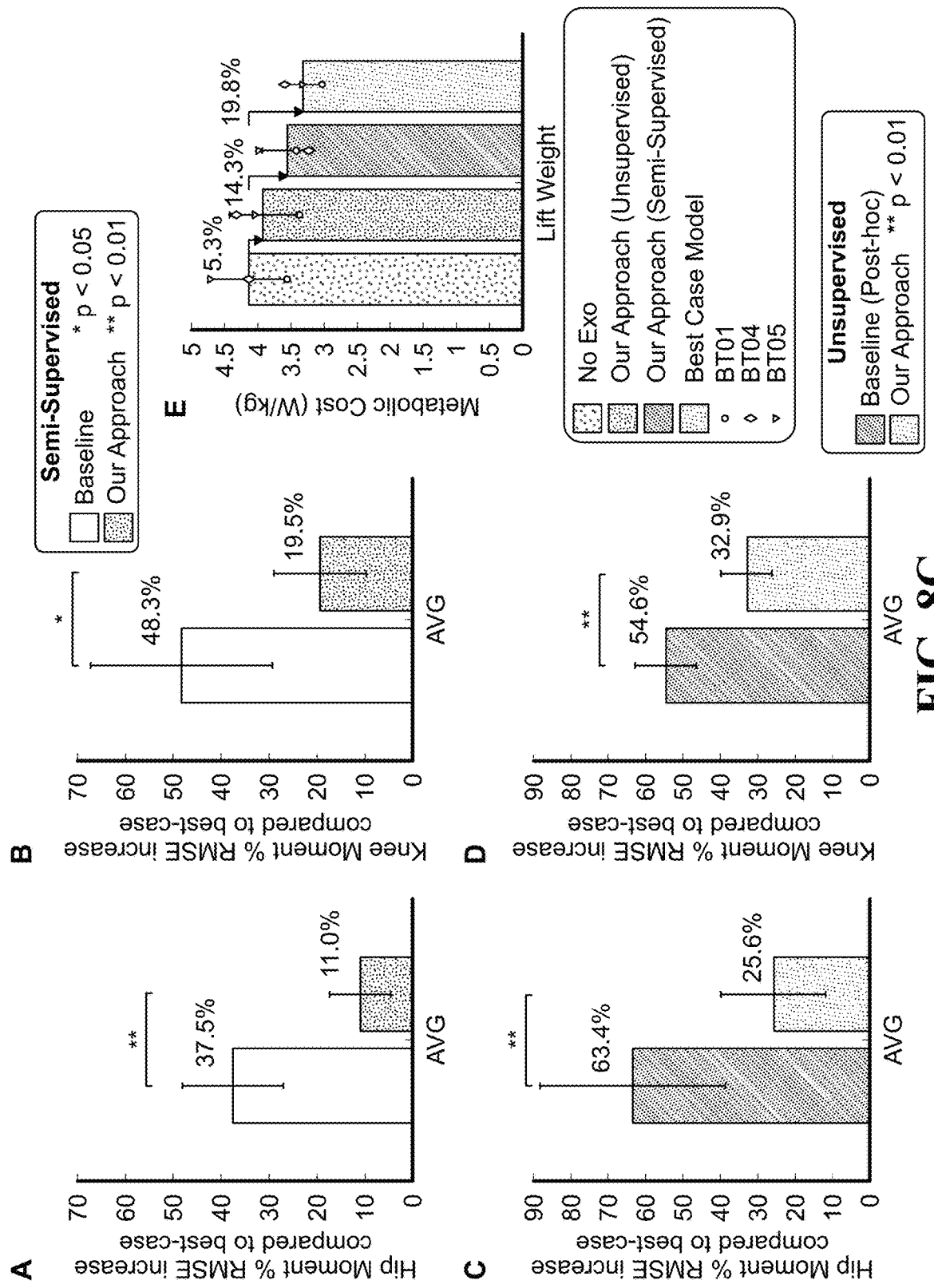

Real-time model performance with DDA. The study then deployed these models in real-time on an autonomous hip and knee exoskeleton, with the model providing estimated joint moments to assist users. FIG. 8C shows real-time model performance for moment estimators trained on translated data.

Across eight users performing eight representative tasks, the model trained with the semi-supervised method (percent increase in RMSE compared to the best-case model of 11.0±6.4% at the hip and 19.5±9.6% at the knee) outperformed the model trained with the baseline method (percent increase in RMSE compared to the best-case model of 37.5±10.5% at the hip and 48.3±19.0% at the knee) at the hip ($p<0.01$) and the knee ($p=0.011$) (shown in subpanels a and b). The final performance of the semi-supervised approach was 0.19±0.01 Nm/kg RMSE and 0.71±0.04 $R^2$ at the hip and 0.16±0.02 Nm/kg RMSE and 0.75±0.04 $R^2$ at the knee.

For the unsupervised case, the exemplary control system (percent increase in RMSE compared to the best-case model of 25.6±13.9% at the hip and 32.9±6.7% at the knee) outperformed the baseline approach (percent increase in RMSE compared to the best-case model of 63.4±24.8% at the hip and 54.6±8.1% at the knee) at both the hip and knee ($p<0.01$) (shown in subpanels c and d). This baseline approach was computed post hoc due to the poor estimation of the baseline controller causing instability and deemed unfeasible for real-time performance. The final performance of the unsupervised approach was 0.21±0.01 Nm/kg RMSE and 0.68±0.04 $R^2$ at the hip and 0.18±0.01 Nm/kg RMSE and 0.71±0.03 $R^2$ at the knee.

To gain an intuition about the impact of these errors on assisting human performance, the study deployed the best-case model and the semi-supervised and unsupervised models (N=3) during a lifting weight activity (shown in subpanel e) and compared user's metabolic cost to the participant not wearing the exoskeleton. All three deployed models demonstrated reductions in metabolic cost compared to performing the task without the exoskeleton but with varying levels of reduction for each model (5.3% for the unsupervised model, 14.3% for the semi-supervised model, and 19.8% for the best-case model).

Figure 8D:
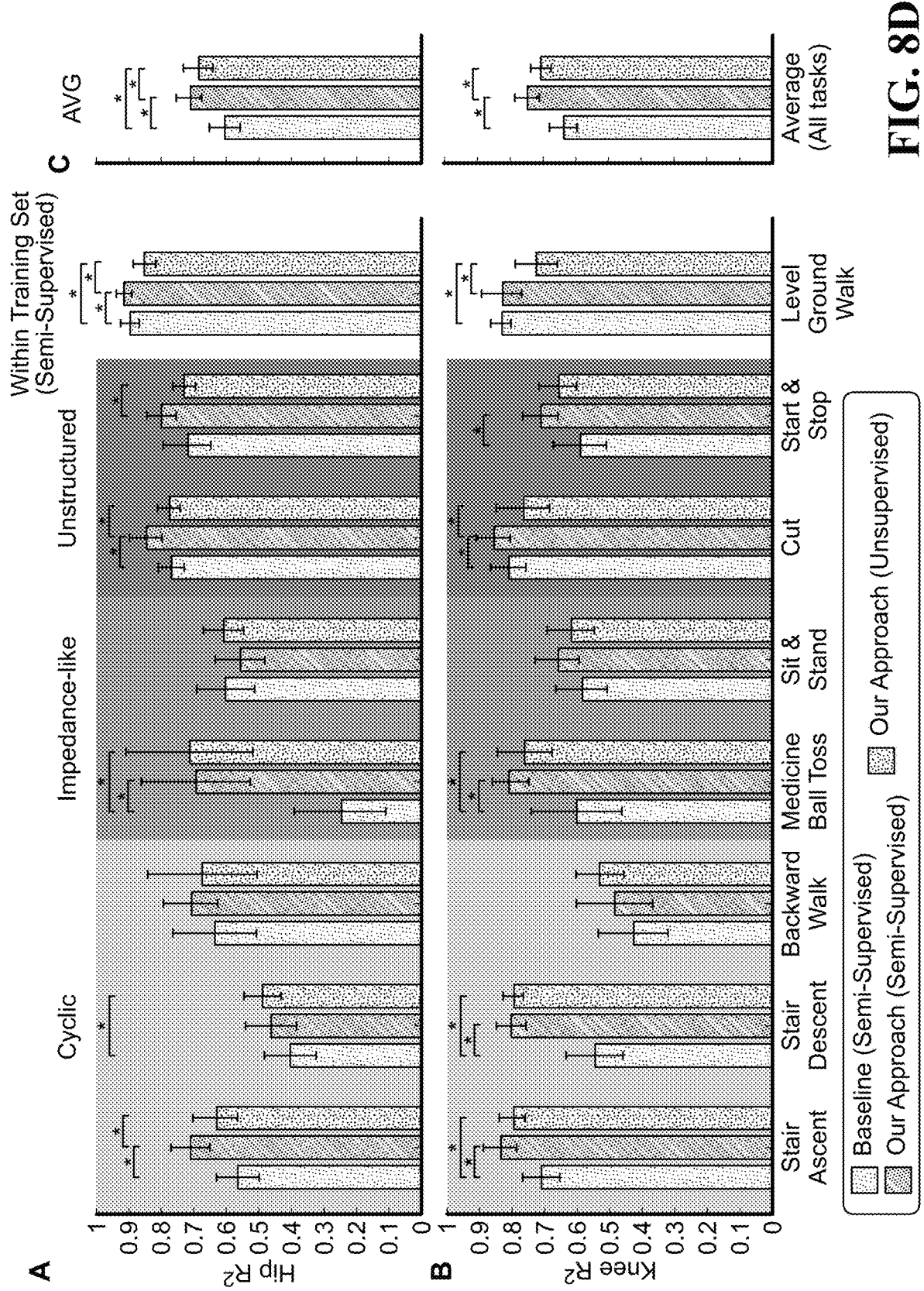

For the three models that were deployed in real-time to assess accuracy, results may be broken down into each specific task. FIG. 8D shows the real-time deployed model performance broken into specific tasks. Subpanels (a) and (b) show the individual $R^2$ performance of each deployed model on each task for the hip and the knee, respectively. The study separated the tasks into 4 categories; three were based on the category of activity (e.g., cyclic, impedance-like, and unstructured); the fourth task was based on the fact that level ground walking was one of the tasks for which the semi-supervised models had access to ground truth labels during training, while the unsupervised model did not.

Subpanel (c) shows the average R across all tasks, allowing a direct comparison between the three deployed models. Asterisks indicate statistical significance from follow-up multi-comparison tests with Bonferroni correction ($p<0.05$). Error bars represent the standard deviation across eight participants. Statistical significance was assessed using the false rate of discovery ($q<0.05$) to account for all 24 comparisons.

The study separated the tasks between cyclic, impedance-like, and unstructured activities to demonstrate the performance across all categories. To further compare the difference across the three real-time models in a single test, the study used a one-way ANOVA and found statistical differences between the three real-time models for $R^2$ at the hip ($F=27.63$, $p<0.01$) and at the knee ($F=14.47$, $p<0.01$). Follow-up pairwise multiple comparison tests with Bonferroni correction showed a statistically significantly higher $R^2$ for the semi-supervised approach over the semi-supervised baseline ($p<0.01$), the unsupervised approach over the semi-supervised baseline ($p=0.012$), and the semi-supervised approach over the unsupervised approach ($p=0.035$). At the knee, statistically significant improvements in $R^2$ were found for the semi-supervised approach over the semi-supervised baseline ($p<0.01$) and the semi-supervised approach over the unsupervised approach ($p=0.011$).

Figure 8E:
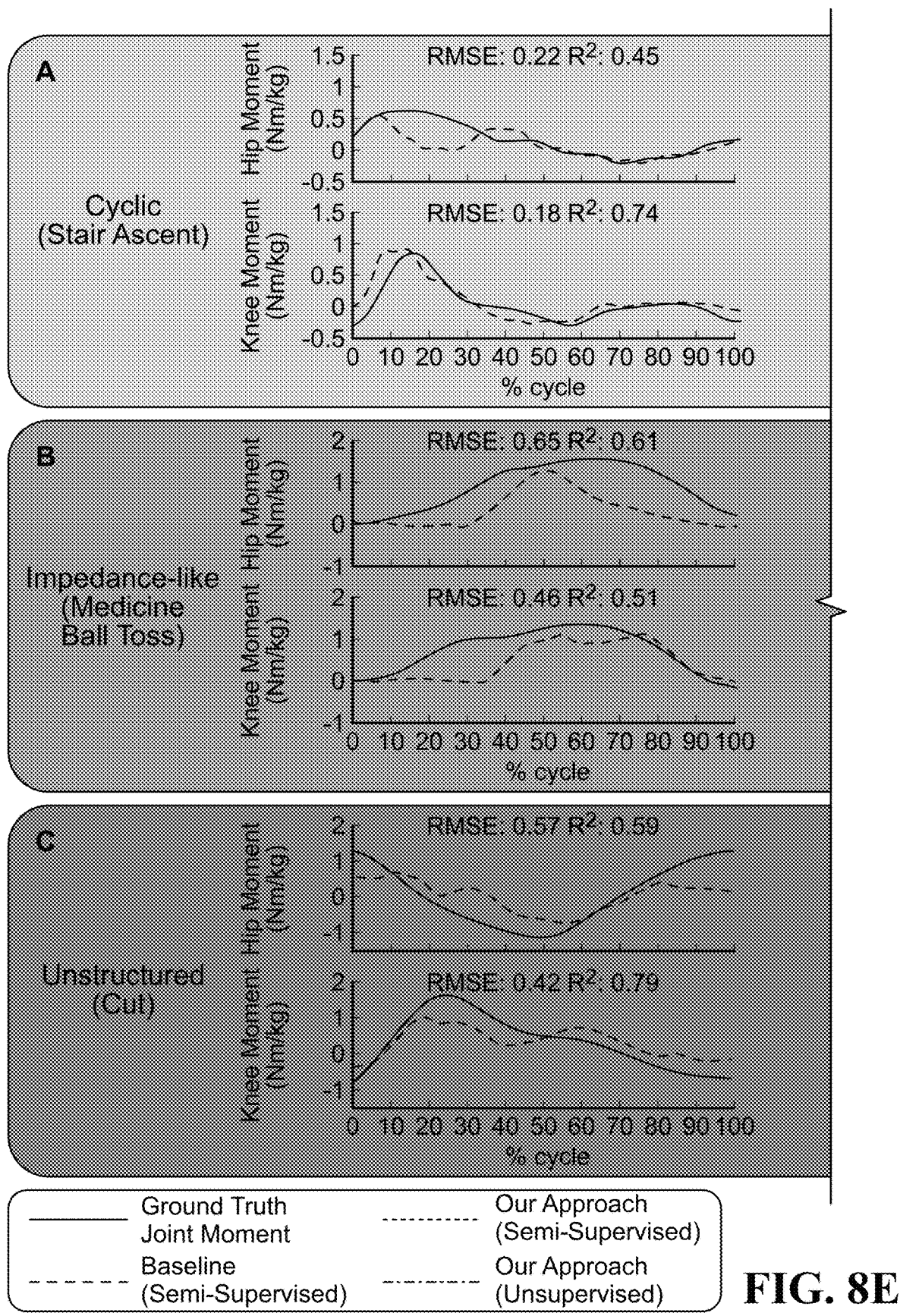
Figure 8E:
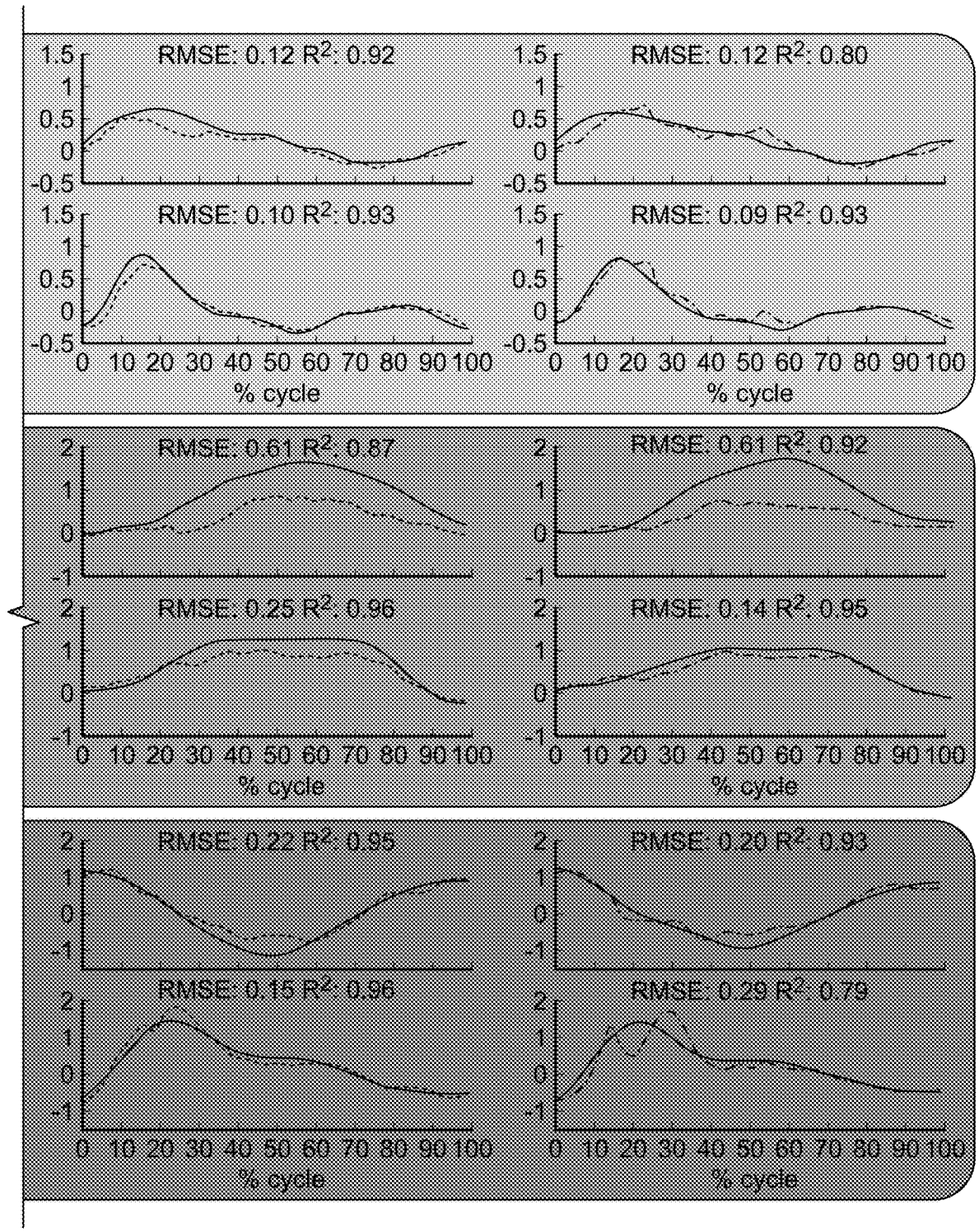

FIG. 8E demonstrates the accurate tracking of joint moments for the semi-supervised and unsupervised models through representative time-series plots from a single cycle of each type of activity. Because each activity was performed individually with each model, the ground truth moments were not the same for each repetition of the maneuver. Thus, to provide the best comparisons, the study selected the specific strides so that the ground truth moments were the most similar between controllers. This facilitated a direct visual comparison across the tested controllers by ensuring the same ground truth moment was being compared against.

DISCUSSION

Discussion #1. Lower-limb exoskeletons have the potential to transform the way we move [1-12], but current state-of-the-art controllers cannot accommodate the rich set of possible human behaviors that range from cyclic and predictable to transitory and unstructured. The study introduced a task-agnostic controller that assisted the user based on instantaneous estimates of lower-limb biological joint moments from a deep neural network. By estimating both hip and knee moments in the loop, the study provided multi-joint assistance to the clothing-integrated exoskeleton through the exemplary control system. When deployed during 28 activities, spanning cyclic locomotion to unstructured tasks (e.g., passive meandering and high-speed lateral cutting), the neural network accurately estimated hip and knee moments with an average $R^2$ of 0.83 relative to ground-truth.

The exemplary control system significantly outperformed a best-case task classifier based on splines and impedance parameters. Without any manual controller modifications among tasks, the exemplary controller significantly reduced user energetics (metabolic cost or lower-limb biological joint work depending on the task) relative to a Zero Torque condition during 10 activities, including level walking, running, lifting a 25 lb weight, and lunging. Reductions in user energetics ranged from 5.3-19.7%. Thus, this task-agnostic controller may enable exoskeletons to aid users across a broad spectrum of human activities, a necessity for real-world viability.

Discussion #2. Assistive robotic exoskeletons have been proven to reduce the energetic demands of human ambulation [50'], [51'], [52'], but they may only be helpful to the larger community if they are adaptable enough to keep up with the diverse nature of human movement.

Adaptation of exoskeleton control to both user and activity has been achieved [53'], [54'], [55'], [56']; however, this success has mostly been limited to niche, ideal cases of human ambulation that would only be encountered in lab settings [57']. Lack of adaptability is a major hindrance to exoskeleton technology being a feasible solution to any real-world problems. It has been considered that since the controllers are based on characteristics of the user's movement (kinematics, muscle activation, etc.) [50'], [58'] they must be adapting at least some small amount as the user adapts to the condition. However, multiple studies have found that these controllers' settings must be changed to accommodate the change in condition.

Biological joint moment-based estimation may create a controller that is both personalized and task-specific using a well-trained machine learning (ML) model [67'], [68'], [69']. Multiple studies have proven that the biological moments at the hip, knee, and ankle joints may be calculated using ground reaction forces and motion capture. However, the benefits of using biological moment as a control signal have not been extensively studied as the process of calculating biological torque is time-consuming [70'], [71']. This process requires costly data signals such as motion capture and ground reaction forces to be collected, processed, and correctly correlated to each other in sophisticated biomechanical simulation programs such as OpenSim. A neural network may convert data from sensors that are both deployable on board an exoskeleton and a relatively simple process to be trained to use sensors that are easily deployed to biological joint moments. More recent studies have shown that ML models trained on both a sufficient number of subjects and ambulatory conditions may produce biological moment estimates at the hip (and other joints) that are reasonably accurate independent of the subject [69'], [72']. This means the multi-subject (i.e., subject-independent) model's estimation accuracy for a subject not in its training set will not be significantly different than that of a model trained on a single subject and then tested on that same subject (i.e., a subject-dependent model).

Human-in-the-loop optimization (HILO) is the field's solution to determining the best controller setting for a user and task. This process uses some human outcome measure (or cost) as a metric to assess the "goodness" of a controller's settings (or parameters), feeds these parameters and its associated cost to an optimizer, which determines the next parameters to test [53'], [54'], [55'], [56'], [73'], [74']. As this loop continues, the optimizer finds the controller parameters that correspond to the minimum cost for the user and their walking condition. The gold standard metric is the metabolic cost calculated via indirect calorimetry [50'], [75', [76'], a process that takes measurements of the contents of a person's breath to calculate energy expenditure. Indirect calorimetry is a time-consuming process. Bayesian optimization has been found to be one of the more time-efficient methods of HILO, beating out previously used methods such as gradient descent [54']. Bayesian optimization suits HILO problems well as it is sample efficient, and one may directly control the motivation to explore or exploit, to not get trapped in local minima.

Although metabolic cost is the gold standard cost function for evaluating exoskeleton control, studies that utilize human-subject preference as their main cost function have proved to be able to find energetically efficient exoskeleton controller settings as well [77'], [78'], [79'], [80']. The underlying assumption in using preference as a cost metric is that users optimize for a set of metrics that is unique to them, and using this as a guide for controller parameters, rather than selecting a cost function for them, will lead to more synergistic interactions between the human and exoskeleton [78']. Though this study did not optimize preference, preference was collected and analyzed.

This study expanded on the findings of Molinaro [19'] previous study by (1) testing whether further metabolic reductions may be achieved with an alternate parametrization of the biological moment-based exoskeleton controller, (2) optimizing the new parametrization across multiple ambulation modes to analyze the task generalizability of a biological joint moment-based controller, (3) further analyzing the relationship between positive power and metabolic cost for this type of end-to-end controller, and (4) determining how subjects' preferences may be expected to change as the exoskeleton's control parameters change in the end-to-end controller. The study hypothesized that I: Personalized, task specific biological-torque based exoskeleton control may provide a significant energetic benefit in comparison to non-personalized and non-task specific controller settings, II: non-personalized, task specific controller settings may provide significant metabolic benefit over non-personalized task-generalized controller settings, III: metabolic cost reductions may be correlated with positive power provided by the exoskeleton during assistance.

Across all modes, there was no statistically significant metabolic difference between using Task-Dependent and Task-Agnostic controller settings (shown in FIG. 7D), rejecting hypothesis II. This means that for this type of biological moment-based hip exoskeleton controller in the absence of subject-specific data, a controller setting that was task independent may be as robust as a control that was task-dependent. This may be because in this controller paradigm there are areas of the landscape (specifically near quadrant IV) where the user's metabolic cost seems to have low sensitivity to small changes in the parameters (shown in FIG. 7F), so using parameters from a multi-task average metabolic landscape did not have a drastic metabolic penalty as compared to using single-task metabolic surfaces.

Across all modes Task-Dependent, Subject-Dependent controller settings provided significant metabolic reduction compared to Task-Independent, Subject-Independent controller settings verifying hypothesis I (shown in FIG. 7D). These results were expected and validated that if given the opportunity, using some sort of subject-specific tuning of an exoskeleton controller, such as HILO, may have benefits over using generalized settings [56'], even for this type of end-to-end biological torque-based controller. However, across all modes, there was no statistically significant metabolic difference between using Task-Dependent, Subject-Independent controller settings and Tak-Independent, Subject-Independent controller settings (shown in FIG. 7D), rejecting hypothesis II. This means that for this type of biological moment-based hip exoskeleton controller, in the absence of subject-specific data, a controller setting that was task independent may be as robust as a control that is task dependent. Both the preference and metabolic surfaces show that there may exist a place that is both comfortable and energetically efficient across all the modes tested.

This result may answer the question posed by Molinaro et. al. [67'] about a biological joint moment-based exoskeleton controller possibly being the basis of a task agnostic controller (i.e., a controller that was naïve to anything external to the subject). As the subject self-adjusts when a new ambulatory condition is presented to them, a controller based on an accurate internal state estimator may be able to use the subject's own "task recognition" abilities to give the exoskeleton on the context it needs to seamlessly adapt to modes with an appropriate midlevel controller.

The parameterization was created based on observation of previous HIL-Optimal control profiles [75'], [82'] that may be flatter at times where torque is near zero and sharper at torque peaks than the typical biological torque profile. Offline optimization shows the shaping parameter allows some flexibility to transform the biological joint moments into control profiles like the optimal profiles in Franks et. al, and that with a shape and delay parameter, a control profile nearly identical to Franks et. al. optimal profiles (at the hip) may be achieved. Based on inspection, the Bayesian optimization process may converge to both parameters at around the same iteration for each individual mode (shown in FIG. 7B). However, since these parameters were concurrently optimized, no reliable comparisons may be made on whether one parameter dominated the optimization process over the other.

The shaping term may have more effect on the average power provided by the exoskeleton to the user as a lower shape flattens the peaks of the control profile (shown in FIG. 7A), making the integration area in Equation 18 higher. The best way to reduce the metabolic cost of transport may be to increase the positive power delivered to the user by the exoskeleton [84']. At the slower ambulatory conditions, level ground, and incline 1.1 m/s, the average best parameters lie in a place where the average positive exoskeleton power delivered to the subject may be very high. This benefit may be seen especially in the most physically taxing mode of the experiment (the inclined one). While a few subjects' best controller parameters were at high shape values (shown in FIG. 7C), more subjects took advantage of this increased exoskeleton work, preferring extremely low shapes. This theory is reflected in the level ground and inclined 1.1 m/s preference surfaces, where quadrant 4 has the strongest preference of all quadrants.

However, on a quicker, flatter walking mode (level ground 1.5 m/s), the higher exoskeleton work of the low shape term is overridden by the discomfort of having a flat assistance peak that may translate to the user as lag that continues hip in flexion when they are moving towards extension or vice versa. For this condition optimal parameters as determined by average metabolic cost do not align with maximum exoskeleton power delivered to the subject, and the preference surface shows a tendency towards quadrant 1.

Although this study optimized metabolic cost, the metabolic cost of transport as a method of evaluating exoskeleton control may limit the field heavily. The study queried subject preference throughout this experiment to get a sense of how a subject's selections track with the corresponding metabolic measurements. Human sensitivity to a change in metabolic cost has been studied [49'], [85'], [86']; however, there is not much data comparing the results of using metabolic cost versus preference as an optimizable variable. Though I only optimized metabolic cost in the experiment, the preference landscapes (shown in FIG. 7F) give a good idea of what parameters a preference optimization could lead to. By inspection, the parameter setting given by the preference surfaces may fall in a favorable portion of the corresponding metabolic landscape. Previous studies have optimized exoskeleton controller settings on preference and heavily support the use case for it. Preference may be cheap and fast to collect, especially in comparison to the metabolic cost of transport. As the preference landscapes prove robust using rudimentary pairwise comparisons, so much more may be done in the exoskeleton control with more complex preference-based systems. Again, as this internal state-based controller inherently personalizes to the subject's own gait properties, preference may prove a more valuable metric when evaluating this controller versus previous controller types.

The R-squared values for the torque and power to the metabolic cost of transport fit were very low; however, that may not be significant given the fit was done over 9 subjects and 3 walking conditions. As mentioned, the control formula was designed to normalize peak torque values based on a constant value collected in the habituation session of this experiment. For each subject and within a mode, the peak torques were not constant, as shown in FIG. 7E subpanel (a), but there were no major fluctuations from the peak torque value. However, a subject's peak biological torque may not stay constant as the exoskeleton control parameters change the characteristics of their gait, and the moment estimator changes with each of the subject's steps. It was not realistic to expect that the r-squared values would be very high across all subjects and modes, given this step-to-step variability. However, what was significant about these plots was that given the relative peak torque normalization shown in FIG. 7E subpanel (a), both the average torque and average positive power may negatively correlate with metabolic reduction with a p-value that indicated the reliability of that relation. So, both Average torque and average positive power supplied by the exoskeleton may reliably reduce metabolic cost, affirming the suppositions made in both Molinaro and Camargo et al.

As is the nature of human-subject experiments, this research was limited in the amount of data that may be collected as it is only reasonable to ask subjects to walk in an exoskeleton for so long. The research team would have preferred to test this controller parametrization across more difficult ambulation modes; however, many subjects found it difficult to complete the included inclined walking trial for the ~1.5 hours required during this experiment. To test the true task generalizability of a biological moment-based controller during ambulation, it may be useful to include jogging, running, steeper inclines, and stair ambulatory modes. Future studies may require either a cost function that is less time-consuming than metabolic cost or recruiting athletes. This study was also limited by the motor's maximum torque rating of 18 Nm. Specifically on the walking condition that had the highest biological moment demands (inclined walking), 20% of the heavier subjects' biological torque was near the maximum capacity of the motors.

The time required for each measurement is a minimum of 2 minutes, but the field standard is 6 minutes, slowing the collection time of a single data point for each iteration of the HILO loop takes several minutes [73'], [83'], [85']. This may hinder the use of data greedy algorithms for HILO, as each data point corresponds to time spent walking by a human, and there are physical limits to what may be asked of a subject.

Discussion #3. Additionally, a critical barrier to the development and deployment of the data-driven exoskeleton controllers is the fact that a substantial amount of labeled training data is required, and these labels are costly to obtain for each device. For instance, to accurately calculate ground truth biological joint moments, which have recently emerged as a powerful human state variable in exoskeleton control, researchers must record data from their exoskeleton sensors along with time-synced data from an optical motion capture system and force plates. This highly specialized equipment is not readily available for many roboticists, and the process of calculating joint moments (or other human state labels) is non-trivial, requiring hundreds of hours of skilled labor for the curation of large datasets. The training data is also device-specific, prohibiting the reusage of data from previous generations or prototypes; every time researchers add or move sensors or substantially change the control type or magnitude, new labeled data must be collected. Furthermore, the exoskeleton must be actuated during training data collection due to the non-negligible effect of assistance on users' biomechanics, as well as sensor shifts due to soft tissue deformation and interface compliance. To accomplish this, researchers often must develop hand-tuned, task-dependent "stand-in" controllers that approximate the intended data-driven controller [11']. Thus, progress in exoskeleton control research is significantly hindered by its dependence on device-specific, labeled data compounded with the short relevance lifespan and numerous prohibitive barriers to obtaining that data.

A potential solution to the prohibitive cost of high-quality labeled data has emerged in other fields. Domain adaptation, a type of transfer learning, leverages labeled data from a related domain to improve model performance in a target domain where few or no labels exist. Domain adaptation techniques strive to uncover common latent features between the target and source distributions, enabling a mapping from sensors in the target domain to labels from the source domain.

The study mitigated the data scarcity problem by introducing a deep domain adaptation method that translates human movement data between a simulated sensor domain and a real sensor domain, enabling the integration of pre-existing, large open-source biomechanics datasets in end-to-end exoskeleton controllers. The domain adaptation method learns the bidirectional translation of sensor data between the real and simulated sensor domains using Generative Adversarial Networks (GANs). The study measured the usefulness of the translation of the domain adaptation method by using the translated data to train a downstream deep learning model in the real domain, which may be validated by deploying those models in real-time. The study compared end-to-end joint moment estimation models trained with a minimal number of labeled samples (semi-supervised) and no labeled samples (unsupervised) to their respective equivalent baseline models without domain adaptation.

CONCLUSION

Machine Learning. The term "artificial intelligence" may include any technique that enables one or more computing devices or computing systems (i.e., a machine) to mimic human intelligence. Artificial intelligence (AI) includes but is not limited to knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders. The term "deep learning" is defined herein to be a subset of machine learning that enables a machine to automatically discover representations needed for feature detection, prediction, classification, etc., using layers of processing. Deep learning techniques include but are not limited to artificial neural networks or multilayer perceptron (MLP).

Machine learning models include supervised, semi-supervised, and unsupervised learning models. In a supervised learning model, the model learns a function that maps an input (also known as feature or features) to an output (also known as target or target) during training with a labeled data set (or dataset). In an unsupervised learning model, the model learns a pattern in the data. In a semi-supervised model, the model learns a function that maps an input (also known as feature or features) to an output (also known as a target) during training with both labeled and unlabeled data.

Neural Networks. An artificial neural network (ANN) is a computing system including a plurality of interconnected neurons (e.g., also referred to as "nodes"). This disclosure contemplates that the nodes may be implemented using a computing device (e.g., a processing unit and memory as described herein). The nodes may be arranged in a plurality of layers such as an input layer, an output layer, and optionally one or more hidden layers. An ANN having hidden layers may be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tan H, or rectified linear unit (ReLU) function), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function may be used for training the ANN. Training algorithms for ANNs include but are not limited to backpropagation. It should be understood that an artificial neural network is provided only as an example machine learning model. This disclosure contemplates that the machine learning model may be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, depth). CNNs may include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks. GCNNs are CNNs that have been adapted to work on structured datasets such as graphs.

Other Supervised Learning Models. A logistic regression (LR) classifier is a supervised classification model that uses the logistic function to predict the probability of a target, which may be used for classification. LR classifiers are trained with a data set (also referred to herein as a "dataset") to maximize or minimize an objective function, for example, a measure of the LR classifier's performance (e.g., an error such as L1 or L2 loss), during training. This disclosure contemplates that any algorithm that finds the minimum of the cost function may be used. LR classifiers are known in the art and are therefore not described in further detail herein.

A Naïve Bayes' (NB) classifier is a supervised classification model that is based on Bayes' Theorem, which assumes independence among features (i.e., the presence of one feature in a class is unrelated to the presence of any other features). NB classifiers are trained with a data set by computing the conditional probability distribution of each feature given a label and applying Bayes' Theorem to compute the conditional probability distribution of a label given an observation. NB classifiers are known in the art and are therefore not described in further detail herein.

A k-NN classifier is a supervised classification model that classifies new data points based on similarity measures (e.g., distance functions). The k-NN classifiers are trained with a data set (also referred to herein as a "dataset") to maximize or minimize a measure of the k-NN classifier's performance during training. The k-NN classifiers are known in the art and are therefore not described in further detail herein.

A majority voting ensemble is a meta-classifier that combines a plurality of machine learning classifiers for classification via majority voting. In other words, the majority voting ensemble's final prediction (e.g., class label) is the one predicted most frequently by the member classification models. The majority voting ensembles are known in the art and are therefore not described in further detail herein.

Example Computing System. The exemplary system and method may be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts, and/or modules may be implemented in software, in firmware, in special purpose digital logic, in hardware, and any combination thereof. It should also be appreciated that more or fewer operations may be performed than shown in the figures and described herein. These operations may also be performed in a different order than those described herein.

The computer system is capable of executing the software components described herein for the exemplary method or systems. In an embodiment, the computing device may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device to provide the functionality of a number of servers that are not directly bound to the number of computers in the computing device. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In its most basic configuration, a computing device includes at least one processing unit and system memory. Depending on the exact configuration and type of computing device, system memory may be volatile (such as random-access memory (RAM)), non-volatile (such as read-only memory (ROM), flash memory, etc.), or some combination of the two.

The processing unit may be a programmable processor that performs arithmetic and logic operations necessary for the operation of the computing device. While only one processing unit is shown, multiple processors may be present. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The computing device may also include a bus or other communication mechanism for communicating information among various components of the computing device.

Computing devices may have additional features/functionality. For example, the computing device may include additional storage such as removable storage and non-removable storage including, but not limited to, magnetic or optical disks or tapes. Computing devices may also contain network connection(s) that allow the device to communicate with other devices, such as over the communication pathways described herein. The network connection(s) may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing devices may also have input device(s) such as keyboards, keypads, switches, dials, mice, trackballs, touch screens, voice recognizers, card readers, paper tape readers, or other well-known input devices. Output device(s) such as printers, video monitors, liquid crystal displays (LCDs), touch screen displays, displays, speakers, etc., may also be included. The additional devices may be connected to the bus in order to facilitate the communication of data among the components of the computing device. All these devices are well-known in the art and need not be discussed at length here.

The processing unit may be configured to execute program code encoded in tangible, computer-readable media. Tangible, computer-readable media refers to any media that is capable of providing data that causes the computing device (i.e., a machine) to operate in a particular fashion. Various computer-readable media may be utilized to provide instructions to the processing unit for execution. Example tangible, computer-readable media may include but is not limited to volatile media, non-volatile media, removable media, and non-removable media implemented in any method or technology for storage of information such as computer-readable instructions, data structures, program modules, or other data. System memory, removable storage, and non-removable storage are all examples of tangible computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In light of the above, it should be appreciated that many types of physical transformations take place in the computer architecture to store and execute the software components presented herein. It also should be appreciated that the computer architecture may include other types of computing devices, including hand-held computers, embedded computer systems, personal digital assistants, and other types of computing devices known to those skilled in the art.

In an example implementation, the processing unit may execute program code stored in the system memory. For example, the bus may carry data to the system memory, from which the processing unit receives and executes instructions. The data received by the system memory may optionally be stored on the removable storage or the non-removable storage before or after execution by the processing unit.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) may be implemented in assembly or machine language, if desired. In any case, the language may be a compiled or interpreted language, and it may be combined with hardware implementations.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with programming techniques with rule-based logic and other logic to accomplish the various connection steps, processing steps, comparison steps and decision steps.

Each and every feature described herein, and each and every combination of two or more of such features, is included within the scope of the present invention, provided that the features included in such a combination are not mutually inconsistent.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

While the methods and systems have been described in connection with certain embodiments and specific examples, it is not intended that the scope be limited to the particular embodiments set forth, as the embodiments herein are intended in all respects to be illustrative rather than restrictive.

The following patents, applications, and publications as listed below and throughout this document are hereby incorporated by reference in their entirety herein.

REFERENCE LIST #1

[1] Kim, J. et al. Reducing the metabolic rate of walking and running with a versatile, portable exosuit. Science 365, 668-672 (2019).
[2] Witte, K. A., Fiers, P., Sheets-Singer, A. L. & Collins, S. H. Improving the energy economy of human running with powered and unpowered ankle exoskeleton assistance. Sci. Robot. 5, eaay9108 (2020).
[3] Slade, P., Kochenderfer, M. J., Delp, S. L. & Collins, S. H. Personalizing exoskeleton assistance while walking in the real world. Nature 610, 277-282 (2022).
[4] Awad, L. N. et al. A soft robotic exosuit improves walking in patients after stroke. Sci. Transl. Med. 9, eaai9084 (2017).
[5] Malcolm, P., Derave, W., Galle, S. & Clercq, D. D. A Simple Exoskeleton That Assists Plantarflexion Can Reduce the Metabolic Cost of Human Walking. PLOS ONE 8, e56137 (2013).
[6] Mooney, L. M., Rouse, E. J. & Herr, H. M. Autonomous exoskeleton reduces metabolic cost of human walking during load carriage. J. NeuroEngineering Rehabil. 11, 80 (2014).
[7] Ishmael, M. K., Archangeli, D. & Lenzi, T. Powered hip exoskeleton improves walking economy in individuals with above-knee amputation. Nat. Med. 27, 1783-1788 (2021).
[8] Franks, P. W. et al. Comparing optimized exoskeleton assistance of the hip, knee, and ankle in single and multi-joint configurations. Wearable Technol. 2, e16 (2021).
[9] Baltrusch, S. J. et al. The effect of a passive trunk exoskeleton on metabolic costs during lifting and walking. Ergonomics 62, 903-916 (2019).
[10] Kantharaju, P. et al. Reducing Squat Physical Effort Using Personalized Assistance From an Ankle Exoskeleton. IEEE Trans. Neural Syst. Rehabil. Eng. 30, 1786-1795 (2022).
[11] Orekhov, G., Fang, Y., Luque, J. & Lerner, Z. F. Ankle Exoskeleton Assistance Can Improve Over-Ground Walking Economy in Individuals With Cerebral Palsy. IEEE Trans. Neural Syst. Rehabil. Eng. 28, 461-467 (2020).
[12] Lim, B. et al. Delayed Output Feedback Control for Gait Assistance With a Robotic Hip Exoskeleton. IEEE Trans. Robot. 35, 1055-1062 (2019).
[13] Siviy, C. et al. Opportunities and challenges in the development of exoskeletons for locomotor assistance. Nat. Biomed. Eng. 7, 456-472 (2023).
[14] Sawicki, G. S., Beck, O. N., Kang, I. & Young, A. J. The exoskeleton expansion: improving walking and running economy. J. NeuroEngineering Rehabil. 17, (2020).
[15] Collins, S. H., Wiggin, M. B. & Sawicki, G. S. Reducing the energy cost of human walking using an unpowered exoskeleton. Nature 522, 212-215 (2015).
[16] Yang, J., Park, J., Kim, J., Park, S. & Lee, G. Reducing the energy cost of running using a lightweight, low-profile elastic exosuit. J. NeuroEngineering Rehabil. 18, 129 (2021).
[17] Barazesh, H. & Sharbafi, M. A. A biarticular passive exosuit to support balance control can reduce metabolic cost of walking. Bioinspir. Biomim. 15, 036009 (2020).
[18] David Li, Y. & Hsiao-Wecksler, E. T. Gait mode recognition and control for a portable-powered ankle-foot orthosis. in 2013 IEEE 13th International Conference on Rehabilitation Robotics (ICORR) 1-8 (2013). doi: 10.1109/ICORR.2013.6650373.
[19] Laschowski, B., McNally, W., Wong, A. & McPhee, J. Environment Classification for Robotic Leg Prostheses and Exoskeletons Using Deep Convolutional Neural Networks. Front. Neurorobotics 15, (2022).
[20] Kang, I., Molinaro, D. D., Choi, G., Camargo, J. & Young, A. J. Subject-Independent Continuous Locomotion Mode Classification for Robotic Hip Exoskeleton Applications. IEEE Trans. Biomed. Eng. 69, 3234-3242 (2022).
[21] Camargo, J., Flanagan, W., Csomay-Shanklin, N., Kanwar, B. & Young, A. A Machine Learning Strategy for Locomotion Classification and Parameter Estimation Using Fusion of Wearable Sensors. IEEE Trans. Biomed. Eng. 68, 1569-1578 (2021).

[22] Qian, Y. et al. Predictive Locomotion Mode Recognition and Accurate Gait Phase Estimation for Hip Exoskeleton on Various Terrains. IEEE Robot. Autom. Lett. 7, 6439-6446 (2022).

[23] Medrano, R. L., Thomas, G. C., Keais, C. G., Rouse, E. J. & Gregg, R. D. Real-Time Gait Phase and Task Estimation for Controlling a Powered Ankle Exoskeleton on Extremely Uneven Terrain. IEEE Trans. Robot. 39, 2170-2182 (2023).

[24] Zhang, J. et al. Human-in-the-loop optimization of exoskeleton assistance during walking. Science 356, 1280-1284 (2017).

[25] Kang, I. et al. Real-Time Gait Phase Estimation for Robotic Hip Exoskeleton Control During Multimodal Locomotion. IEEE Robot. Autom. Lett. 6, 3491-3497 (2021).

[26] Kang, I., Kunapuli, P. & Young, A. J. Real-Time Neural Network-Based Gait Phase Estimation Using a Robotic Hip Exoskeleton. IEEE Trans. Med. Robot. Bionics 2, 28-37 (2020).

[27] Shepherd, M. K., Molinaro, D. D., Sawicki, G. S. & Young, A. J. Deep Learning Enables Exoboot Control to Augment Variable-Speed Walking. IEEE Robot. Autom. Lett. 7, 3571-3577 (2022).

[28] Huo, W. et al. Impedance Modulation Control of a Lower-Limb Exoskeleton to Assist Sit-to-Stand Movements. IEEE Trans. Robot. 38, 1230-1249 (2022).

[29] Yang, X. et al. Spine-Inspired Continuum Soft Exoskeleton for Stoop Lifting Assistance. IEEE Robot. Autom. Lett. 4, 4547-4554 (2019).

[30] Shepherd, M. K. & Rouse, E. J. Design and Validation of a Torque-Controllable Knee Exoskeleton for Sit-to-Stand Assistance. IEEEASME Trans. Mechatron. 22, 1695-1704 (2017).

[31] Orendurff, M. S., Schoen, J. A., Bernatz, G. C., Segal, A. D. & Klute, G. K. How humans walk: bout duration, steps per bout, and rest duration. J. Rehabil. Res. Dev. 45, 1077-1089 (2008).

[32] Kinetics: Forces and Moments of Force. in Biomechanics and Motor Control of Human Movement 107-138 (John Wiley & Sons, Ltd, 2009). doi: 10.1002/9780470549148.ch5.

[33] Dorschky, E. et al. CNN-Based Estimation of Sagittal Plane Walking and Running Biomechanics From Measured and Simulated Inertial Sensor Data. Front. Bioeng. Biotechnol. 8, (2020).

[34] Molinaro, D. D., Kang, I., Camargo, J., Gombolay, M. C. & Young, A. J. Subject-Independent, Biological Hip Moment Estimation During Multimodal Overground Ambulation Using Deep Learning. IEEE Trans. Med. Robot. Bionics 4, 219-229 (2022).

[35] Camargo, J., Molinaro, D. & Young, A. Predicting biological joint moment during multiple ambulation tasks. J. Biomech. 134, 111020 (2022).

[36] Hossain, M. S. B., Guo, Z. & Choi, H. Estimation of Lower Extremity Joint Moments and 3D Ground Reaction Forces Using IMU Sensors in Multiple Walking Conditions: A Deep Learning Approach. IEEE J. Biomed. Health Inform. 1-12 (2023) doi: 10.1109/JBHI.2023.3262164.

[37] Lin, J., Divekar, N. V., Thomas, G. C. & Gregg, R. D. Optimally Biomimetic Passivity-Based Control of a Lower-Limb Exoskeleton Over the Primary Activities of Daily Life. IEEE Open J. Control Syst. 1, 15-28 (2022).

[38] Zhang, J., Lin, J., Peddinti, V. & Gregg, R. D. Optimal Energy Shaping Control for a Backdrivable Hip Exoskeleton. in 2023 American Control Conference (ACC) 2065-2070 (2023). doi: 10.23919/ACC55779.2023.10155839.

[39] Gasparri, G. M., Luque, J. & Lerner, Z. F. Proportional Joint-Moment Control for Instantaneously Adaptive Ankle Exoskeleton Assistance. IEEE Trans. Neural Syst. Rehabil. Eng. 27, 751-759 (2019).

[40] Molinaro, D. D., Kang, I. & Young, A. J. Estimating Human Joint Moments Unifies Exoskeleton Control and Reduces User Effort. Sci. Robot. (In press), (2024).

[41] Fang, Y., Orekhov, G. & Lerner, Z. F. Improving the Energy Cost of Incline Walking and Stair Ascent With Ankle Exoskeleton Assistance in Cerebral Palsy. IEEE Trans. Biomed. Eng. 69, 2143-2152 (2022).

[42] Bishe, S. S. P. A., Nguyen, T., Fang, Y. & Lerner, Z. F. Adaptive Ankle Exoskeleton Control: Validation Across Diverse Walking Conditions. IEEE Trans. Med. Robot. Bionics 3, 801-812 (2021).

[43] Tagoe, E. A., Fang, Y., Williams, J. R. & Lerner, Z. F. Walking on Real-World Terrain With an Ankle Exoskeleton in Cerebral Palsy. IEEE Trans. Med. Robot. Bionics 6, 202-212 (2024).

[44] Young, A. J. & Ferris, D. P. State of the Art and Future Directions for Lower Limb Robotic Exoskeletons. IEEE Trans. Neural Syst. Rehabil. Eng. 25, 171-182 (2017).

[45] Delp, S. L. et al. OpenSim: Open-Source Software to Create and Analyze Dynamic Simulations of Movement. IEEE Trans. Biomed. Eng. 54, 1940-1950 (2007).

[46] Seth, A. et al. OpenSim: Simulating musculoskeletal dynamics and neuromuscular control to study human and animal movement. PLOS Comput. Biol. 14, e1006223 (2018).

[47] Scherpereel, K., Molinaro, D., Inan, O., Shepherd, M. & Young, A. A human lower-limb biomechanics and wearable sensors dataset during cyclic and non-cyclic activities. Sci. Data 10, 924 (2023).

[48] Ding, Y. et al. Effect of timing of hip extension assistance during loaded walking with a soft exosuit. J. NeuroEngineering Rehabil. 13, 87 (2016).

[49] Ingraham, K. A., Tucker, M., Ames, A. D., Rouse, E. J. & Shepherd, M. K. Leveraging user preference in the design and evaluation of lower-limb exoskeletons and prostheses. Curr. Opin. Biomed. Eng. 28, 100487 (2023).

[50] Winter, D. A. Biomechanical Motor Patterns in Normal Walking. J. Mot. Behav. 15, 302-330 (1983).

[51] Browning, R. C., Modica, J. R., Kram, R. & Goswami, A. The Effects of Adding Mass to the Legs on the Energetics and Biomechanics of Walking. Med. Sci. Sports Exerc. 39, 515 (2007).

[52] Farris, D. J. & Sawicki, G. S. The mechanics and energetics of human walking and running: a joint level perspective. J. R. Soc. Interface 9, 110-118 (2012).

[53] Farris, D. J., Hampton, A., Lewek, M. D. & Sawicki, G. S. Revisiting the mechanics and energetics of walking in individuals with chronic hemiparesis following stroke: from individual limbs to lower limb joints. J. NeuroEngineering Rehabil. 12, 24 (2015).

[54] Farris, D. J. & Sawicki, G. S. Linking the mechanics and energetics of hopping with elastic ankle exoskeletons. J. Appl. Physiol. Bethesda Md 1985 113, 1862-1872 (2012).

[55] Camargo, J., Bhakta, K., Herrin, K. & Young, A. Biomechanical Evaluation of Stair Ambulation Using Impedance Control on an Active Prosthesis. J. Biomech. Eng. 145, (2022).

[56] Camargo, J., Ramanathan, A., Flanagan, W. & Young, A. A comprehensive, open-source dataset of lower limb biomechanics in multiple conditions of stairs, ramps, and level-ground ambulation and transitions. J. Biomech. 119, 110320 (2021).

[57] Nuckols, R. W. et al. Mechanics of walking and running up and downhill: A joint-level perspective to guide design of lower-limb exoskeletons. PLOS ONE 15, e0231996 (2020).

[58] Reznick, E. et al. Lower-limb kinematics and kinetics during continuously varying human locomotion. Sci. Data 8, 282 (2021).

[59] Winter, D. A., Sidwall, H. G. & Hobson, D. A. Measurement and reduction of noise in kinematics of locomotion. J. Biomech. 7, 157-159 (1974).

[60] Molinaro, D. D., Park, E. O. & Young, A. J. Anticipation and Delayed Estimation of Sagittal Plane Human Hip Moments using Deep Learning and a Robotic Hip Exoskeleton. in 2023 IEEE International Conference on Robotics and Automation (ICRA) 12679-12685 (2023). doi: 10.1109/ICRA48891.2023.10161286.

[61] Bai, S., Kolter, J. Z. & Koltun, V. An Empirical Evaluation of Generic Convolutional and Recurrent Networks for Sequence Modeling. (2018).

[62] Golovin, D. et al. Google Vizier: A Service for Black-Box Optimization, in Proceedings of the 23rd ACM SIGKDD International Conference on Knowledge Discovery and Data Mining 1487-1495 (Association for Computing Machinery, New York, NY, USA, 2017). doi: 10.1145/3097983.3098043.

[63] Lim, H., Kim, B. & Park, S. Prediction of Lower Limb Kinetics and Kinematics during Walking by a Single IMU on the Lower Back Using Machine Learning. Sensors 20, 130 (2020).

[64] Mundt, M. et al. A Comparison of Three Neural Network Approaches for Estimating Joint Angles and Moments from Inertial Measurement Units. Sensors 21, 4535 (2021).

[65] Ancillao, A., Tedesco, S., Barton, J. & O'Flynn, B. Indirect Measurement of Ground Reaction Forces and Moments by Means of Wearable Inertial Sensors: A Systematic Review. Sensors 18, 2564 (2018).

[66] Forner-Cordero, A., Koopman, H. J. F. M. & van der Helm, F. C. T. Inverse dynamics calculations during gait with restricted ground reaction force information from pressure insoles. Gait Posture 23, 189-199 (2006).

[67] Alexander, N., Strutzenberger, G., Ameshofer, L. M. & Schwameder, H. Lower limb joint work and joint work contribution during downhill and uphill walking at different inclinations. J. Biomech. 61, 75-80 (2017).

[68] Lenton, G. K. et al. Lower-limb joint work and power are modulated during load carriage based on load configuration and walking speed. J. Biomech. 83, 174-180 (2019).

[69] Poggensee, K. L. & Collins, S. H. How adaptation, training, and customization contribute to benefits from exoskeleton assistance. Sci. Robot. 6, eabf1078 (2021).

[70] Brockway, J. M. Derivation of formulae used to calculate energy expenditure in man. Hum. Nutr. Clin. Nutr. 41, 463-471 (1987).

[71] Selinger, J. C. & Donelan, J. M. Estimating instantaneous energetic cost during non-steady-state gait. J. Appl. Physiol. 117, 1406-1415 (2014).

[72] Seo, K., Lee, J., Lee, Y., Ha, T. & Shim, Y. Fully autonomous hip exoskeleton saves metabolic cost of walking. in 2016 IEEE International Conference on Robotics and Automation (ICRA) 4628-4635 (2016). doi: 10.1109/ICRA.2016.7487663.

[73] Seo, K., Lee, J. & Park, Y. J. Autonomous hip exoskeleton saves metabolic cost of walking uphill. in 2017 International Conference on Rehabilitation Robotics (ICORR) 246-251 (2017). doi: 10.1109/ICORR.2017.8009254.

[74] Wang, H., Basu, A., Durandau, G. & Sartori, M. A wearable real-time kinetic measurement sensor setup for human locomotion. Wearable Technol. 4, e11 (2023).

REFERENCE LIST #2

[1'] R. M. Karulkar, P. M. Wensing, Personalized Estimation of Intended Gait Speed for Lower-Limb Exoskeleton Users via Data Augmentation Using Mutual Information. *IEEE Robotics and Automation Letters* 7, 9723-9730 (2022).

[2'] R. M. Karulkar, P. M. Wensing, Personalized Estimation of Intended Gait Speed for Lower-Limb Exoskeleton Users via Data Augmentation Using Mutual Information. IEEE Robotics and Automation Letters 7, 9723-9730 (2022).

[3'] I. Kang, P. Kunapuli, H. Hsu, A. J. Young, "Electromyography (EMG) Signal Contributions in Speed and Slope Estimation Using Robotic Exoskeletons" in 2019 IEEE 16th International Conference on Rehabilitation Robotics (ICORR) (2019) https://ieeexplore.ieee.org/abstract/document/8779433), pp. 548-553.

[3'] M. K. Shepherd, D. D. Molinaro, G. S. Sawicki, A. J. Young, Deep Learning Enables Exoboot Control to Augment Variable-Speed Walking. IEEE Robotics and Automation Letters 7, 3571-3577 (2022).

[4'] I. Kang, P. Kunapuli, A. J. Young, Real-Time Neural Network-Based Gait Phase Estimation Using a Robotic Hip Exoskeleton. IEEE Transactions on Medical Robotics and Bionics 2, 28-37 (2020).

[5'] I. Kang, D. D. Molinaro, S. Duggal, Y. Chen, P. Kunapuli, A. J. Young, Real-Time Gait Phase Estimation for Robotic Hip Exoskeleton Control During Multimodal Locomotion. IEEE Robotics and Automation Letters 6, 3491-3497 (2021).

[6'] J. Wang, D. Wu, Y. Gao, X. Wang, X. Li, G. Xu, W. Dong, Integral Real-time Locomotion Mode Recognition Based on GA-CNN for Lower Limb Exoskeleton. J Bionic Eng 19, 1359-1373 (2022).

[7'] Y. Qian, Y. Wang, C. Chen, J. Xiong, Y. Leng, H. Yu, C. Fu, Predictive Locomotion Mode Recognition and Accurate Gait Phase Estimation for Hip Exoskeleton on Various Terrains. IEEE Robotics and Automation Letters 7, 6439-6446 (2022).

[8'] H. Zhao, Z. Qiu, D. Peng, F. Wang, Z. Wang, S. Qiu, X. Shi, Q. Chu, Prediction of Joint Angles Based on Human Lower Limb Surface Electromyography. Sensors (Basel) 23, 5404 (2023).

[9'] T. Lee, I. Kim, S.-H. Lee, Estimation of the Continuous Walking Angle of Knee and Ankle (Talocrural Joint, Subtalar Joint) of a Lower-Limb Exoskeleton Robot Using a Neural Network. Sensors 21, 2807 (2021).

[10'] J. Lin, N. V. Divekar, G. C. Thomas, R. D. Gregg, Optimally Biomimetic Passivity-Based Control of a Lower-Limb Exoskeleton Over the Primary Activities of Daily Life. IEEE Open Journal of Control Systems 1, 15-28 (2022).

[11'] D. D. Molinaro, I. Kang, A. J. Young, Estimating human joint moments unifies exoskeleton control, reducing user effort. Science Robotics 9, eadi8852 (2024).

[12'] D. D. Molinaro, K. L. Scherpereel, E. B. Schonhaut, G. Evangelopoulos, M. K. Shepherd, A. J. Young, Task- Agnostic Exoskeleton Control via Biological Joint Moment Estimation. (In review) (2024).

[13'] D. Lee, I. Kang, D. D. Molinaro, A. Yu, A. J. Young, Real-Time User-Independent Slope Prediction Using Deep Learning for Modulation of Robotic Knee Exoskeleton Assistance. IEEE Robotics and Automation Letters 6, 3995-4000 (2021).

[14'] F. Yang, C. Chen, Z. Wang, H. Chen, Y. Liu, G. Li, X. Wu, ViT-based Terrain Recognition System for wearable soft exosuit. Biomimetic Intelligence and Robotics 3, 100087 (2023).

[15'] B. Laschowski, W. McNally, A. Wong, J. McPhee, "Preliminary Design of an Environment Recognition System for Controlling Robotic Lower-Limb Prostheses and Exoskeletons" in 2019 IEEE 16th International Conference on Rehabilitation Robotics (ICORR) (2019; https://ieeexplore.ieee.org/document/8779540), pp. 868-873.

[16'] P. Slade, M. J. Kochenderfer, S. L. Delp, S. H. Collins, Personalizing exoskeleton assistance while walking in the real world. Nature 610, 277-282 (2022).

[17'] J. M. Lopes, J. Figueiredo, P. Fonseca, J. J. Cerqueira, J. P. Vilas-Boas, C. P. Santos, Deep Learning-Based Energy Expenditure Estimation in Assisted and Non-Assisted Gait Using Inertial, EMG, and Heart Rate Wearable Sensors. Sensors 22, 7913 (2022).

[18'] U. H. Lee, V. S. Shetty, P. W. Franks, J. Tan, G. Evangelopoulos, S. Ha, E. J. Rouse, User preference optimization for control of ankle exoskeletons using sample efficient active learning. Science Robotics 8, eadg3705 (2023).

[19'] Y. Chang, A. Mathur, A. Isopoussu, J. Song, F. Kawsar, A Systematic Study of Unsupervised Domain Adaptation for Robust Human-Activity Recognition. Proc. ACM Interact. Mob. Wearable Ubiquitous Technol. 4, 1-30 (2020).

[20'] F. Mu, X. Gu, Y. Guo, B. Lo, "Unsupervised Domain Adaptation for Position-Independent IMU Based Gait Analysis" in 2020 IEEE SENSORS (2020), pp. 1-4.

[21'] A. Z. M. Faridee, A. Chakma, A. Misra, N. Roy, STranGAN: Adversarially-learnt Spatial Transformer for scalable human activity recognition. Smart Health 23, 100226 (2022).

[22'] C. Hegde, G. Wen, L. C. Price, Activity classification using unsupervised domain transfer from body worn sensors. Smart Health 30, 100431 (2023).

[23'] A. Akbari, R. Jafari, "Transferring activity recognition models for new wearable sensors with deep generative domain adaptation" in Proceedings of the 18th International Conference on Information Processing in Sensor Networks (Association for Computing Machinery, New York, NY, USA, 2019; https://doi.org/10.1145/3302506.3310391) IPSN '19, pp. 85-96.

[24'] C. Chen, Y. Miao, C. X. Lu, L. Xie, P. Blunsom, A. Markham, N. Trigoni, MotionTransformer: Transferring Neural Inertial Tracking between Domains. Proceedings of the AAAI Conference on Artificial Intelligence 33, 8009-8016 (2019).

[25'] L. Zhang, D. Soselia, R. Wang, E. M. Gutierrez-Farewik, Lower-Limb Joint Torque Prediction Using LSTM Neural Networks and Transfer Learning. IEEE Transactions on Neural Systems and Rehabilitation Engineering 30, 600-609 (2022).

[26'] B. X. W. Liew, D. Rügamer, X. Zhai, Y. Wang, S. Morris, K. Netto, Comparing shallow, deep, and transfer learning in predicting joint moments in running. Journal of Biomechanics 129, 110820 (2021).

[27'] J. Sloboda, P. Stegall, R. J. McKindles, L. Stirling, H. C. Siu, "Utility of Inter-subject Transfer Learning for Wearable-Sensor-Based Joint Torque Prediction Models" in 2021 43rd Annual International Conference of the IEEE Engineering in Medicine & Biology Society (EMBC) (2021; https://ieeexplore.ieee.org/abstract/document/9630652), pp. 4901-4907.

[28'] Y. Wang, Z. Li, X. Wang, H. Yu, W. Liao, D. Arifoglu, Human Gait Data Augmentation and Trajectory Prediction for Lower-Limb Rehabilitation Robot Control Using GANs and Attention Mechanism. Machines 9, 367 (2021).

[29'] M. Kim, L. J. Hargrove, Generating synthetic gait patterns based on benchmark datasets for controlling prosthetic legs. J NeuroEngineering Rehabil 20, 115 (2023).

[30'] S. L. Delp, F. C. Anderson, A. S. Arnold, P. Loan, A. Habib, C. T. John, E. Guendelman, D. G. Thelen, OpenSim: Open-Source Software to Create and Analyze Dynamic Simulations of Movement. IEEE Transactions on Biomedical Engineering 54, 1940-1950 (2007).

[31'] A. Seth, J. L. Hicks, T. K. Uchida, A. Habib, C. L. Dembia, J. J. Dunne, C. F. Ong, M. S. DeMers, A. Rajagopal, M. Millard, S. R. Hamner, E. M. Arnold, J. R. Yong, S. K. Lakshmikanth, M. A. Sherman, J. P. Ku, S. L. Delp, OpenSim: Simulating musculoskeletal dynamics and neuromuscular control to study human and animal movement. PLOS Computational Biology 14, e1006223 (2018).

[32'] M. Serrao, G. Chini, M. Bergantino, D. Sarnari, C. Casali, C. Conte, A. Ranavolo, C. Marcotulli, M. Rinaldi, G. Coppola, F. Bini, F. Pierelli, F. Marinozzi, Dataset on gait patterns in degenerative neurological diseases. Data in Brief 16, 806-816 (2018).

[33'] T. Van Criekinge, W. Saeys, S. Truijen, L. Vereeck, L. H. Sloot, A. Hallemans, A full-body motion capture gait dataset of 138 able-bodied adults across the life span and 50 stroke survivors. Sci Data 10, 852 (2023).

[34'] P.-F. David, R.-C. David, M. J. C., T. Diego, Human Locomotion Databases: A Systematic Review. IEEE Journal of Biomedical and Health Informatics 28, 1716-1729 (2024).

[35'] J.-Y. Zhu, T. Park, P. Isola, A. A. Efros, "Unpaired Image-to-Image Translation Using Cycle-Consistent Adversarial Networks" in 2017 IEEE International Conference on Computer Vision (ICCV) (2017; https://ieeexplore.ieee.org/document/8237506), pp. 2242-2251.

[36'] S. An, A. Medda, M. N. Sawka, C. J. Hutto, M. L. Millard-Stafford, S. Appling, K. L. S. Richardson, O. T. Inan, AdaptNet: Human Activity Recognition via Bilateral Domain Adaptation Using Semi-Supervised Deep Translation Networks. IEEE Sensors Journal 21, 20398-20411 (2021).

[37'] D. D. Molinaro, I. Kang, J. Camargo, M. C. Gombolay, A. J. Young, Subject-Independent, Biological Hip Moment Estimation During Multimodal Overground Ambulation Using Deep Learning. IEEE Transactions on Medical Robotics and Bionics 4, 219-229 (2022).

[38'] X. Mao, Q. Li, H. Xie, R. Y. K. Lau, Z. Wang, S. Paul Smolley, "Least Squares Generative Adversarial Networks" (2017); https://openaccess.thecvf.com/content_iccv_2017/html/Mao_Least_Squares_Generative_ICCV_2017_paper.html), pp. 2794-2802.

[39'] Y. Taigman, A. Polyak, L. Wolf, Unsupervised Cross-Domain Image Generation. arXiv arXiv: 1611.02200 [Preprint] (2016). https://doi.org/10.48550/arXiv.1611.02200.

[40'] K. Scherpereel, D. Molinaro, O. Inan, M. Shepherd, A. Young, A human lower-limb biomechanics and wearable sensors dataset during cyclic and non-cyclic activities. Sci Data 10, 924 (2023).

[41'] Y. Benjamini, Y. Hochberg, Controlling the False Discovery Rate: A Practical and Powerful Approach to Multiple Testing. Journal of the Royal Statistical Society: Series B (Methodological) 57, 289-300 (1995).

[42'] K. L. Scherpereel, D. D. Molinaro, M. K. Shepherd, O. T. Inan, A. J. Young, Improving Biological Joint Moment Estimation During Real-World Tasks with EMG and Instrumented Insoles. IEEE Transactions on Biomedical Engineering, 1-10 (2024).

[43'] H. Haresamudram, I. Essa, T. Plötz, Assessing the State of Self-Supervised Human Activity Recognition Using Wearables. Proc. ACM Interact. Mob. Wearable Ubiquitous Technol. 6, 116:1-116:47 (2022).

[44'] F. J. Ordóñez, D. Roggen, Deep Convolutional and LSTM Recurrent Neural Networks for Multimodal Wearable Activity Recognition. Sensors 16, 115 (2016).

[45'] O. Ronneberger, P. Fischer, T. Brox, "U-Net: Convolutional Networks for Biomedical Image Segmentation" in Medical Image Computing and Computer-Assisted Intervention—MICCAI 2015, N. Navab, J. Hornegger, W. M. Wells, A. F. Frangi, Eds. (Springer International Publishing, Cham, 2015) Lecture Notes in Computer Science, pp. 234-241.

[46'] Y. Zhang, Z. Zhang, Y. Zhang, J. Bao, Y. Zhang, H. Deng, Human Activity Recognition Based on Motion Sensor Using U-Net. IEEE Access 7, 75213-75226 (2019).

[47'] H. Ismail Fawaz, G. Forestier, J. Weber, L. Idoumghar, P.-A. Muller, Deep learning for time series classification: a review. Data Min Knowl Disc 33, 917-963 (2019).

[48'] S. Bai, J. Z. Kolter, V. Koltun, An Empirical Evaluation of Generic Convolutional and Recurrent Networks for Sequence Modeling. (2018).

[49'] J. C. Selinger, S. M. O'Connor, J. D. Wong, and J. M. Donelan, "Humans Can Continuously Optimize Energetic Cost during Walking," Curr Biol, vol. 25, no. 18, pp. 2452-2456 September 2015, doi: 10.1016/j.cub.2015.08.016.

[50'] G. S. Sawicki, O. N. Beck, I. Kang, and A. J. Young, "The exoskeleton expansion: improving walking and running economy," Journal of NeuroEngineering and Rehabilitation, vol. 17, no. 1, p. 25, February 2020, doi: 10.1186/s12984-020-00663-9.

[51'] S. H. Collins, M. B. Wiggin, and G. S. Sawicki, "Reducing the energy cost of human walking using an unpowered exoskeleton," Nature, vol. 522, no. 7555, Art. no. 7555 June 2015, doi: 10.1038/nature14288.

[52'] B. A. Shafer, J. C. Powell, A. J. Young, and G. S. Sawicki, "Emulator-Based Optimization of a Semi-Active Hip Exoskeleton Concept: Sweeping Impedance Across Walking Speeds," IEEE Trans Biomed Eng, vol. 70, no. 1, pp. 271-282, January 2023, doi: 10.1109/TBME.2022.3188482.

[53'] J. Zhang et al., "Human-in-the-loop optimization of exoskeleton assistance during walking," Science, vol. 356, no. 6344, pp. 1280-1284 June 2017, doi: 10.1126/science.aal5054.

[54'] M. Kim et al., "Human-in-the-loop Bayesian optimization of wearable device parameters," PLOS ONE, vol. 12, no. 9, p. e0184054, September 2017, doi: 10.1371/journal.pone.0184054.

[55'] V. Nalam, X. Tu, M. Li, J. Si, and H. H. Huang, "Admittance Control Based Human-in-the-Loop Optimization for Hip Exoskeleton Reduces Human Exertion during Walking," in 2022 International Conference on Robotics and Automation (ICRA), May 2022, pp. 6743-6749. doi: 10.1109/ICRA46639.2022.9811553.

[56'] Y. Ding, M. Kim, S. Kuindersma, and C. J. Walsh, "Human-in-the-loop optimization of hip assistance with a soft exosuit during walking," Science Robotics, vol. 3, no. 15, Art. no. 15, February 2018, doi: 10.1126/scirobotics.aar5438.

[57'] P. Slade, M. J. Kochenderfer, S. L. Delp, and S. H. Collins, "Personalizing exoskeleton assistance while walking in the real world," Nature, vol. 610, no. 7931, Art. no. 7931 October 2022, doi: 10.1038/s41586-022-05191-1.

[58'] R. Baud, A. R. Manzoori, A. Ijspeert, and M. Bouri, "Review of control strategies for lower-limb exoskeletons to assist gait," Journal of NeuroEngineering and Rehabilitation, vol. 18, no. 1, p. 119, July 2021, doi: 10.1186/s12984-021-00906-3.

[59'] M. R. Tucker et al., "Control strategies for active lower extremity prosthetics and orthotics: a review," J NeuroEngineering Rehabil, vol. 12, no. 1, Art. no. 1, December 2015, doi: 10.1186/1743-0003-12-1.

[60'] B. A. Shafer, J. C. Powell, A. J. Young, and G. S. Sawicki, "Emulator-based Optimization of Semi-active Hip Exoskeleton Impedance Control Across Walking Speeds," IEEE Transactions on Biomedical Engineering, vol. (under review).

[61'] P. W. Franks, G. M. Bryan, R. Reyes, M. P. O'Donovan, K. N. Gregorczyk, and S. H. Collins, "The Effects of Incline Level on Optimized Lower-Limb Exoskeleton Assistance." bioRxiv, p. 2021.09.13.460170, Sep. 15, 2021. doi: 10.1101/2021.09.13.460170.

[62'] P. W. Franks, G. M. Bryan, R. M. Martin, R. Reyes, A. C. Lakmazaheri, and S. H. Collins, "Comparing optimized exoskeleton assistance of the hip, knee, and ankle in single and multi-joint configurations," Wearable Technol., vol. 2, p. e16, 2021, doi: 10.1017/wtc.2021.14.

[63'] J. R. Koller, D. A. Jacobs, D. P. Ferris, and C. D. Remy, "Learning to walk with an adaptive gain proportional myoelectric controller for a robotic ankle exoskeleton," Journal of NeuroEngineering and Rehabilitation, vol. 12, no. 1, p. 97, November 2015, doi: 10.1186/s12984-015-0086-5.

[64'] A. J. Young, H. Gannon, and D. P. Ferris, "A Biomechanical Comparison of Proportional Electromyography Control to Biological Torque Control Using a Powered Hip Exoskeleton," Frontiers in Bioengineering and Biotechnology, vol. 5, 2017, Accessed: May 3, 2022. [Online]. Available: https://www.frontiersin.org/article/10.3389/fbioe.2017.00037

[65'] A. Colucci et al., "Brain-Computer Interface-Controlled Exoskeletons in Clinical Neurorehabilitation: Ready or Not?," Neurorehabil Neural Repair, vol. 36, no. 12, pp. 747-756, December 2022, doi: 10.1177/15459683221138751.

[66'] D. D. Molinaro, K. Scherpereel, E. B. Schonhaut, G. Evangelopoulos, M. K. Shepherd, and A. J. Young, "Task-Agnostic Exoskeleton Control via Biological Joint Moment Estimation," Nature, vol. (In Press), 2024.

[67'] D. D. Molinaro, I. Kang, and A. J. Young, "Estimating human joint moments unifies exoskeleton control, reducing user effort," Science Robotics, vol. 9, no. 88, Art. no. 88, March 2024, doi: 10.1126/scirobotics.adi8852.

[68'] G. M. Gasparri, J. Luque, and Z. F. Lerner, "Proportional Joint-Moment Control for Instantaneously Adaptive Ankle Exoskeleton Assistance," IEEE Transactions on *Neural Systems and Rehabilitation Engineering*, vol. 27, no. 4, Art. no. 4, April 2019, doi: 10.1109/TNSRE.2019.2905979.

[69'] D. D. Molinaro, I. Kang, J. Camargo, M. C. Gombolay, and A. J. Young, "Subject-Independent, Biological Hip Moment Estimation During Multimodal Overground Ambulation Using Deep Learning," *IEEE Transactions on Medical Robotics and Bionics*, vol. 4, no. 1, Art. no. 1, February 2022, doi: 10.1109/TMRB.2022.3144025.

[70'] V. Camomilla, A. Cereatti, A. G. Cutti, S. Fantozzi, R. Stagni, and G. Vannozzi, "Methodological factors affecting joint moments estimation in clinical gait analysis: a systematic review," *BioMedical Engineering OnLine*, vol. 16, no. 1, p. 106, August 2017, doi: 10.1186/s12938-017-0396-x.

[71'] S. Fantozzi, P. Garofalo, A. G. Cutti, and R. Stagni, "3d joint moments in transfemoral and transtibial amputees: when is the 'ground reaction vector technique' an alternative to inverse dynamics?," *J. Mech. Med. Biol.*, vol. 12, no. 04, p. 1250061, September 2012, doi: 10.1142/S0219519412004983.

[72'] W. Liang, F. Wang, A. Fan, W. Zhao, W. Yao, and P. Yang, "Deep-learning model for the prediction of lower-limb joint moments using single inertial measurement unit during different locomotive activities," *Biomedical Signal Processing and Control*, vol. 86, p. 105372, September 2023, doi: 10.1016/j.bspc.2023.105372.

[73'] M. A. Díaz et al., "Human-in-the-Loop Optimization of Wearable Robotic Devices to Improve Human-Robot Interaction: A Systematic Review," *IEEE Trans. Cybern.*, vol. 53, no. 12, Art. no. 12, December 2023, doi: 10.1109/TCYB.2022.3224895.

[74'] L. Xu et al., "Reducing the muscle activity of walking using a portable hip exoskeleton based on human-in-the-loop optimization," *Front Bioeng Biotechnol*, vol. 11, p. 1006326, May 2023, doi: 10.3389/fbioe.2023.1006326.

[75'] P. W. Franks, G. M. Bryan, R. M. Martin, R. Reyes, A. C. Lakmazaheri, and S. H. Collins, "Comparing optimized exoskeleton assistance of the hip, knee, and ankle in single and multi-joint configurations," *Wearable Technologies*, vol. 2, p. e16, January 2021, doi: 10.1017/wtc.2021.14.

[76'] A. J. Young and D. P. Ferris, "State of the Art and Future Directions for Lower Limb Robotic Exoskeletons," *IEEE Transactions on Neural Systems and Rehabilitation Engineering*, vol. 25, no. 2, Art. no. 2, February 2017, doi: 10.1109/TNSRE.2016.2521160.

[77'] T. R. Clites, M. K. Shepherd, K. A. Ingraham, L. Wontorcik, and E. J. Rouse, "Understanding patient preference in prosthetic ankle stiffness," *Journal of NeuroEngineering and Rehabilitation*, vol. 18, no. 1, p. 128, August 2021, doi: 10.1186/s12984-021-00916-1.

[78'] K. A. Ingraham, C. D. Remy, and E. J. Rouse, "The role of user preference in the customized control of robotic exoskeletons," *Sci Robot*, vol. 7, no. 64, p. eabj3487, March 2022, doi: 10.1126/scirobotics.abj3487.

[79'] M. Tucker, N. Csomay-Shanklin, W.-L. Ma, and A. D. Ames, "Preference-Based Learning for User-Guided HZD Gait Generation on Bipedal Walking Robots," in *2021 IEEE International Conference on Robotics and Automation (ICRA)*, May 2021, pp. 2804-2810. doi: 10.1109/ICRA48506.2021.9561515.

[80'] M. Tucker et al., "Human Preference-Based Learning for High-dimensional Optimization of Exoskeleton Walking Gaits," in *2020 IEEE/RSJ International Conference on Intelligent Robots and Systems (IROS)*, October 2020, pp. 3423-3430. doi: 10.1109/IROS45743.2020.9341416.

[81'] J. Camargo, A. Ramanathan, W. Flanagan, and A. Young, "A comprehensive, open-source dataset of lower limb biomechanics in multiple conditions of stairs, ramps, and level-ground ambulation and transitions," *Journal of Biomechanics*, vol. 119, p. 110320, April 2021, doi: 10.1016/j.jbiomech.2021.110320.

[82'] P. W. Franks, G. M. Bryan, R. Reyes, M. P. O'Donovan, K. N. Gregorczyk, and S. H. Collins, "The Effects of Incline Level on Optimized Lower-Limb Exoskeleton Assistance." bioRxiv, p. 2021.09.13.460170, Sep. 15, 2021. doi: 10.1101/2021.09.13.460170.

[83'] J. C. Selinger and J. M. Donelan, "Estimating instantaneous energetic cost during non-steady-state gait," *J Appl Physiol* (1985), vol. 117, no. 11, pp. 1406-1415 December 2014, doi: 10.1152/japplphysiol.00445.2014.

[84'] J. Camargo, D. Molinaro, and A. Young, "Predicting biological joint moment during multiple ambulation tasks," *J Biomech*, vol. 134, p. 111020, March 2022, doi: 10.1016/j.jbiomech.2022.111020.

[85'] R. L. Medrano, G. C. Thomas, and E. J. Rouse, "Can humans perceive the metabolic benefit provided by augmentative exoskeletons?: Journal of NeuroEngineering & Rehabilitation (JNER)," *Journal of NeuroEngineering & Rehabilitation (JNER)*, vol. 19, no. 1, pp. 1-13, February 2022, doi: 10.1186/s12984-022-01002-w.

[86'] "Is natural variability in gait sufficient to initiate spontaneous energy optimization in human walking? | Journal of Neurophysiology." Accessed: Apr. 23, 2024. [Online]. Available: https://journals.physiology.org/doi/full/10.1152/jn.00417.2018

What is claimed:

1. A system comprising:
   a wearable device having one or more sensors;
   a processor; and
   a memory having instructions stored thereon for a controller having a joint moment estimator, a muscle moment estimator, or a force estimator, wherein the processor is configured to execute the instructions, which include:
   receiving, via a control loop, sensor data from the one or more sensors of the wearable device;
   determining, via a trained AI model, at least one of a physical state, muscle extension moments, or muscle extension forces using the sensor data as a direct input to the trained AI model;
   outputting, from the trained AI model, and via the control loop, joint moment, muscle moment, or force estimates from the physical state, muscle extension moments, or muscle extension forces for operating the wearable device based on the determined at least one of the physical state, muscle extension moments, or muscle extension forces; and
   determining a desired torque assistance value by:
     scaling joint moments estimates by an assistance offset value; and
     delaying scaled joint moments estimates by a predefined offset value.

2. The system of claim 1, wherein the one or more sensors comprise a plurality of exoskeleton sensors and the trained AI model was trained using time-synchronized exoskeleton sensor data and labels, where the sensor data is received from the plurality of exoskeleton sensors and labels come from joint moment measurements or estimates for a number of cyclic and non-cyclic human activities.

3. The system of claim 2, wherein the cyclic and non-cyclic human activities include at least 5 motions selected from the group consisting of: level ground walk, standing in various poses, push and pull, turn, change of direction, sit and stand, tug of war, jump across, toe and heel walk, to stand up from a seated position, vertical jump, lunge, walk, skipping, medicine ball toss, lift a weight, step up, butt kicks, walk backward,
  wherein the cyclic and non-cyclic human activities were measured using hip position and configuration, shank position and configuration, thigh position and configuration, trunk and foot position and configuration, and knee position and configuration.

4. The system of claim 2, wherein the cyclic activities include walking and running at different configurations.

5. The system of claim 2, wherein the non-cyclic activities include impedance action and unstructured action, wherein the impedance action includes at least one of standing in various poses, lunges, sit and stand, tug of war, medicine ball toss, step up, jump across, jump in place, lift and place weight, and squats, and wherein the unstructured action includes at least one of start and stop, change of direction, step over, turn, meander, twisting side to side at a waist of a human while standing without moving the human's feet, push and pull recovery, and systematic rhythmic bodily exercises performed without an apparatus.

6. The system of claim 1, wherein the controller is implemented in a remote co-processor.

7. The system of claim 1, wherein the wearable device comprises an actuator and an inertial measurement unit (IMU), wherein the one or more sensors comprise an insole sensor, and wherein the joint moment estimator or the force estimator is implemented in a remote co-processor to determine total hip and knee flexion/extension moment values using measured actuator data, measured IMU data, and measured pressure insole data, as the sensor data, acquired from the wearable device.

8. The system of claim 1, wherein the execution of the instructions by the processor further causes the processor to determine the desired torque assistance value further comprises:
  modulating a sharpness and a flatness of peaks of the delayed joint moment estimates.

9. The system of claim 1, wherein the trained AI model comprises a temporal convolutional neural network (TCN).

10. The system of claim 1, wherein the wearable device comprises a robotic device or prosthetic device.

11. A method comprising:
  receiving, via a control loop, sensor data from one or more sensors of a wearable device;
  determining, via a trained AI model, at least one of a physical state, muscle extension moments, or muscle extension forces using the sensor data as a direct input to the trained AI model;
  outputting, from the trained AI model, and via the control loop, joint moment, muscle moment, or force estimates from the physical state, muscle extension moments, or muscle extension forces for operating the wearable device based on the determined at least one of the physical state, muscle extension moments, or muscle extension forces; and
  determining a desired torque assistance value by scaling biological joint moments estimates by an assistance offset value, and delaying the scaled biological joint moment estimates by a pre-defined offset value.

12. The system of claim 1, wherein the controller is configured by:
  receiving biomechanical data;
  generating simulated sensor data using a translator network to simulate sensors for a transferred device using the received biomechanical data generated using physics-based simulation software, where the simulation is performed at body segments for positions, for forces, and/or for velocities constrained or defined on the same body segment for a target device to provide paired data of (i) the sensor data of the target device and (ii) the biomechanical data, wherein the paired data is used for training of at least one neural network; and
  training the at least one neural network, wherein the neural network is configured to map the simulated data associated with the biomechanical data to real data associated with the sensor data.

13. The system of claim 12, wherein the at least one neural network forms in part:
  a first generative adversarial network (GAN) configured to generate the real data associated with the sensor data; or
  a second GAN configured to generate simulated data associated with the biomechanical data.

14. The system of claim 13, wherein the training of the at least one neural network employs supervised loss, cycle consistency loss, GAN loss, and reconstruction loss,
  wherein the reconstruction loss is computed using error value normalized by sensor modality weighted equally in reconstruction, and
  wherein the cycle consistency loss is computed by matching (i) simulated data associated with the biomechanical data that was passed through both a sim-to-real translator and then a real-to-sim translator to (ii) the original data.

15. The method of claim 11, wherein the wearable device comprises a robotic device or prosthetic device.

16. The method of claim 11, wherein the one or more sensors comprise a plurality of exoskeleton sensors and the trained AI model was trained using time-synchronized exoskeleton sensor data and labels, where the sensor data is received from the plurality of exoskeleton sensors and labels come from joint moment measurements or estimates for a number of cyclic and non-cyclic human activities.

17. The method of claim 16, wherein the time-synchronized exoskeleton sensor data and labels for training the AI model is comprised of a set of tasks that promote task generalization, which were selected by a task selection algorithm.

18. The method of claim 16, further comprising selecting one or more of the plurality of exoskeleton sensors to provide the exoskeleton sensor data.

19. The method of claim 11, further comprising: wherein determining a desired torque assistance value further comprises
  modulating a sharpness and a flatness of peaks of the delayed biological joint moment estimates.

20. The method of claim 16, wherein the cyclic and non-cyclic human activities include a motion selected from the group consisting of: level ground walk, standing in various poses, push and pull, turn, change of direction, sit and stand, tug of war, jump across, toe and heel walk, vertical jump, lunge, walk, skipping, medicine ball toss, lift a weight, step up, butt kicks, walk backward, wherein the cyclic and non-cyclic human activities were measured using hip position and configuration, shank position and configuration, thigh position and configuration, trunk and foot position and configuration, and knee position and configuration.

21. The method of claim 16, wherein the cyclic activities include walking and running at different configurations.

22. The method of claim 16, wherein the non-cyclic activities include impedance action and unstructured action, wherein the impedance action includes at least one of standing in various poses, lunges, sit and stand, tug of war, medicine ball toss, step up, jump across, jump in place, lift and place weight, and squats, and wherein the unstructured action includes at least one of start and stop, change of direction, step over, turn, meander, twisting side to side at a waist of a human while standing without moving the human's feet, push and pull recovery, and systematic rhythmic bodily exercises performed without an apparatus.

23. The method of claim 11, wherein the controller is implemented in a remote co-processor.

24. The method of claim 11, wherein the wearable device comprises an actuator and an IMU, wherein the one or more sensors comprise an insole sensor, and wherein a joint moment estimator or a force estimator is implemented in a remote co-processor to determine total hip and knee flexion and extension moment values using measured actuator data, measured inertial measurement unit (IMU) data, and measured pressure insole data, as the sensor data, acquired from the wearable device.

25. The method of claim 11, wherein the hyperparameters of the estimator are optimized to promote generalization to tasks previously unseen by the estimator.

26. The method of claim 11, wherein the trained AI model comprises a temporal convolutional neural network (TCN).

27. A non-transitory computer-readable medium having instructions stored thereon, wherein a processor is configured to execute the instructions, which include:
- receiving, via a control loop, sensor data from one or more sensors of a robotic device or prosthetic device;
- determining, via a trained AI model, at least one of a physical state, muscle extension moments, or muscle extension forces using the sensor data as a direct input to the trained AI model;
- outputting, from the trained AI model, and via the control loop, joint moment, muscle moment, or force estimates from the physical state, muscle extension moments, or muscle extension forces for operating the robotic device or prosthetic device based on the determined at least one of the physical state, muscle extension moments, or muscle extension forces; and
- determining a desired torque assistance value by scaling biological joint moments estimates by an assistance offset value, and delaying the scaled biological joint moment estimates by a pre-defined offset value.

28. A joint moment or force estimator comprising:
a processor; and
a memory having instructions stored thereon, wherein the processor is configured to execute the instructions, which include:
- receiving, via a control loop, sensor data from one or more sensors of a robotic or prosthetic device;
- determining, via a trained AI model, at least one of a physical state, muscle extension moments, or muscle extension forces using the sensor data as directly input to the trained AI model;
- outputting, from the trained AI model, and via the control loop, joint moment, muscle moment, or force estimates from the physical state, muscle extension moments, or muscle extension forces for operating the robotic device or prosthetic device based on the determined at least one of the physical state, muscle extension moments, or muscle extension forces; and
- determining a desired torque assistance value by scaling biological joint moments estimates by an assistance offset value, and delaying the scaled biological joint moment estimates by a pre-defined offset value.

\* \* \* \* \*